US012227024B2

(12) United States Patent
Izawa et al.

(10) Patent No.: US 12,227,024 B2
(45) Date of Patent: Feb. 18, 2025

(54) WRITING IMPLEMENT

(71) Applicant: MITSUBISHI PENCIL COMPANY, LIMITED, Tokyo (JP)

(72) Inventors: Hirotake Izawa, Tokyo (JP); Toshimi Kamitani, Tokyo (JP); Chihiro Mochizuki, Tokyo (JP); Kaito Tsukada, Tokyo (JP)

(73) Assignee: MITSUBISHI PENCIL COMPANY, LIMITED, Tokyo (JP)

( * ) Notice: Subject to any disclaimer, the term of this patent is extended or adjusted under 35 U.S.C. 154(b) by 0 days.

(21) Appl. No.: 18/264,849

(22) PCT Filed: Feb. 9, 2022

(86) PCT No.: PCT/JP2022/005060
§ 371 (c)(1),
(2) Date: Aug. 9, 2023

(87) PCT Pub. No.: WO2022/172946
PCT Pub. Date: Aug. 18, 2022

(65) Prior Publication Data

US 2024/0051329 A1 Feb. 15, 2024

(30) Foreign Application Priority Data

Feb. 10, 2021 (JP) ................................ 2021-019902

(51) Int. Cl.
*B43K 8/06* (2006.01)
*B43K 1/00* (2006.01)
(Continued)

(52) U.S. Cl.
CPC ................ *B43K 8/06* (2013.01); *B43K 1/003* (2013.01); *B43K 1/006* (2013.01); *B43K 8/02* (2013.01); *B43K 8/03* (2013.01); *B43K 27/08* (2013.01)

(58) Field of Classification Search
CPC . B43K 8/02; B43K 8/06; B43K 27/08; B43K 1/003; B43K 1/006
(Continued)

(56) References Cited

U.S. PATENT DOCUMENTS 6,659,672 B1 12/2003 Kirita
9,132,692 B2 * 9/2015 Kamitani .............. B43K 8/003
(Continued)

FOREIGN PATENT DOCUMENTS

CN 104339924 A 2/2015
JP 2000-52682 A 2/2000
(Continued)

OTHER PUBLICATIONS

International Search Report issued Mar. 22, 2022 in PCT/JP2022/005060 filed on Feb. 9, 2022 3 pages.
(Continued)

*Primary Examiner* — Jennifer C Chiang
(74) *Attorney, Agent, or Firm* — Oblon, McClelland, Maier & Neustadt, L.L.P.

(57) ABSTRACT

Provided is a writing implement that maximizes the effective area of a viewer portion allowing visual recognition in the writing direction and that facilitates writing at a high level, at the same time. This writing implement is a writing implement A, including for example, a pen tip 20 that feeds ink from a writing implement body 10 and has a viewer portion 33 allowing visual recognition in the writing direction. The pen tip 20 is comprised of, at least, a writing part 25 and a retainer 30 having the viewer portion 33, an ink feeder portion 26 for feeding the ink from the writing implement body 10 to the writing part 25. The minimum width X of the viewer portion 33 is 3.7 mm or greater and a length Y of the viewer portion 33 is 7.4 mm or greater. The ink feeder portion 26 is arranged on one side of the viewer
(Continued)

portion 33. Specifically, the ink feeder portion 26 is preferably adapted to be positioned on a near side during writing (on such a side that the pen tip 20 is located on an obtuse angle side of the ink feeder portion 26).

8 Claims, 30 Drawing Sheets

(51) Int. Cl.
*B43K 8/02* (2006.01)
*B43K 8/03* (2006.01)
*B43K 27/08* (2006.01)

(58) Field of Classification Search
USPC .......................................................... 401/198
See application file for complete search history.

(56) References Cited

U.S. PATENT DOCUMENTS

| | | | | |
|---|---|---|---|---|
| 10,723,166 | B1 | 7/2020 | Thawornsing | |
| 11,427,027 | B2 * | 8/2022 | Ogiwara | B43K 8/02 |
| 2013/0064595 | A1 | 3/2013 | Kamitani et al. | |
| 2015/0367672 | A1 | 12/2015 | Kamitani et al. | |

FOREIGN PATENT DOCUMENTS

| | | | |
|---|---|---|---|
| JP | 2018-118519 | A | 8/2018 |
| JP | 2018-134736 | A | 8/2018 |
| JP | 2019-136933 | A | 8/2019 |
| JP | 2019-142064 | A | 8/2019 |
| JP | 2019-206151 | A | 12/2019 |
| JP | 2020-59247 | A | 4/2020 |
| JP | 2020-196166 | A | 12/2020 |
| JP | 2020-196246 | A | 12/2020 |

OTHER PUBLICATIONS

Partial Supplementary European Search Report issued Dec. 2, 2024, in European Patent Application No. 22752769.4, 3 pages.

* cited by examiner

WRITING IMPLEMENT

TECHNICAL FIELD

The present specification relates to a writing implement having a viewer portion that allows visual recognition in the writing direction, and more detailedly relating to a writing implement that maximizes the effective area of a viewer portion allowing visual recognition in the writing direction so as to rise visibility and that facilitates writing at a high level, at the same time.

BACKGROUND ART

As a writing implement having a viewer portion that allows visual recognition in the writing direction, the applicant hereof has already disclosed a writing implement, including a pen tip that feeds ink from an ink absorbent material (sliver) inside the barrel body as the writing implement body and retains the ink, and the pen tip has a viewer portion (visual recognition part) allowing visual recognition in the writing direction (e.g., see Patent Documents 1 and 2).

The pen tip of the writing implement of this type allows the user to see the writing part, so that the user can stop the pen tip at a point desired to end at the drawing to prevent excessive drawing or sticking out.

However, the pen tip in Patent Document 1 has a U-shaped writing core integrally formed of a writing part and ink feeder portions formed on both sides of the writing part, and in order to efficiently supply a sufficient amount of ink from the ink absorbent, it is necessary to design the thickness of the ink feeder portions to be thick. However, as the ink feeder portions are thickened, the thickened ink feeder portions shade the viewer portion, giving rise to a problem that the effective area of the viewer portion relative to the whole pen tip is reduced.

Also, in the writing implement of Patent Document 2, the pen tip has an L-shaped writing core integrally formed of a writing part and an ink feeder portion formed on one side of the writing part. Although the effective area of the viewer portion relative to the whole pen tip has been somewhat improved, the viewer portion is still narrow, and it is a little difficult to check characters of a certain size (larger than 10.5 points).

On the other hand, other than the above structures, the following 1) to 3), for example, have been disclosed as prior arts of the pen tips that have a viewer portion allowing visual recognition in the writing direction.

1) In order to provide a writing implement which can be easily manufactured and is structured so that its writing part will not come into contact with the ruler, a writing implement has been disclosed which includes: a writing implement body extending in a predetermined direction; an ink feeder portion extending in the axial direction of the writing implement body for feeding the ink stored in the writing implement body; a writing part connected to the front-end side of the ink feeder portion to allow the writing body to deliver ink fed to the ink feeder portion; and a retainer composed of a holding part for holding the writing part and an attachment part to be fixed to the writing implement body, wherein the holding part is opened on the front-end side and formed, on at least one flank side of the holding part, with a wall portion arranged along the flank of the writing part in such a state that the front end of the writing part is projected to the front end side so as to allow writing with the writing body, the ink feeder portion and the writing part form a writing core having an approximately L-shape, and the retainer is equipped with a viewer portion that allows visual recognition in the writing direction during writing (see, for example, Patent Document 3).

2) In order to provide a writing implement that enables both visual recognition through a viewer portion and easy writing, a writing implement has been disclosed which includes: a writing implement body having an ink retainer for holding ink therein; a writing core having an ink feeder portion extending from the writing implement body toward the front end for feeding the ink from the ink retainer to the front end and a writing part arranged at the front end of the ink feeder portion; and a viewer portion arranged on the underside of the ink feeder portion between the writing part and the writing implement body, wherein the writing part has an abutment portion provided at an acute or obtuse angle with respect to the ink feeder portion so as to abut on a writing target and is specified to satisfy $(Z1/a)\times100\leq10.0$, where 'a' is the length from the lower end to the upper end of the abutment portion and 'Z1' is the distance between the line that passes through the center between the lower end and the upper end of the abutment portion and extends in the axial direction of the writing implement body and the line that passes through the center between the lower end of the writing part and the upper end of the viewer portion and extends in the axial direction. It has also been disclosed that the writing implement includes a core holder having a holding part for holding the ink feeder portion and the viewer portion, wherein when the vertical dimension of the part including the core holder and the writing core is defined as the pen tip width 'b', the relation, $(b/a)\times100\leq150$ holds, and the thickness t of the thin portion of the viewer portion satisfies $0.8\ mm\leq t\leq1.0\ mm$ ((see, for example, Patent Document 4).

3) In order to provide a writing implement that enables both visual recognition through a viewer portion and easy writing, a writing implement has been disclosed which includes: a writing implement body having an ink retainer for holding ink therein; an ink feeder portion extending from the writing implement body toward the front end for feeding the ink from the ink retainer to the front end; a writing part arranged at the front end of the ink feeder portion; and a viewer portion arranged between the writing part and the writing implement body, wherein the writing part has an abutment portion provided at an acute or obtuse angle with respect to the axial direction of the writing implement body so as to abut on a writing target, and the front endface of the writing implement body is inclined relative to the plane perpendicular to the axial direction so that the abatement portion and the front endface are substantially parallel to each other (see, for example, Patent Document 5).

However, each of the above writing implements described in Patent Documents 3 to 5 describes a technique close to the present disclosure, and mainly discloses an L-shaped pen core integrally formed of a writing part and an ink feeder portion formed on one side of the writing part. Since the ink feeder portion is not provided on the near side when writing, but on the far side (upper side), when, for example, the characters etc., printed on the paper surface are marked from left to right, the ink feeder portion crosses the characters located in the direction of drawing and hides part of the characters, giving rise to a problem of awkward writing.

Further, in each of the writing implements described in Patent Documents 4 and 5, deviation and other factors between the axial centerline of the writing part and that of the viewer portion arranged above the writing part are solved by numerically limiting based on specific inequalities so as to achieve both visual recognition through the viewer portion and ease of writing. However, the numerical ranges of the inequalities overlap with those of the existing pen tips with a viewer portion, and these inequalities etc. are not aimed at maximizing the effective area of the viewer portion by considering the shape, material, etc. of the ink feeder portion, its retaining structure, etc. That is, the technical idea (configuration and its advantage) is different from that of the present disclosure.

Furthermore, since the width (thickness) of the ink feeder portion in each of the writing implements described in Patent Documents 4 and 5 is 1.5 mm or greater in the examples, and the ink feeder portion is not located on the near side during writing, the width of the viewer portion results in being narrower than the width of the drawing line. That is, it is the current situation that a further improvement is awaited and that there is still a strong demand for a writing implement that can highly achieve maximization of the effective area of the viewer portion allowing visual recognition in the writing direction of the whole pen tip and ease of viewing through the viewer portion as well as ease of writing, concurrently.

PRIOR ART DOCUMENTS

Patent Documents

Patent Document 1:
Japanese Patent Application Laid-Open No. 2000-52682 (claims, FIG. 1, etc.)
Patent Document 2:
Japanese Patent Application Laid-Open No. 2019-206151 (claims, FIG. 3, etc.)
Patent Document 3:
Japanese Patent Application Laid-Open No. 2020-59247 (claims, FIG. 1, etc.)
Patent Document 4:
Japanese Patent Application Laid-Open No. 2020-196166 (claims, FIG. 4, etc.)
Patent Document 5:
Japanese Patent Application Laid-Open No. 2020-196246 (claims, FIG. 4, etc.)

SUMMARY OF THE INVENTION

Problems to be Solved by the Invention

The present disclosure intends to solve the above-described problems of the prior art, and it is an object of the invention to provide a writing implement having a pen tip that allows visual recognition in the writing direction, and more detailedly providing a writing implement that can highly achieve maximization of the effective area of the viewer portion allowing visual recognition in the writing direction and ease of viewing through the viewer portion as well as ease of writing, concurrently.

Means for Solving the Problem

As a result of intensive studies to solve the above-described conventional problems, the inventors hereof have found a writing implement equipped with a pen tip that feeds ink from the writing implement body and has a viewer portion allowing visual recognition in the writing direction and can satisfy the above object by providing specific configuration for the pen tip and fulfil the present disclosure.

Specifically, a writing implement of the present disclosure comprises a pen tip that feeds ink from a writing implement body and has a viewer portion allowing visual recognition in a writing direction, the pen tip is comprised of, at least, a writing part, a retainer having the viewer portion, and an ink feeder portion for feeding the ink from the writing implement body to the writing part, and the minimum width of the viewer portion is 3.7 mm or greater and a length of the viewer portion is 7.4 mm or greater.

The ink feeder portion is preferably arranged on one side of the viewer portion.

A writing implement of the present disclosure comprises a pen tip that feeds ink from a writing implement body and has a viewer portion allowing visual recognition in a writing direction, the pen tip is comprised of, at least, a writing part, a retainer having the viewer portion, and an ink feeder portion for feeding the ink from the writing implement body to the writing part, and the ink feeder portion is adapted to be positioned on a near side during writing.

A width of the ink feeder portion when viewed from a direction perpendicular to the viewer portion is preferably less than 1.5 mm or smaller.

It is preferable that the ink feeder portion is comprised of a fiber bundle core having a rectangular cross section or an elliptical cross section, the writing part is comprised of a resin sintered body, and the ink feeder portion and the writing part are fixed to the retainer while the ink feeder portion and the writing part are fixed in abutment with each other.

Advantages of the Invention

According to the present disclosure, provided is a writing implement that achieves both maximization of an effective area of the viewer portion that allows the visual recognition in the writing direction, ease of viewing therethrough and also ease of writing at a high level, concurrently.

The objects and advantages of the present disclosure may be realized and obtained particularly by using the constituents defined in the claims and their combinations. Both the foregoing general description and the following detailed description are exemplary and explanatory and should not limit the disclosure recited in the claims.

Drawings of a writing implement showing an embodied example of the present disclosure, (a) a front view, (b) a plan view, (c) a longitudinal cross section viewed from front, and (d) a longitudinal cross section of (b).

FIG. 2

Figure 1:
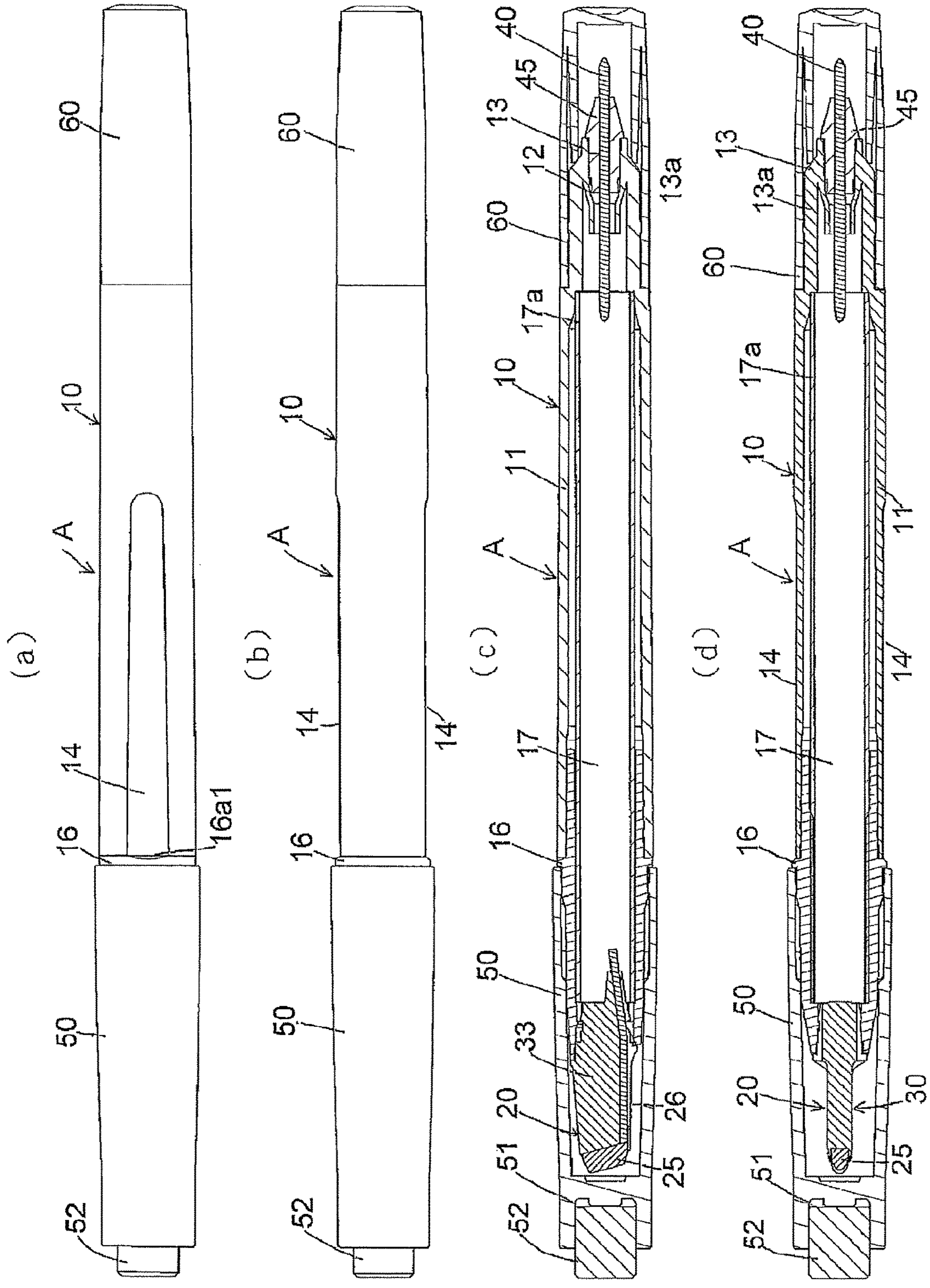
FIG. 1

Drawings showing the writing implement of FIG. 1 with its cap removed, (a) a plan view, (b) a left-side view, (c) a front view, (d) a right-side view, (e) a bottom view, (f) a longitudinal cross section of (c), and (g) a longitudinal cross section of (e).

FIG. 3

Partially enlarged drawings showing the pen tip side, which is the essential part of the writing implement of FIG. 1, (a) a front view and (b) a longitudinal cross section thereof.

FIG. 4

Figure 3:
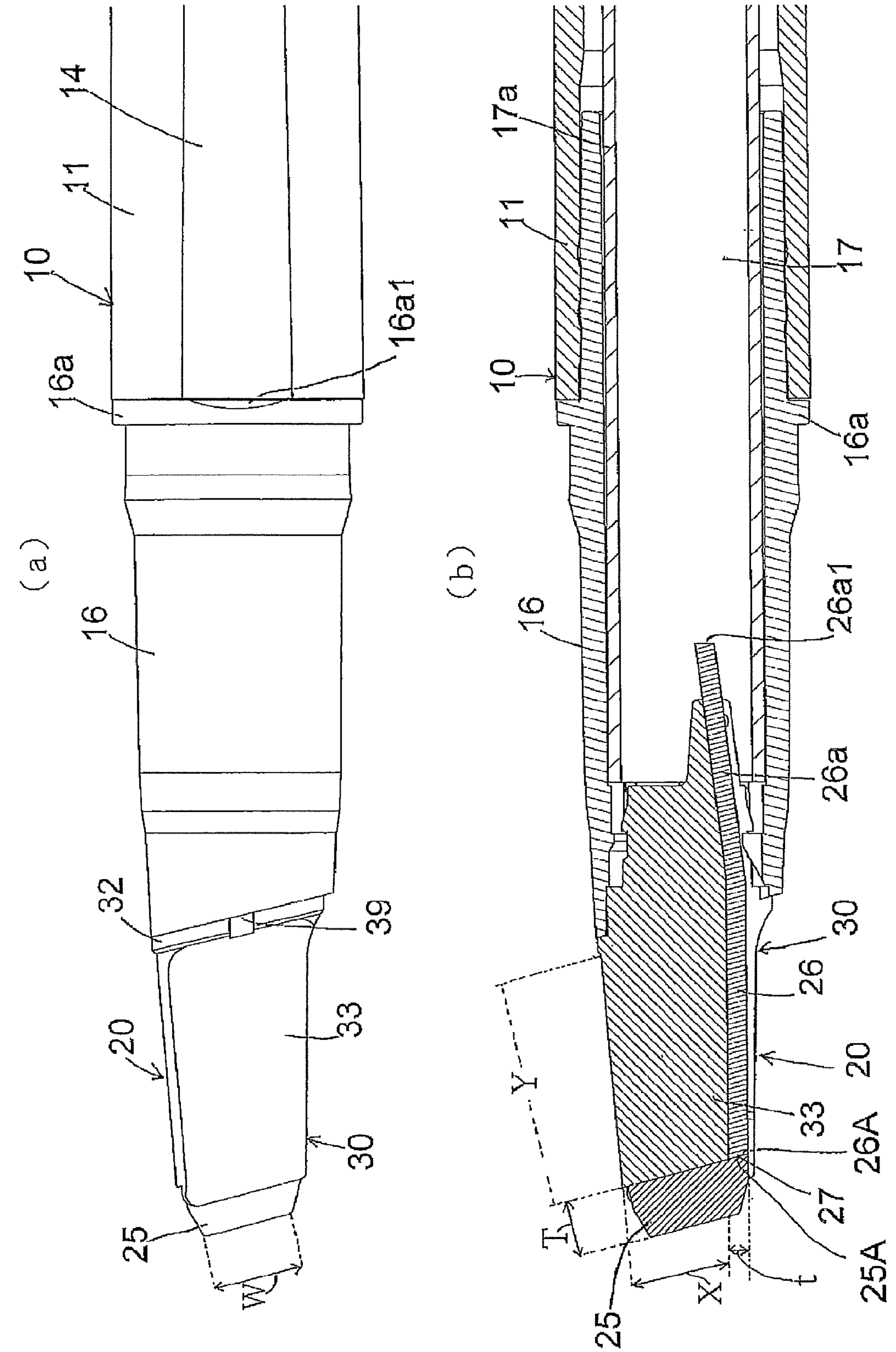
Figure 4:
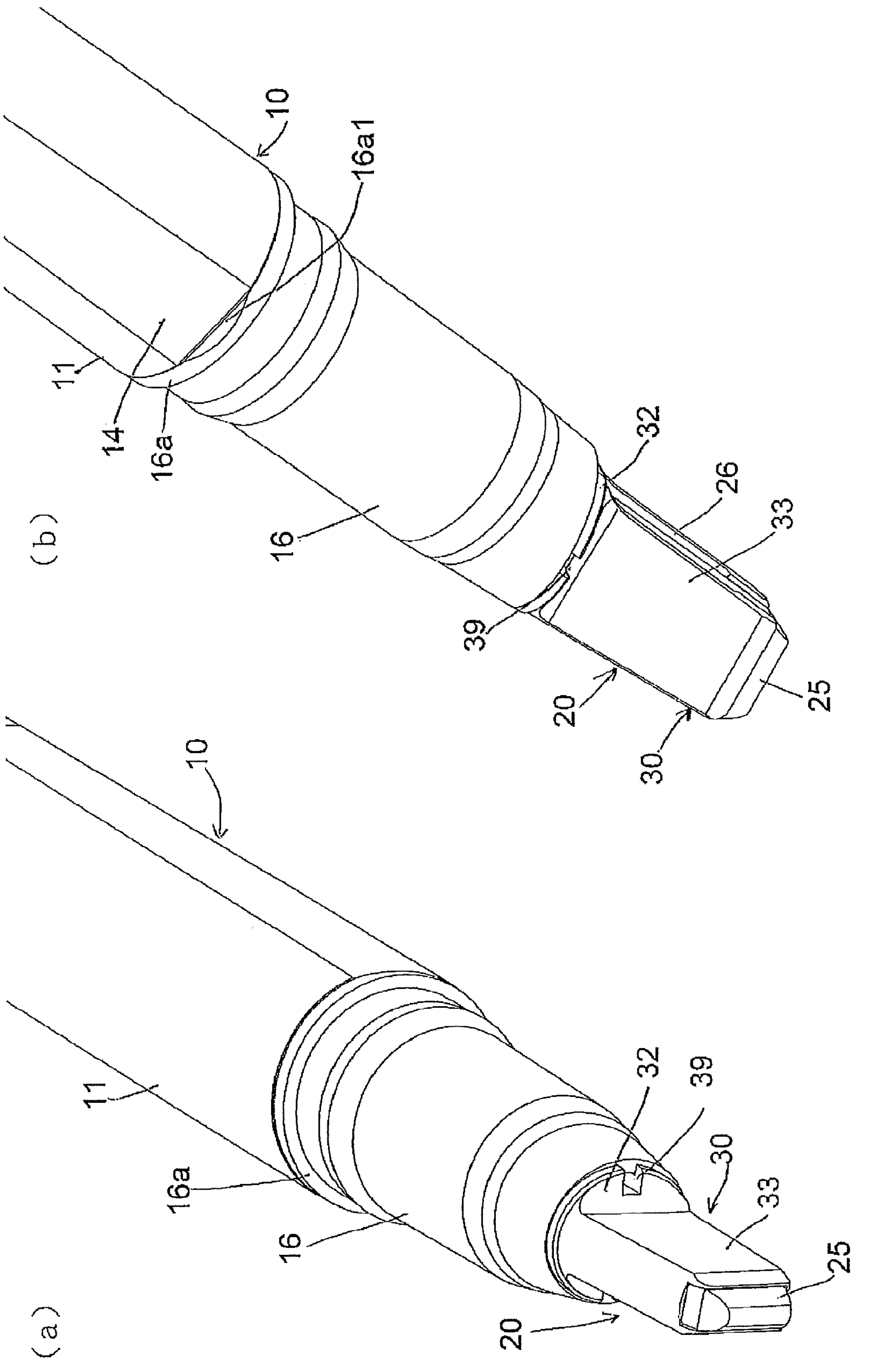
Figure 5:
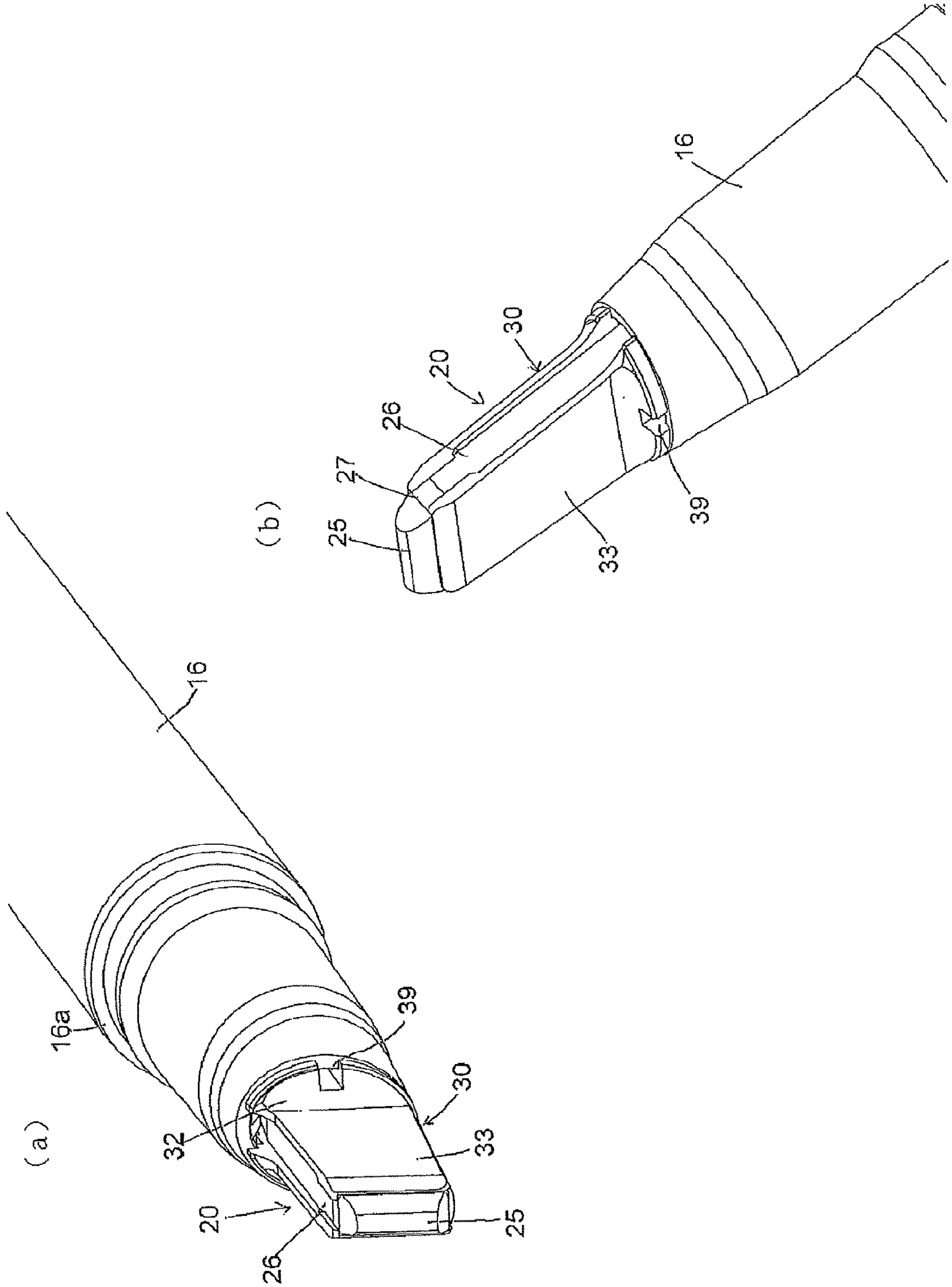
Figure 6:
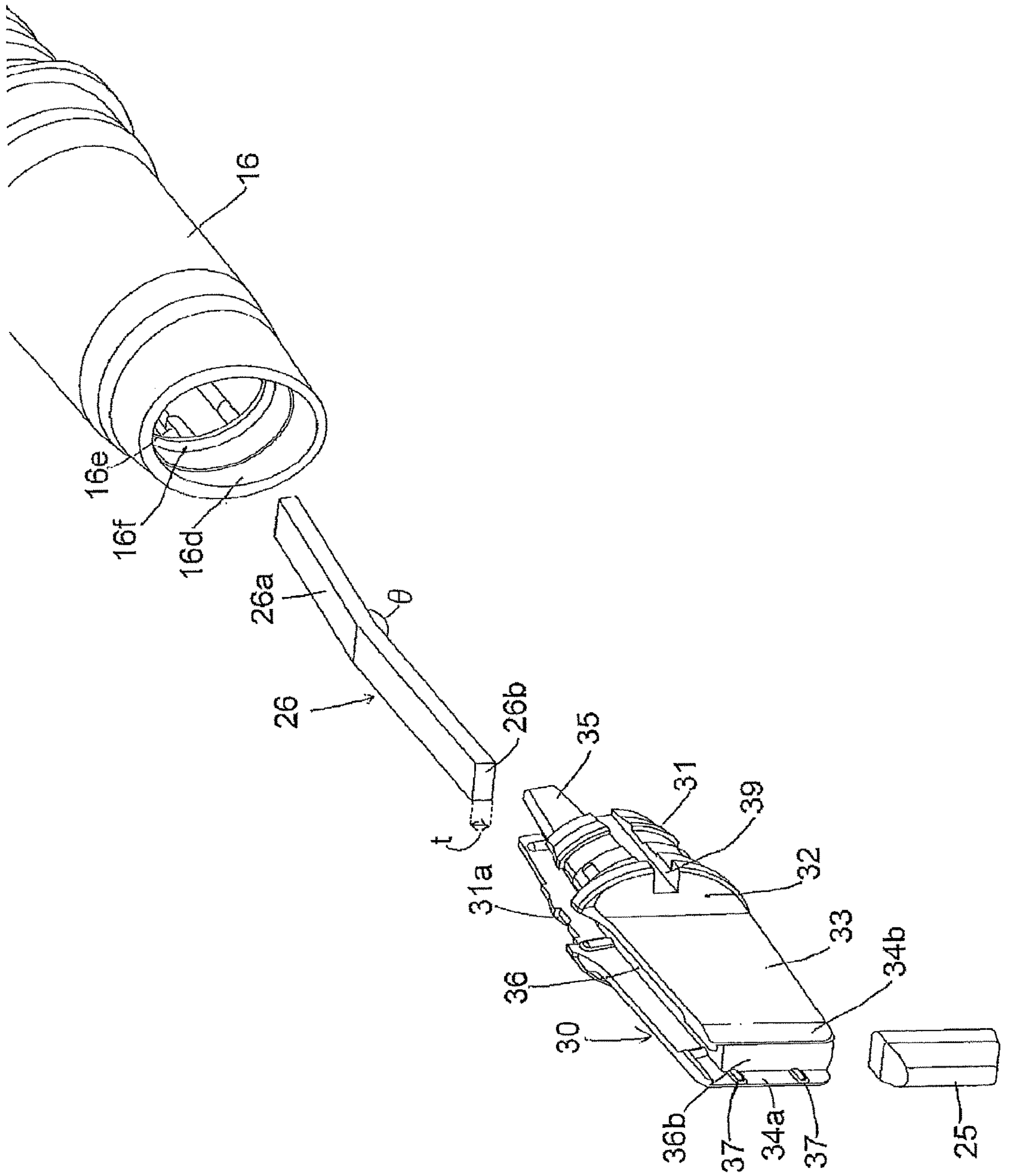

(a) a perspective view of the pen tip of the writing implement of FIG. 3 as seen from the front side, and (b) a perspective view of the pen tip as seen from the rear side.

FIG. 5

Partial enlarged drawings showing the pen tip of the writing implement in FIG. 3 rotated 180°, (a) a perspective view seen from the front side, and (b) a perspective view of the pen tip seen from the rear side.

FIG. 6

An exploded perspective view showing an example of how an ink feeder portion and a writing part constituting the pen tip of the writing implement of FIG. 1 are attached to a retainer, and how the retainer is attached to a front barrel.

FIG. 7

Drawings showing an example of a writing implement body (barrel cylinder), (a) a perspective view seen from the front side, (b) a plan view, (c) a left-side view, (d) a front view, (e) a right-side view, and (f) a longitudinal cross-section.

FIG. 8

Drawings showing an example of a front barrel used for a writing implement, (a) a perspective view seen from the front side, (b) a plan view, (c) a left-side view, (d) a front view, (e) a right-side view, (f) an enlarged perspective view showing an inclined opening of the front barrel on the front side, (g) a longitudinal cross-section, (h) a perspective view seen from the rear side, and (i) a bottom view.

FIG. 9

Drawings showing an example of a retainer having a viewer portion of a pen tip used for a writing implement, (a) a perspective view seen from the front side, (b) a plan view, (c) is a perspective view seen from the rear side, (d) a left-side view, (e) a front view, (f) a right-side view, (g) a perspective view seen from above on the front side, (h) a longitudinal cross-section, (i) a perspective view seen from above on the rear side, and (j) a bottom view.

FIG. 10

Diagrams illustrating an example of the usage of the writing implement of the present disclosure, (a) an illustration for explaining how clearly a character of a font size with 10.5 points can be recognized through the viewer portion from above when the pen is used at a writing angle of 60°, thanks to a viewer portion remarkably wider than the conventional one, (b) a perspective view showing an example where actually printed characters are being marked.

FIG. 11

Figure 2:
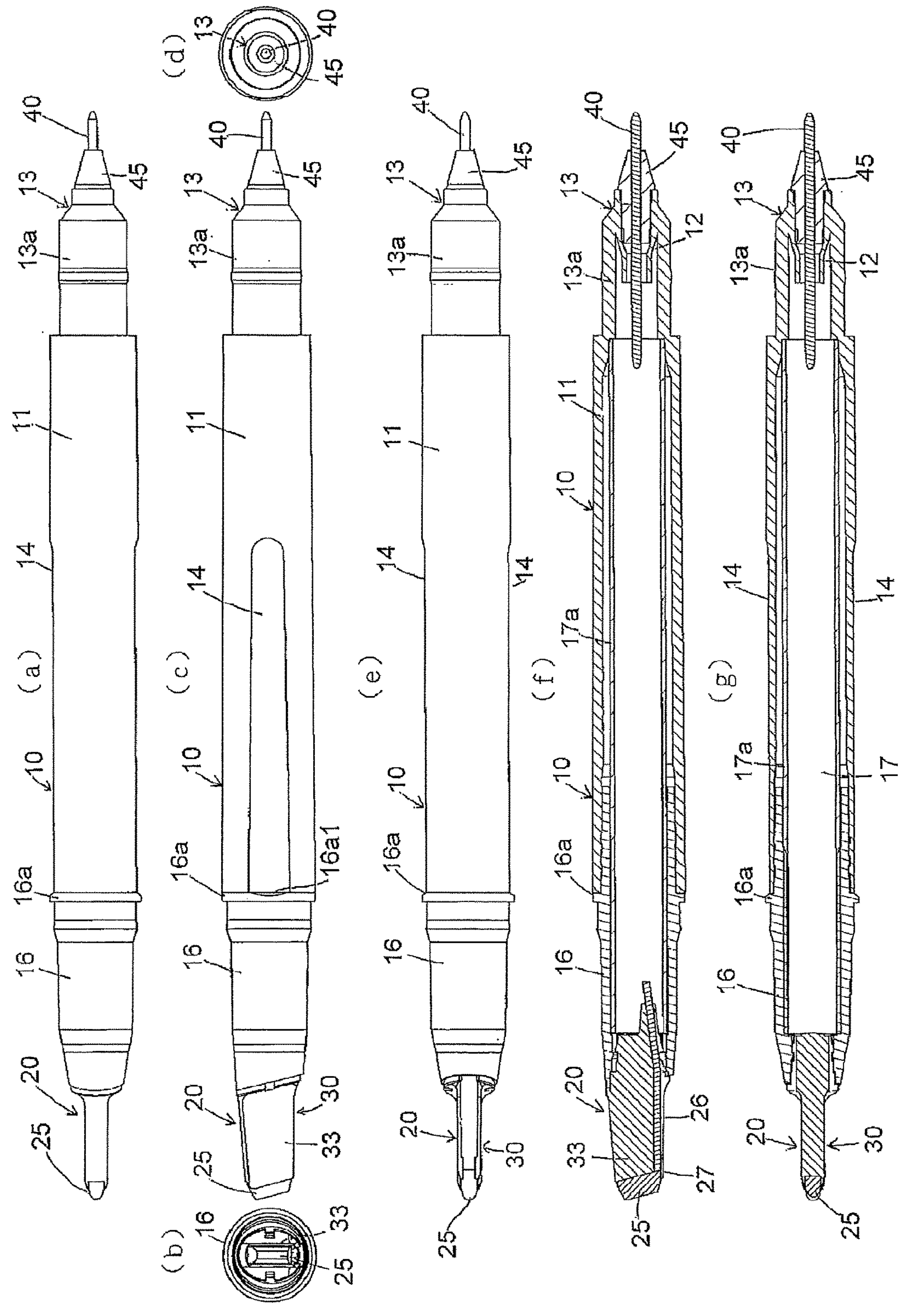

Drawings (drawings showing a state with its cap removed, in conformity to FIG. 2) of a writing implement showing another embodied example (the second embodiment) of the present disclosure, (a) a plan view, (b) a left-side view, (c) a front view, (d) a right-side view, (e) a bottom view, (I) a longitudinal cross section of (c), and (g) a longitudinal cross section of (e).

FIG. 12

Figure 11:
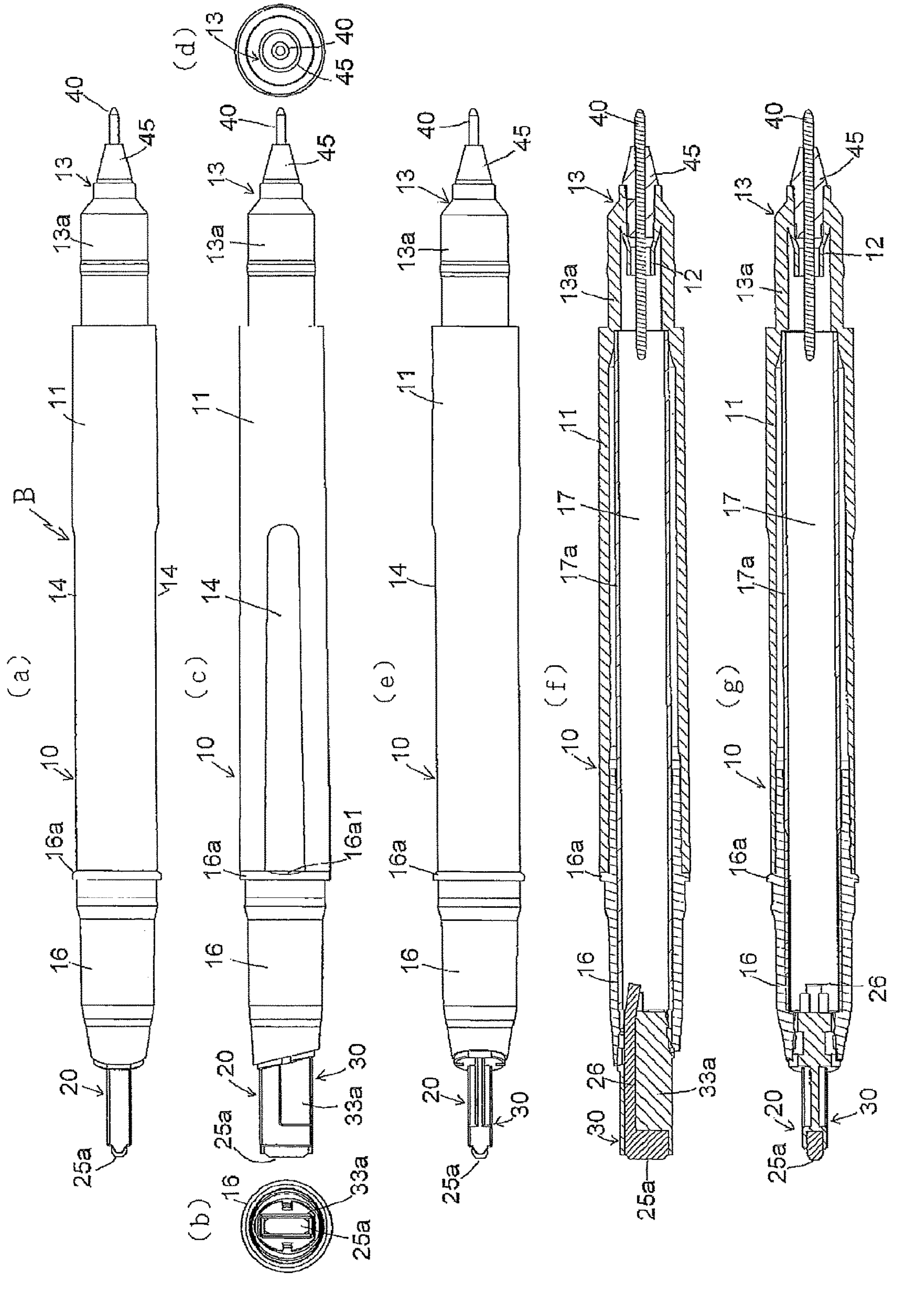

(a) a perspective view of the pen tip of the writing implement of FIG. 11 as seen from the front side, and (b) a perspective view of the pen tip as seen from the rear side.

FIG. 13

Figure 12:
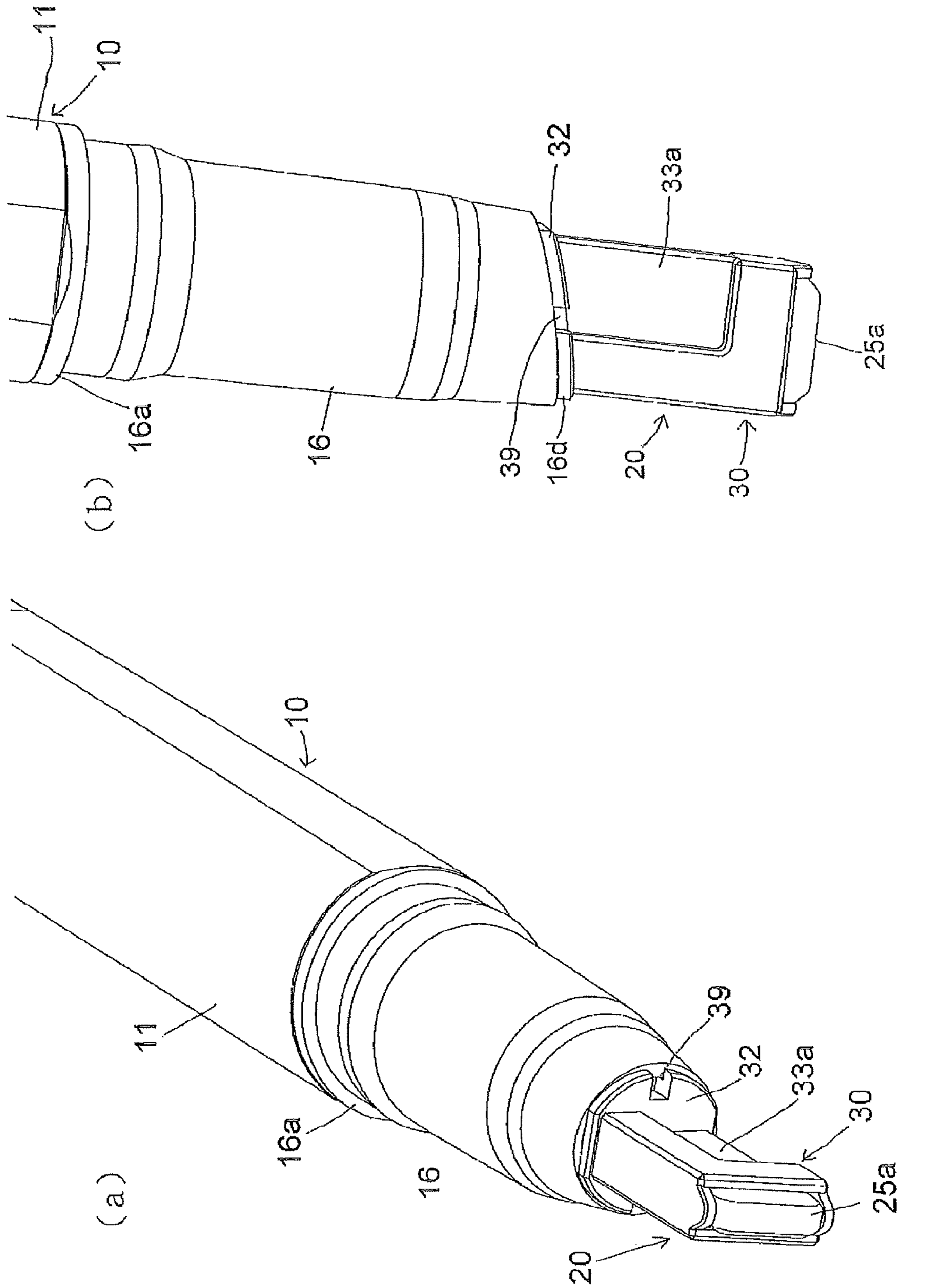

Drawings showing the pen tip of the writing implement in FIG. 12 rotated 180°, (a) a perspective view seen from the front side, and (b) a perspective view of the pen tip seen from the rear side.

FIG. 14

Figure 13:
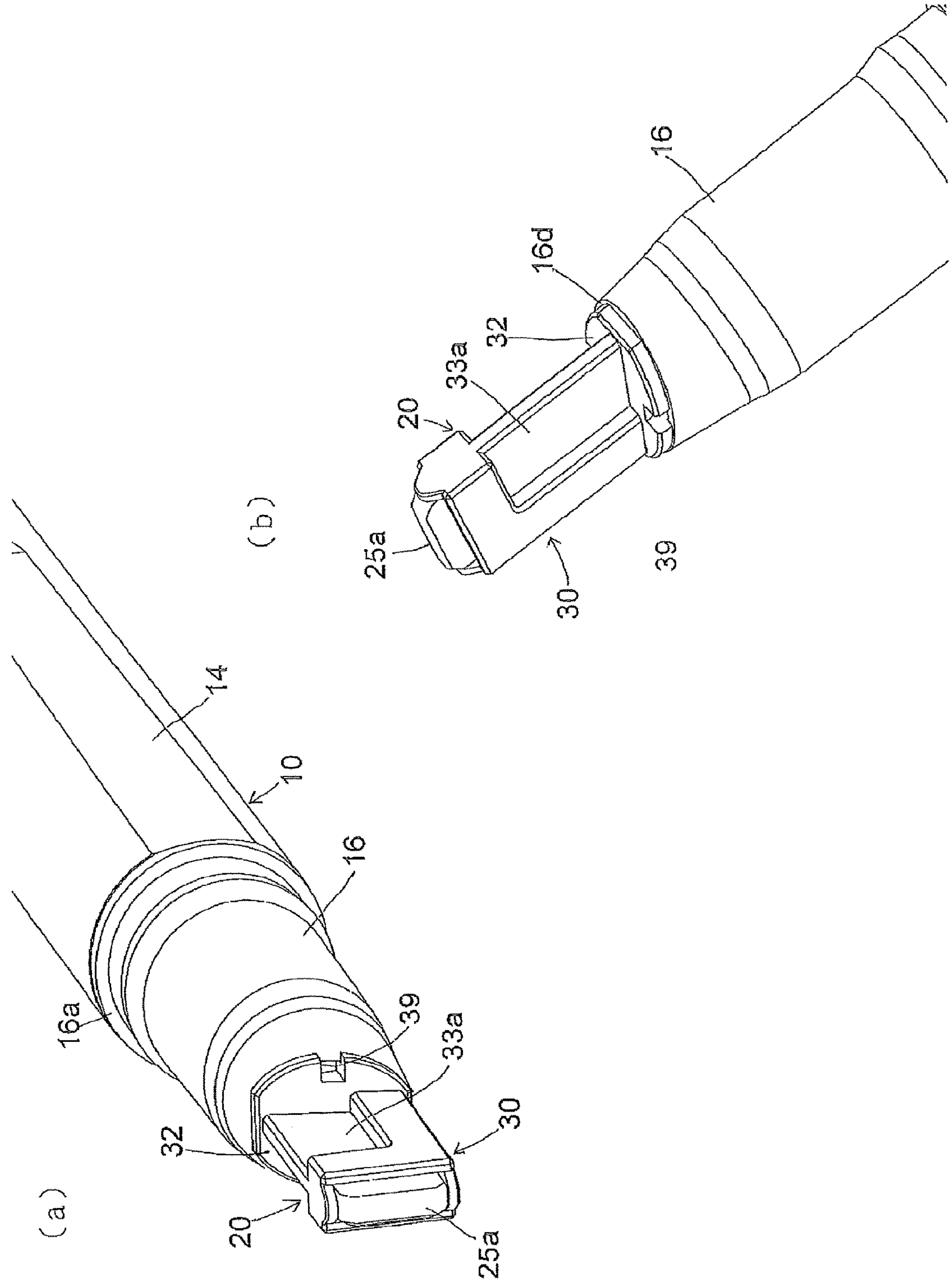

Drawings showing a pen tip portion of the writing implement of FIGS. 11 to 13, (a) a longitudinal cross section cut on the center plane in the width direction, (b) a plan view, (c) a perspective view seen from the front side; (d) a left-side view, (e) a front view, (f) a right-side view, and (g) a bottom view.

FIG. 15

Drawings (drawings showing a state with its cap removed, in conformity to FIGS. 2 and 11) of a writing implement showing another embodied example (the third embodiment) of the present disclosure, (a) a plan view, (b) a left-side view, (c) a front view, (d) a right-side view, (e) a bottom view, and (f) a longitudinal cross section of (c).

FIG. 16

Figure 15:
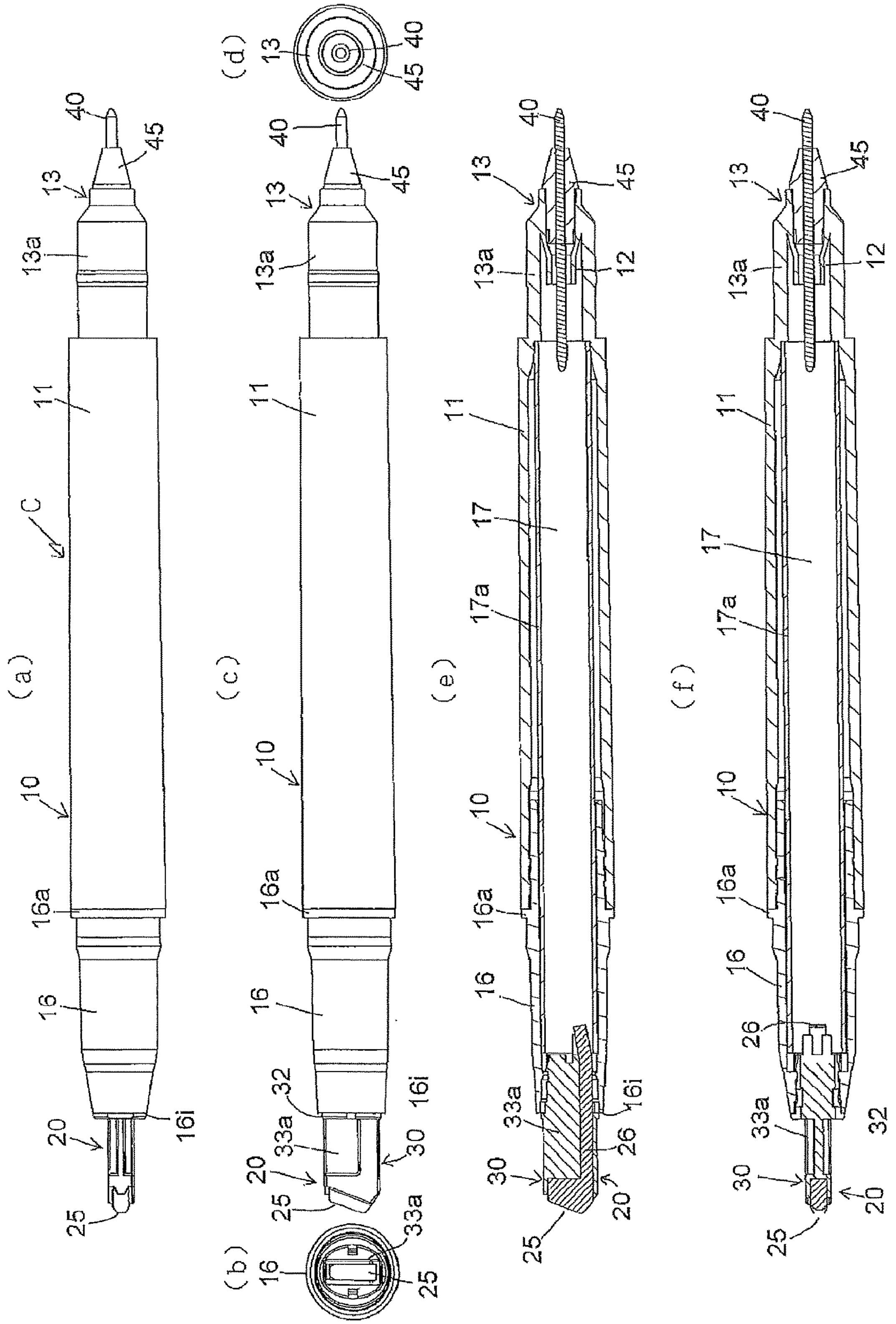

(a) a perspective view of the pen tip of the writing implement of FIG. 15 as seen from the front side, and (b) a perspective view of the pen tip as seen from the rear side.

FIG. 17

Figure 16:
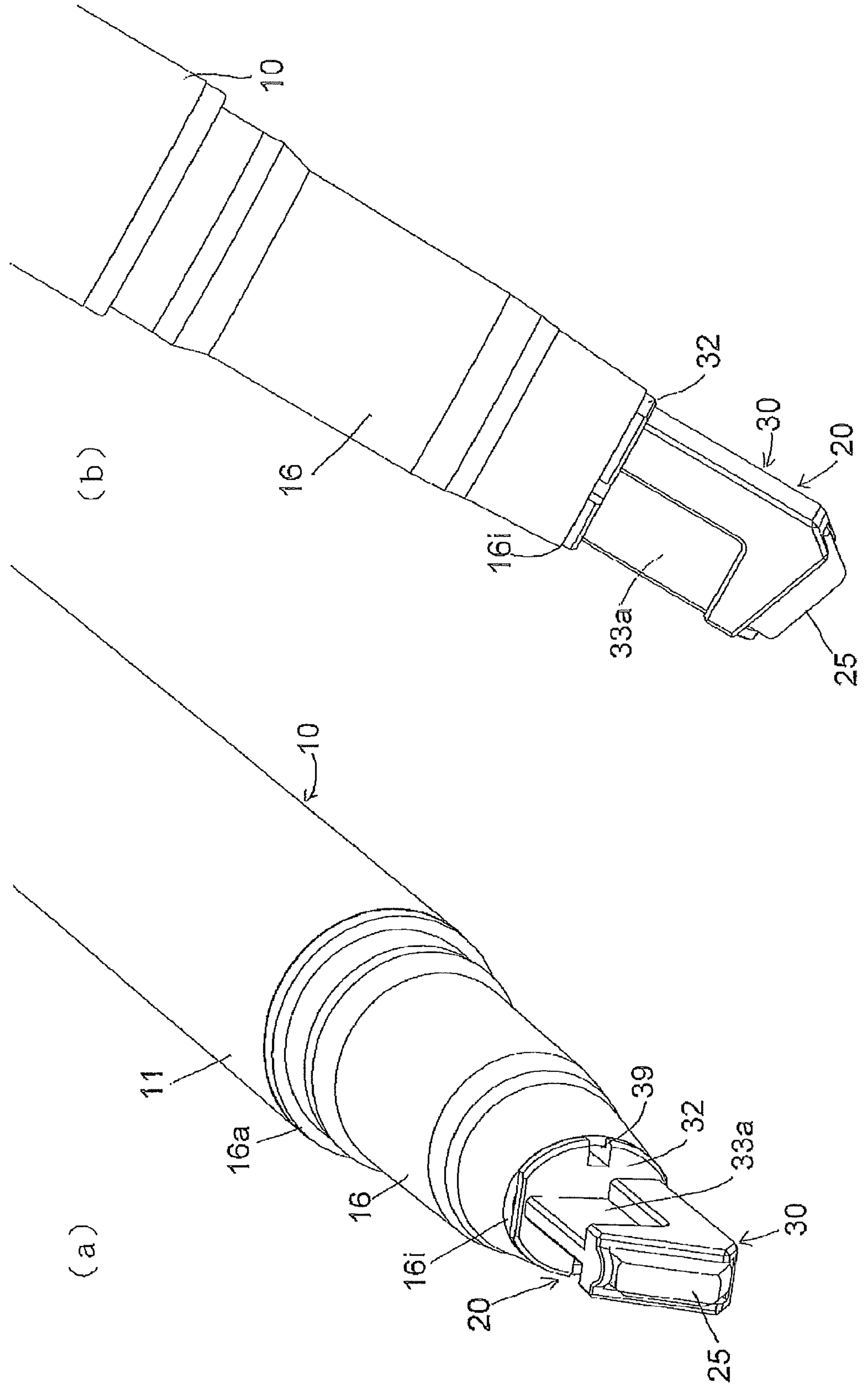

Drawings showing the pen tip of the writing implement in FIG. 16 rotated 180°, (a) a perspective view seen from the front side, and (b) a perspective view of the pen tip seen from the rear side.

FIG. 18

Figure 17:
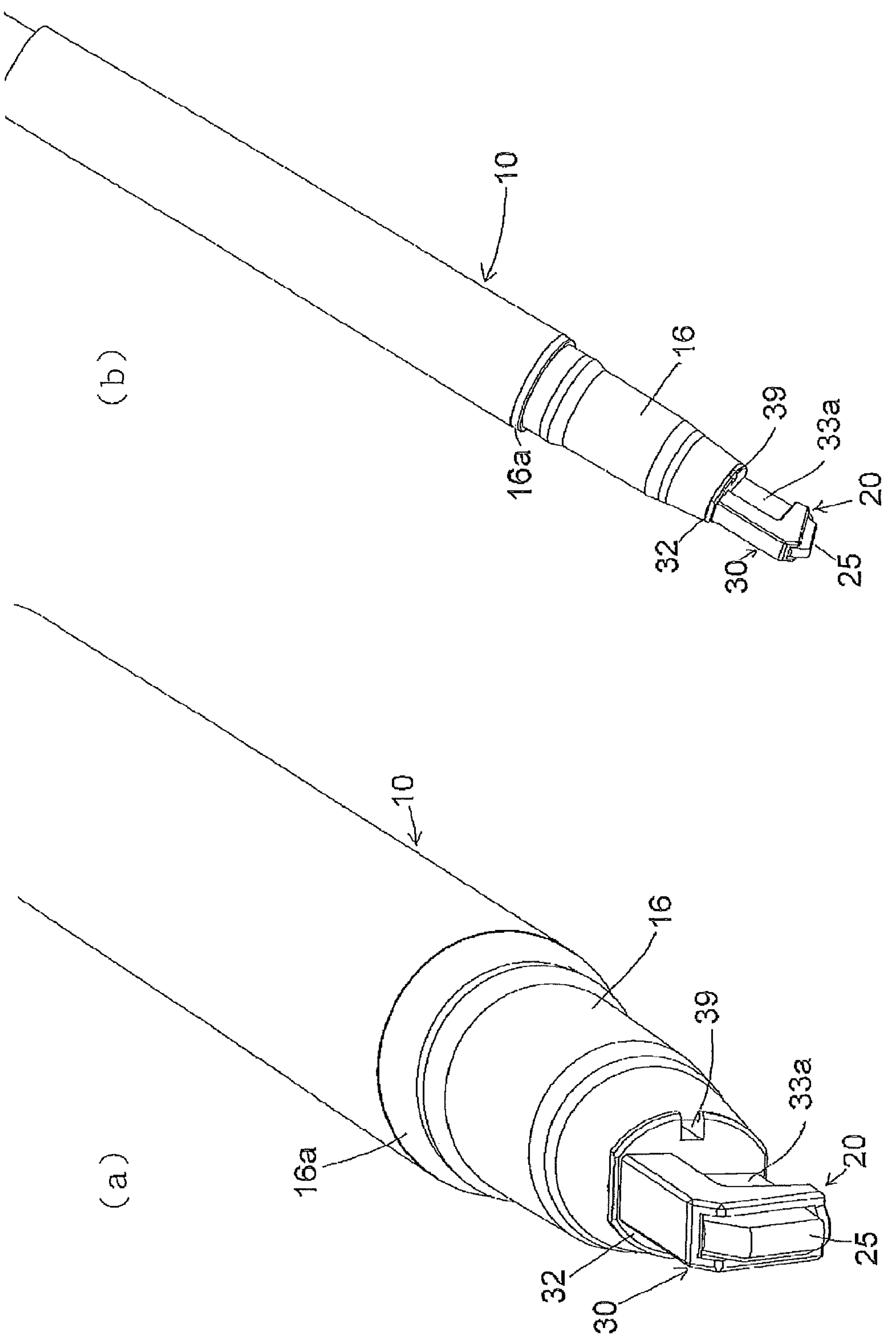

Drawings showing a pen tip portion of the writing implement of FIGS. 15 to 17, (a) a longitudinal cross section cut on the center plane in the width direction, (b) a plan view, (c) a perspective view seen from the front side; (d) a left-side view, (e) a front view, (f) a right-side view, and (g) a bottom view.

FIG. 19

Drawings (drawings showing a state with its cap removed, in conformity to FIGS. 2, 11 and 15) of a writing implement showing another embodied example (the fourth embodiment) of the present disclosure, (a) a plan view, (b) a left-side view, (c) a front view, (d) a right-side view, (e) a bottom view, (f) a longitudinal cross section of (c), and (g) a longitudinal cross section of (e).

FIG. 20

Figure 18:
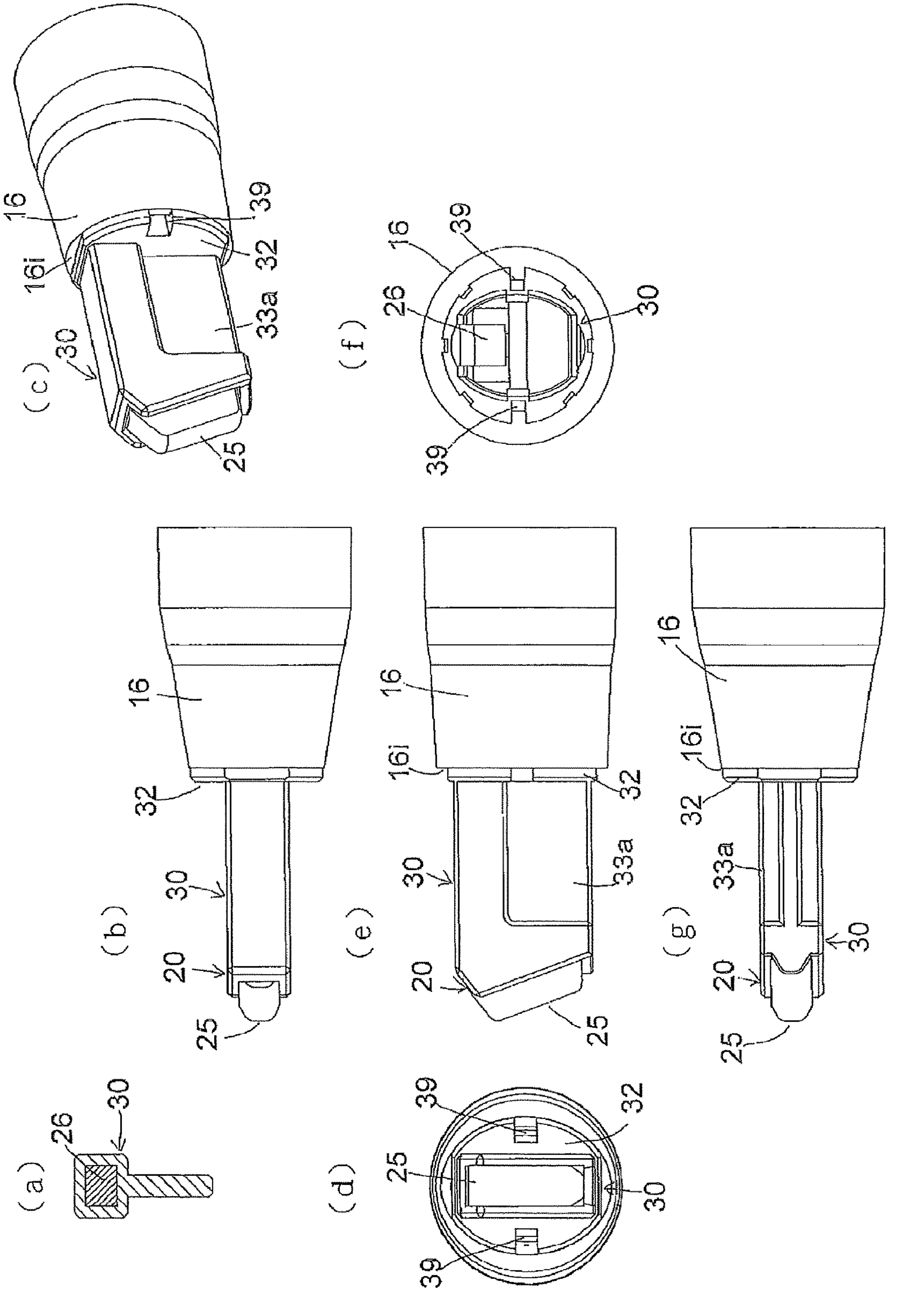

(a) a perspective view of the pen tip of the writing implement of FIG. 18 as seen from the front side, and (b) a perspective view of the pen tip as seen from the rear side.

FIG. 21

Figure 20:
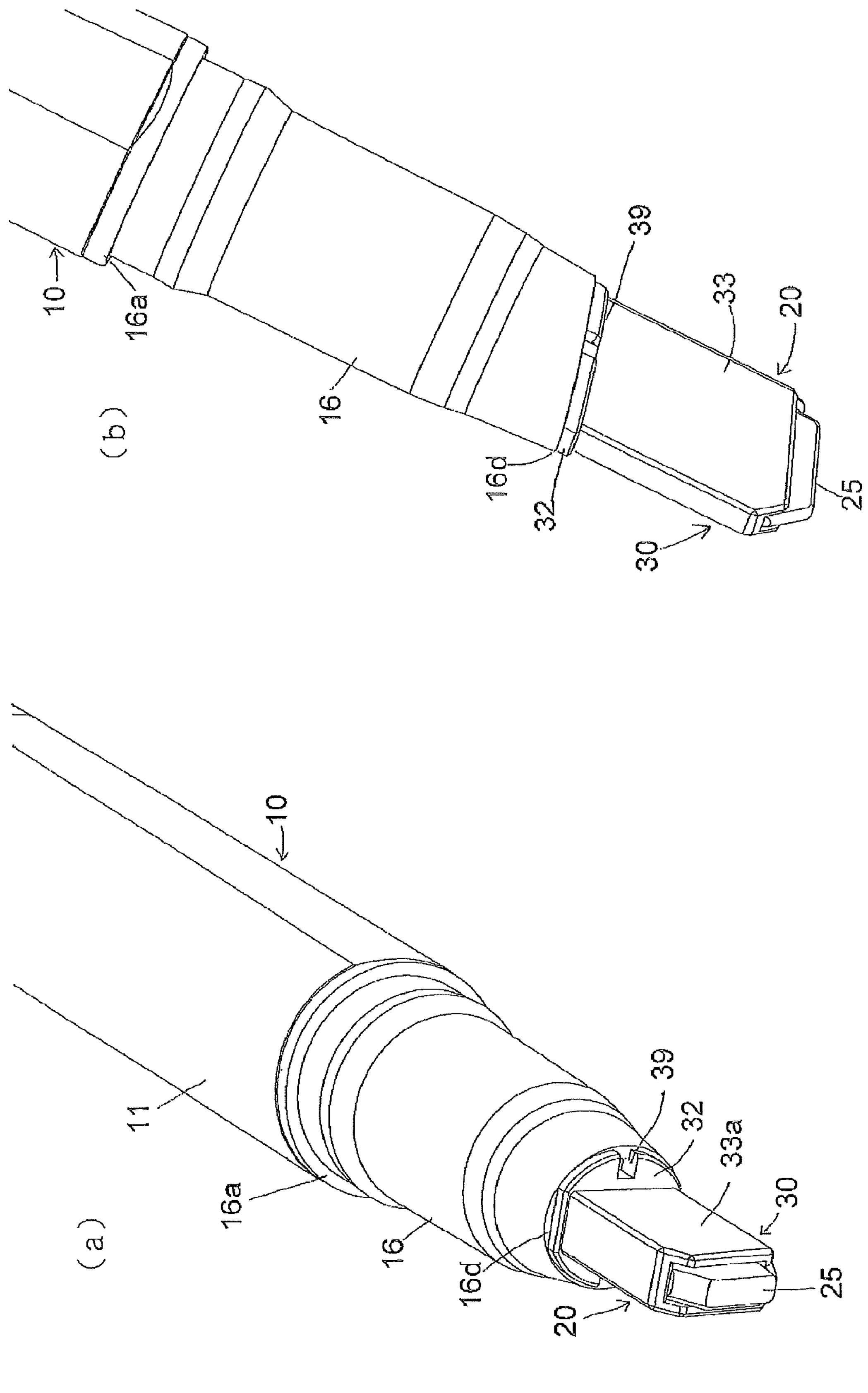

Drawings showing the pen tip of the writing implement in FIG. 20 rotated 180°, (a) a perspective view seen from the front side, and (b) a perspective view of the pen tip seen from the rear side.

FIG. 22

Figure 19:
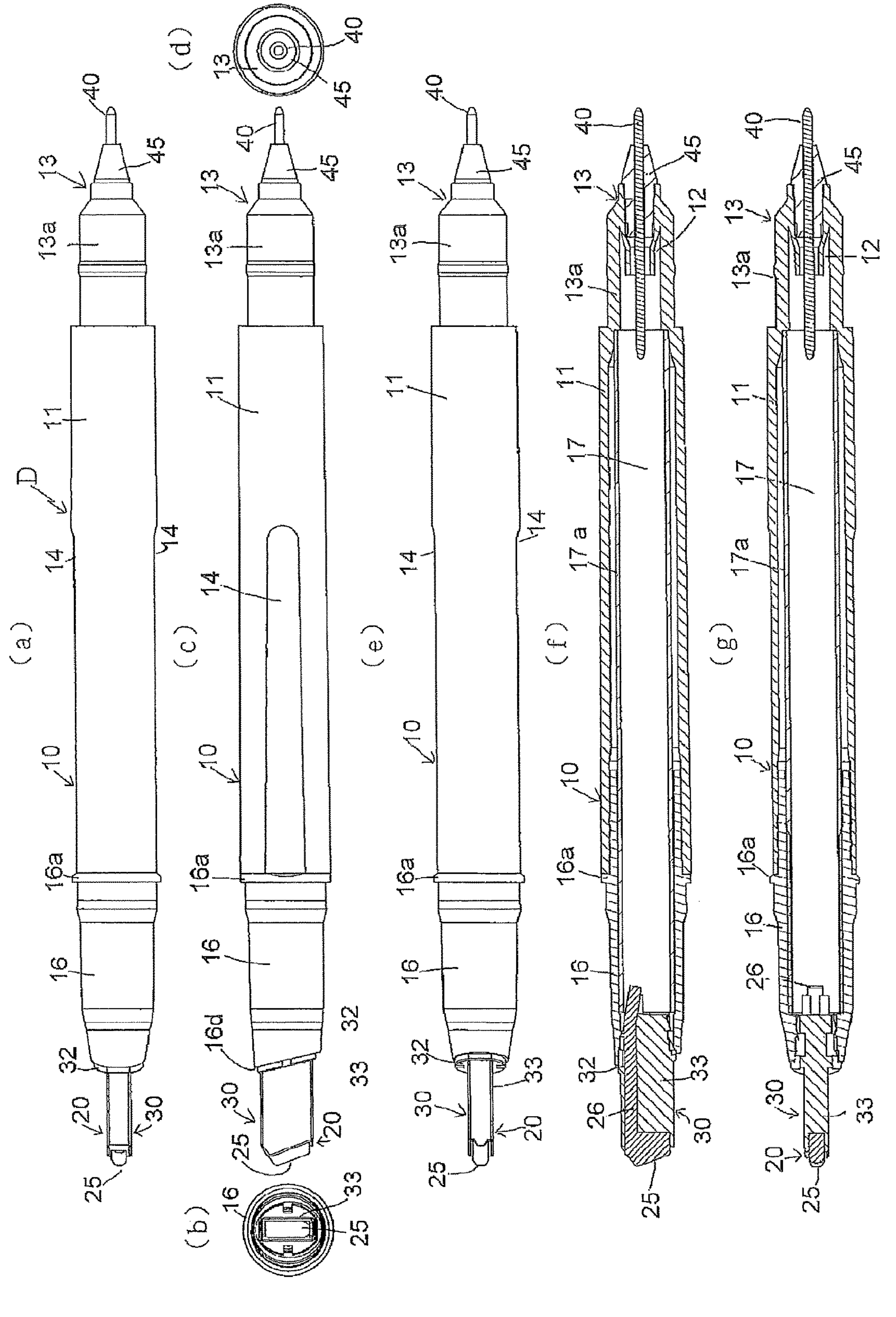
Figure 21:
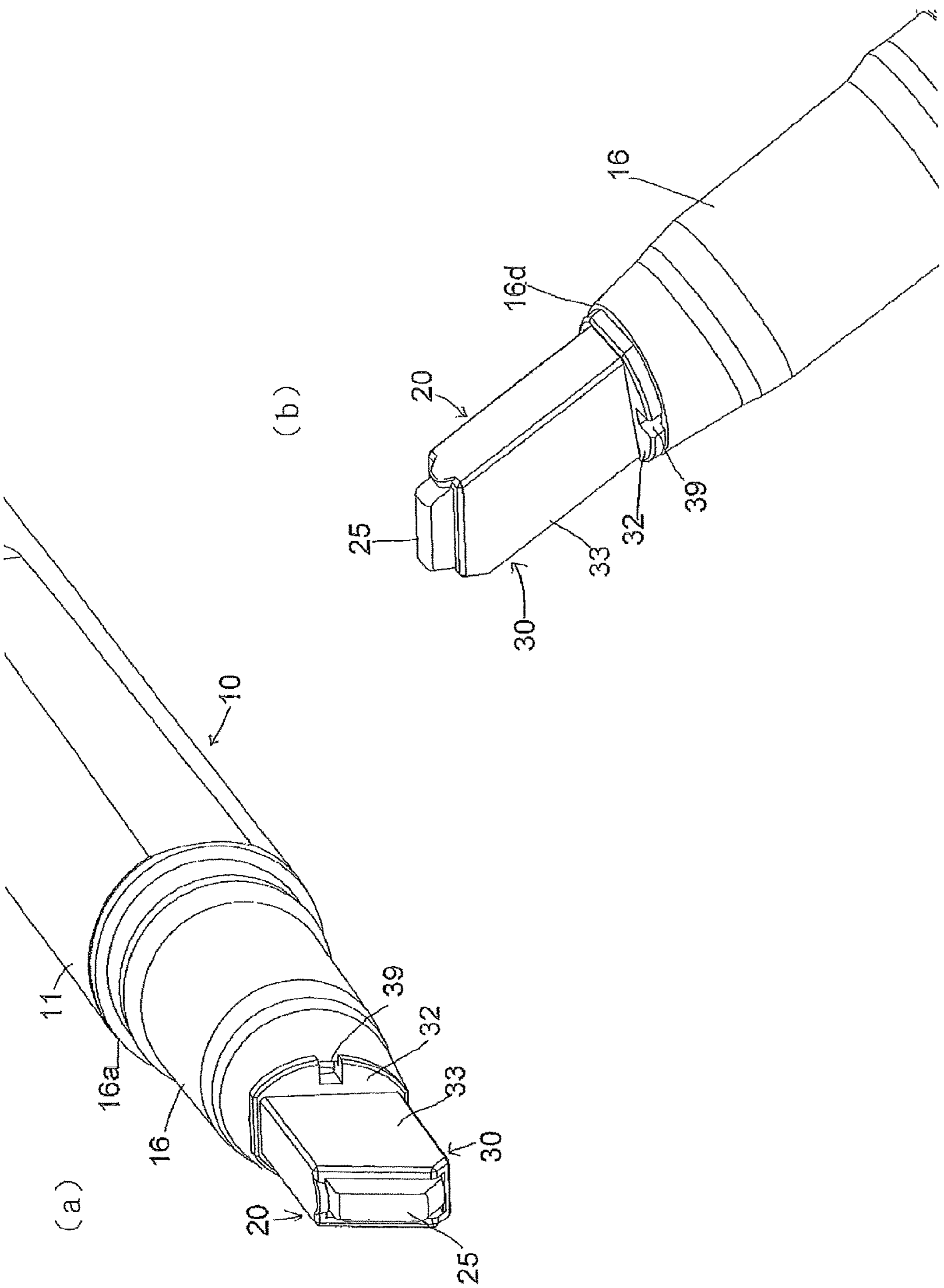

Drawings showing a pen tip portion of the writing implement of FIGS. 19 to 21, (a) a longitudinal cross section cut on the center plane in the width direction, (b) a plan view, (c) a perspective view seen from the front side; (d) a left-side view, (e) a front view, (f) a right-side view, and (g) a bottom view.

FIG. 23

Drawings (drawings showing a state with its cap removed, in conformity to FIGS. 2, 11, 15 and 19) of a writing implement showing another embodied example (the fifth embodiment) of the present disclosure, (a) a plan view, (b) a left-side view, (c) a front view, (d) a right-side view, (e) a bottom view, (f) a longitudinal cross section of (c), and (g) a longitudinal cross section of (e).

FIG. 24

Figure 23:
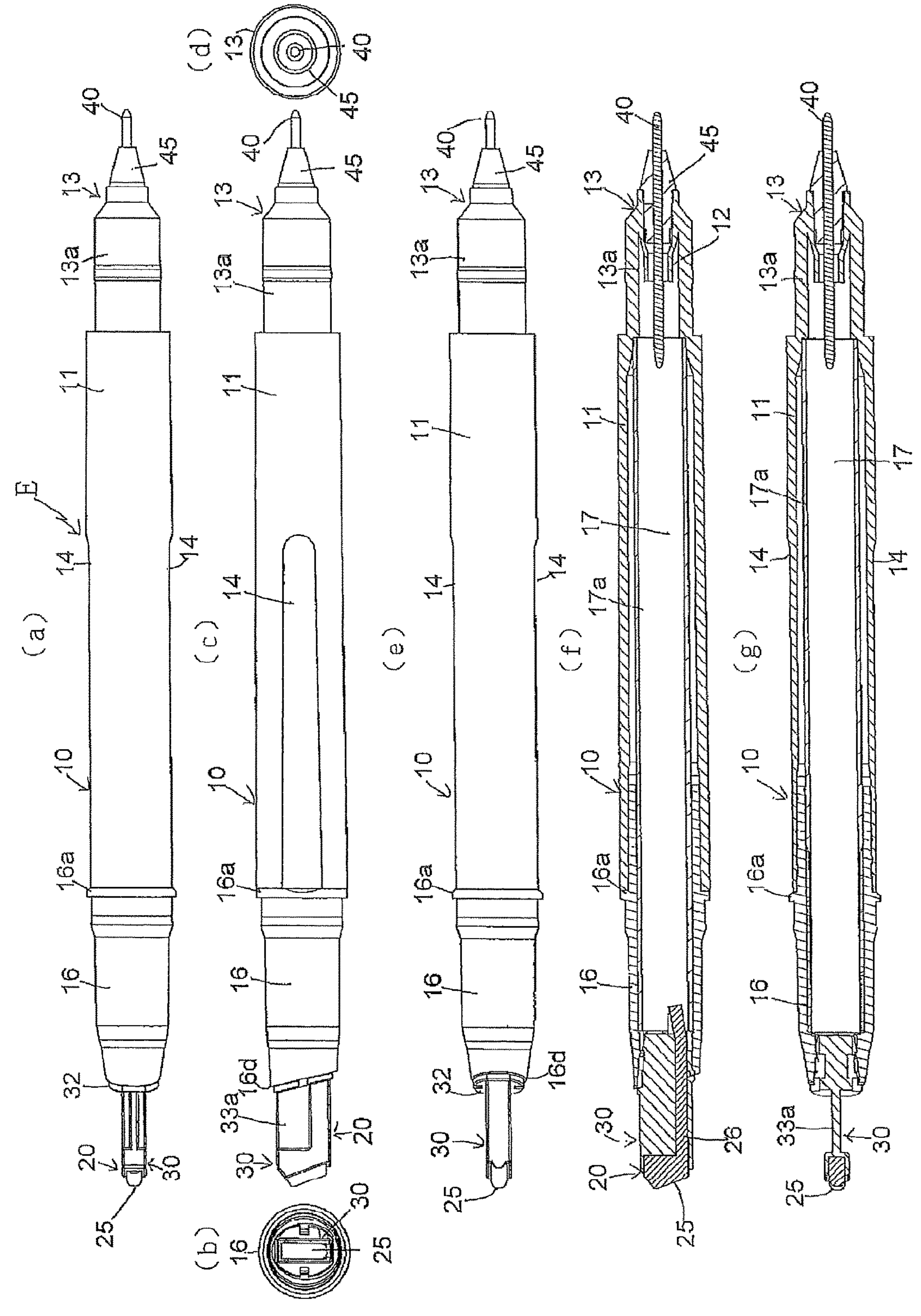

(a) a perspective view of the pen tip of the writing implement of FIG. 23 as seen from the front side, and (b) a perspective view of the pen tip as seen from the rear side.

FIG. 25

Figure 24:
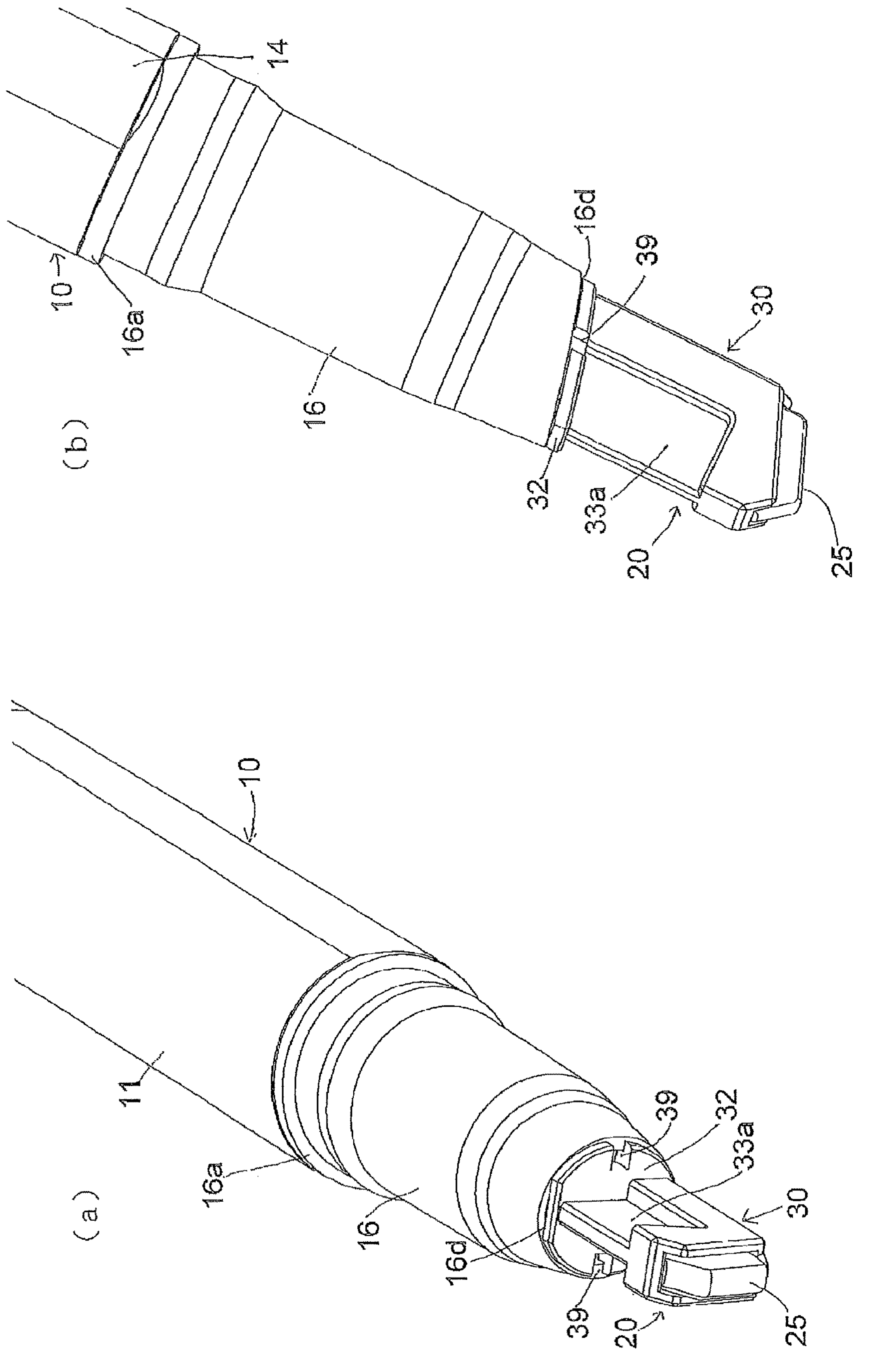

Drawings showing the pen tip of the writing implement in FIG. 24 rotated 180°, (a) a perspective view seen from the front side, and (b) a perspective view of the pen tip seen from the rear side.

FIG. 26

Figure 25:
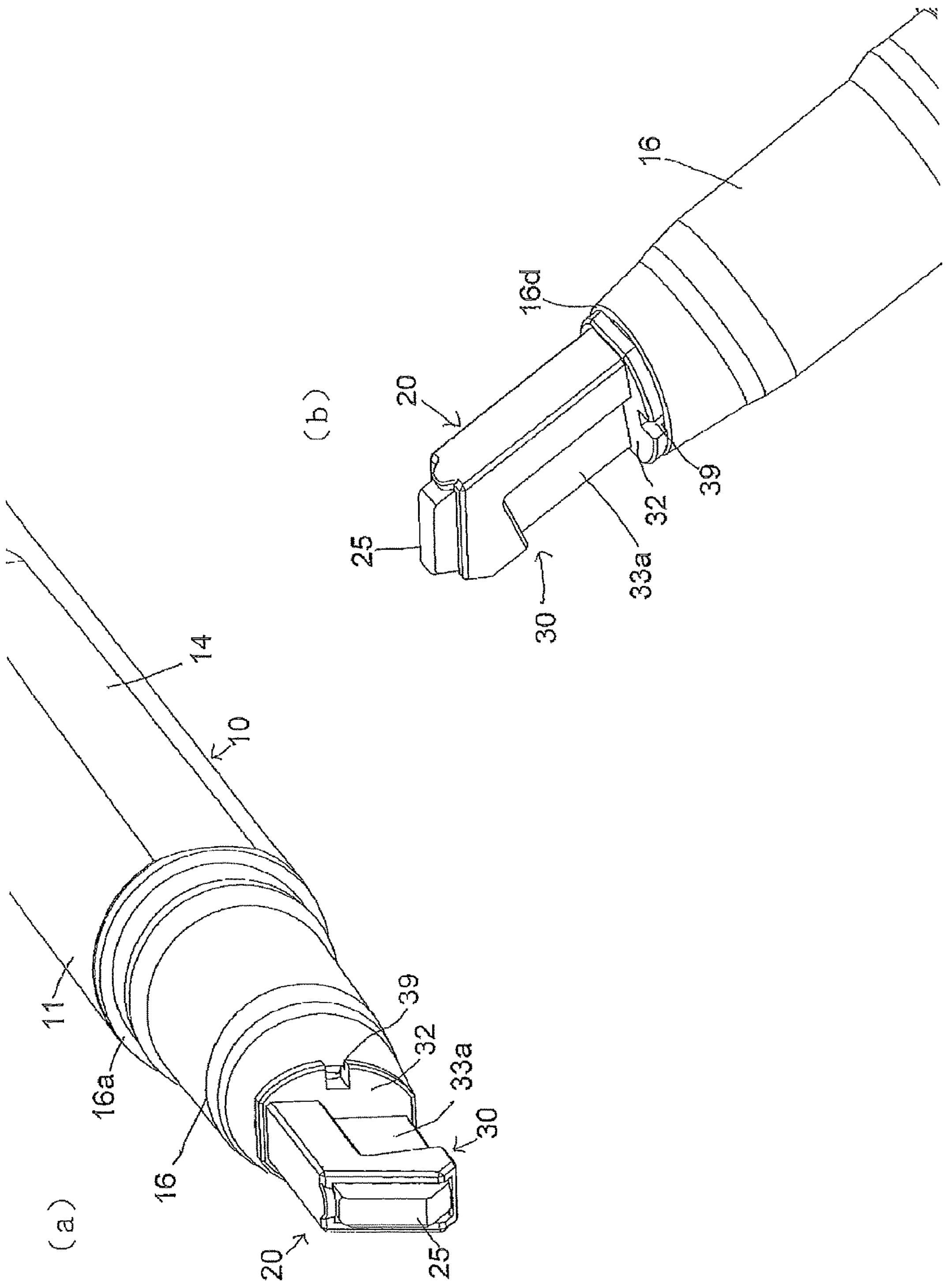

Drawings showing a pen tip portion of the writing implement of FIGS. 23 to 25, (a) a longitudinal cross section cut on the center plane in the width direction, (b) a plan view, (c) a perspective view seen from the front side; (d) a left-side view, (e) a front view, (f) a right-side view, and (g) a bottom view.

FIG. 27

Drawings (drawings showing a state with its cap removed, in conformity to FIGS. 2, 11, 15, 19 and 23) of a writing implement showing another embodied example (the sixth embodiment) of the present disclosure, (a) a plan view, (b) a left-side view, (c) a front view, (d) a right-side view, (e) a bottom view, and (f) a longitudinal cross section of (c).

FIG. 28

Figure 27:
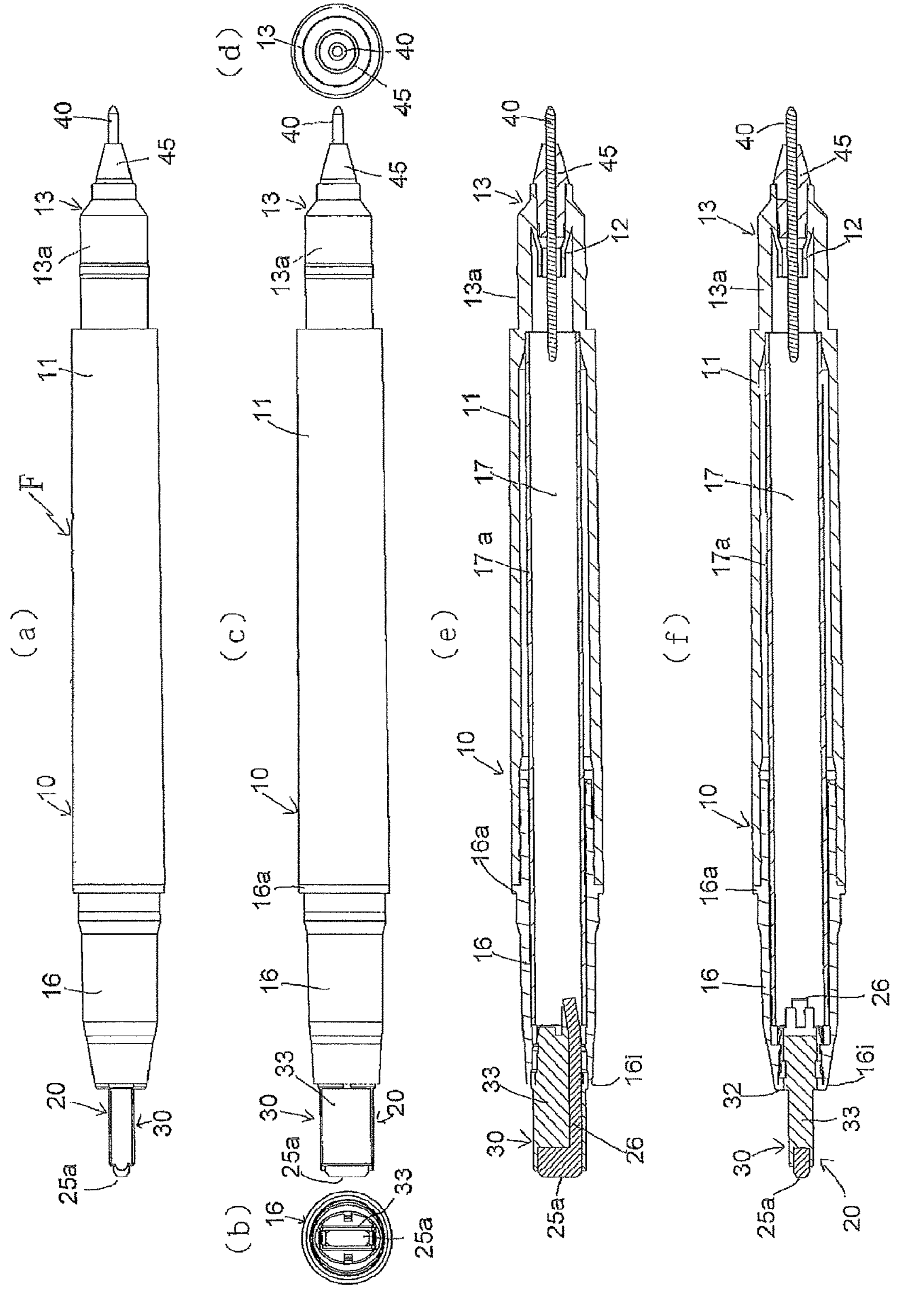

(a) a perspective view of the pen tip of the writing implement of FIG. 27 as seen from the front side, and (b) a perspective view of the pen tip as seen from the rear side.

FIG. 29

Figure 28:
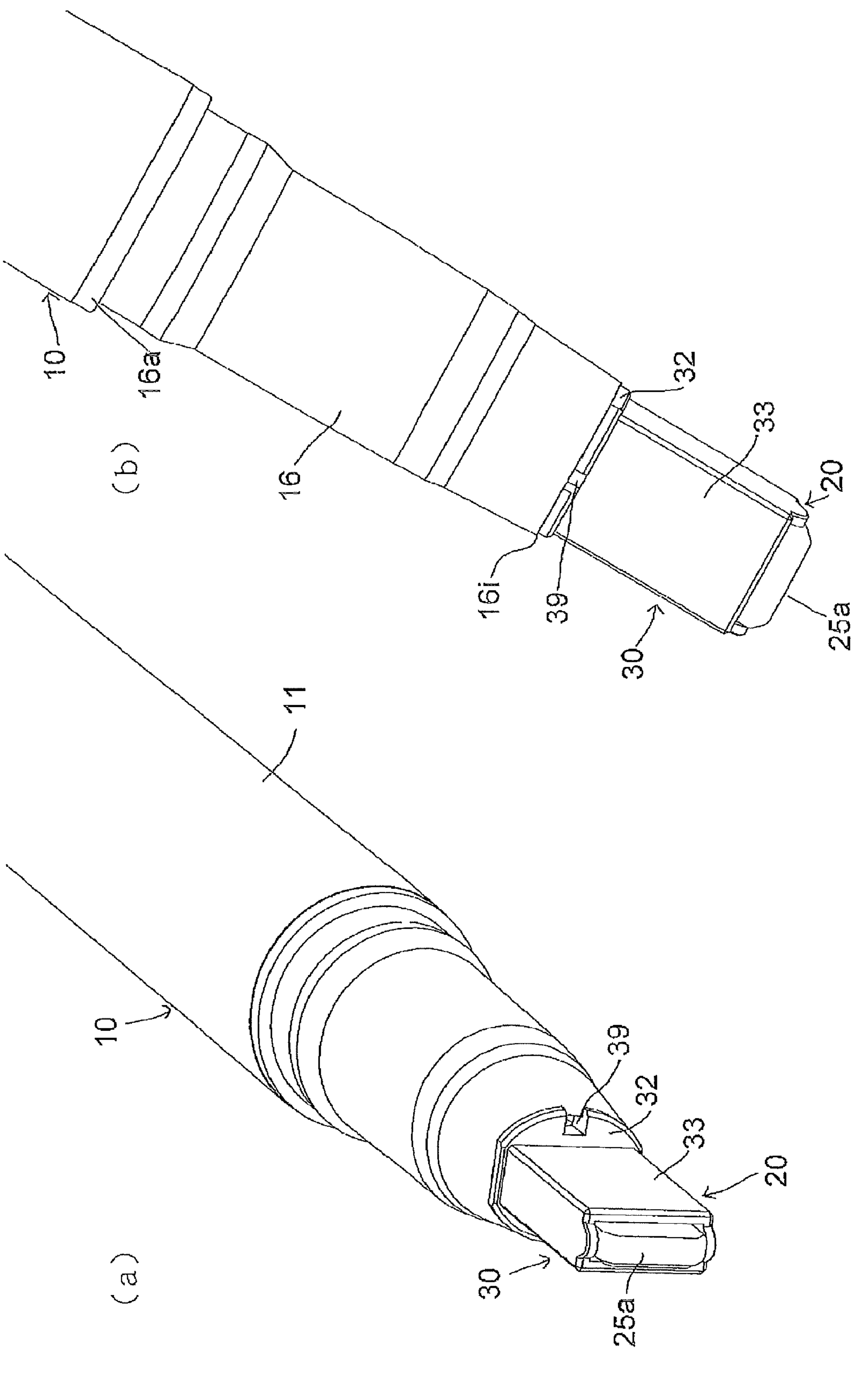

Drawings showing the pen tip of the writing implement in FIG. 28 rotated 90°, (a) a perspective view seen from the front side, and (b) a perspective view of the pen tip seen from the rear side.

FIG. 30

Figure 29:
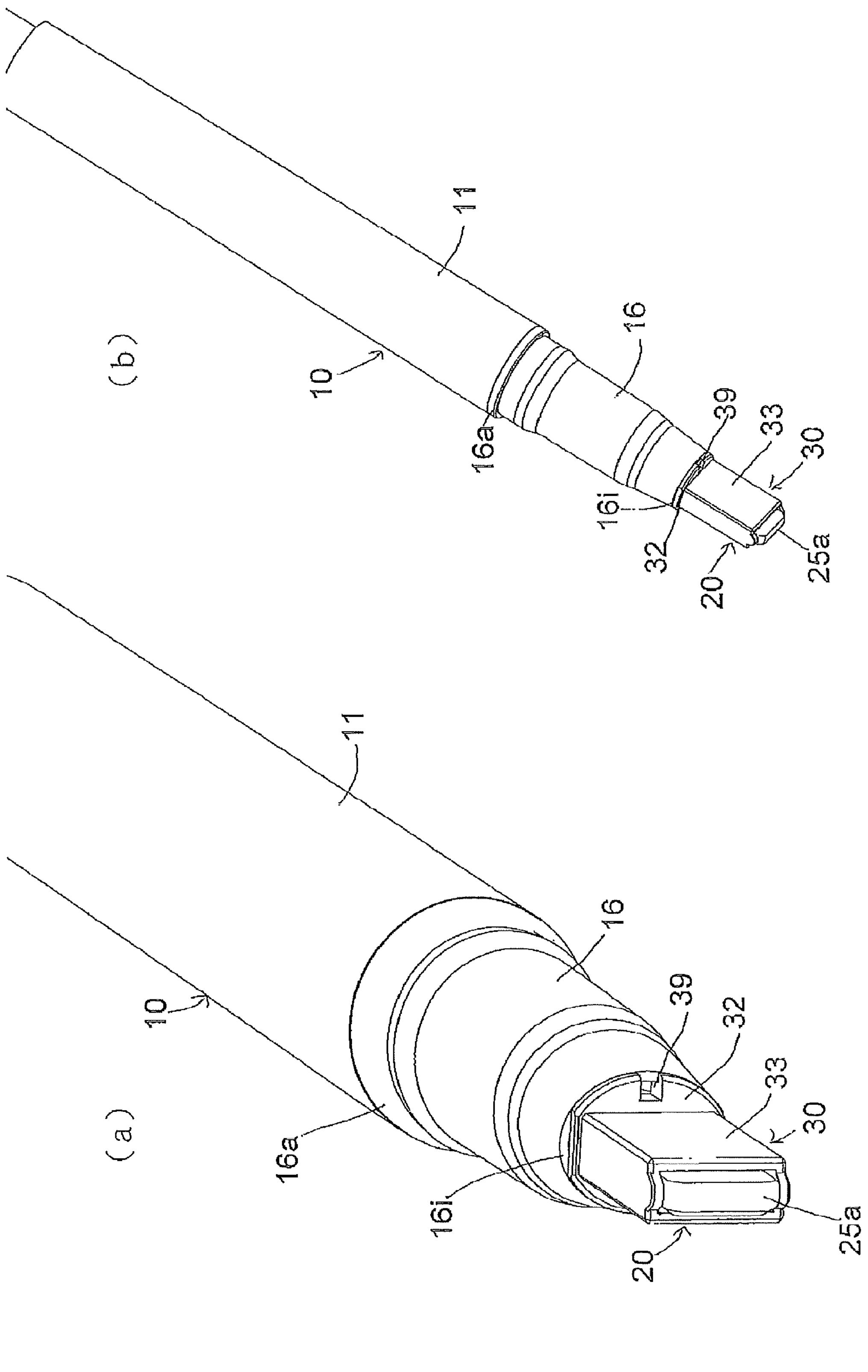

Drawings showing a pen tip portion of the writing implement of FIGS. 27 to 29, (a) a longitudinal cross section cut on the center plane in the width direction, (b) a plan view, (c) a perspective view seen from the front side; (d) a left-side view, (e) a front view, (f) a right-side view, and (g) a bottom view.

MODE FOR CARRYING OUT THE INVENTION

Hereinafter, embodiments of the present disclosure will be described in detail with reference to the drawings. However, it should be noted that the technical scope of the present disclosure is not limited to each of the embodiments detailed below but extends to the inventions recited in the claims and their equivalents.

In the figures, "front" of the writing implements A to F and their constituents indicates the direction of the front end of the writing implements A to F, "rear" indicates the opposite direction, and "axial direction" indicates the direction of the axis penetrating from the front to the rear of the writing implement body (barrel cylinder), and the "transverse direction" indicates the direction orthogonal to the axial direction. In addition, the reference numerals commonly used all the drawings (FIGS. 1 to 30) represent the same components or members even if not particularly mentioned in the description of each drawing.

First Embodiment: Overall Configuration

FIGS. 1 to 10 are drawings illustrating a marking pen-type writing implement according to the first embodiment of the present disclosure, a writing implement body, a front barrel and a pen tip, which are constituents of the writing implement, as well as an example of usage state.

As shown in FIGS. 1(*a*) to 1(*d*), the writing implement A of this embodiment is a twin-type writing implement that includes a pen tip 20 feeding ink supplied from the writing implement body (barrel cylinder) 10 and having a viewer portion allowing visual recognition in the writing direction, and also includes a rod-shaped polyacetal pen tip 40 on the opposite side of the pen tip 20. Detachably attached to both sides of the writing implement body 10 are a cap 50 for protecting the pen tip 20 and a cap 60 for protecting the pen tip 40.

(Writing Implement Body 10, Rear Barrel 11)

As shown in FIGS. 1 to 5 and 7(*a*) to 7(*f*), the writing implement body 10 of this embodiment is composed of a rear barrel 11 and a front barrel 16. The rear barrel 11 is formed of a cylindrical body and accommodates an ink absorbent material 17 impregnated with ink for writing implements. Formed on the right side on the drawing is a reduced diametric retaining part 12 having a fitting part for fixing a retainer 45 holding the rod-shaped pen tip 40 for fine lines by fitting. A cap 60 is detachably attached to the large-diameter outer circumference of the retaining part 12.

Figure 7:
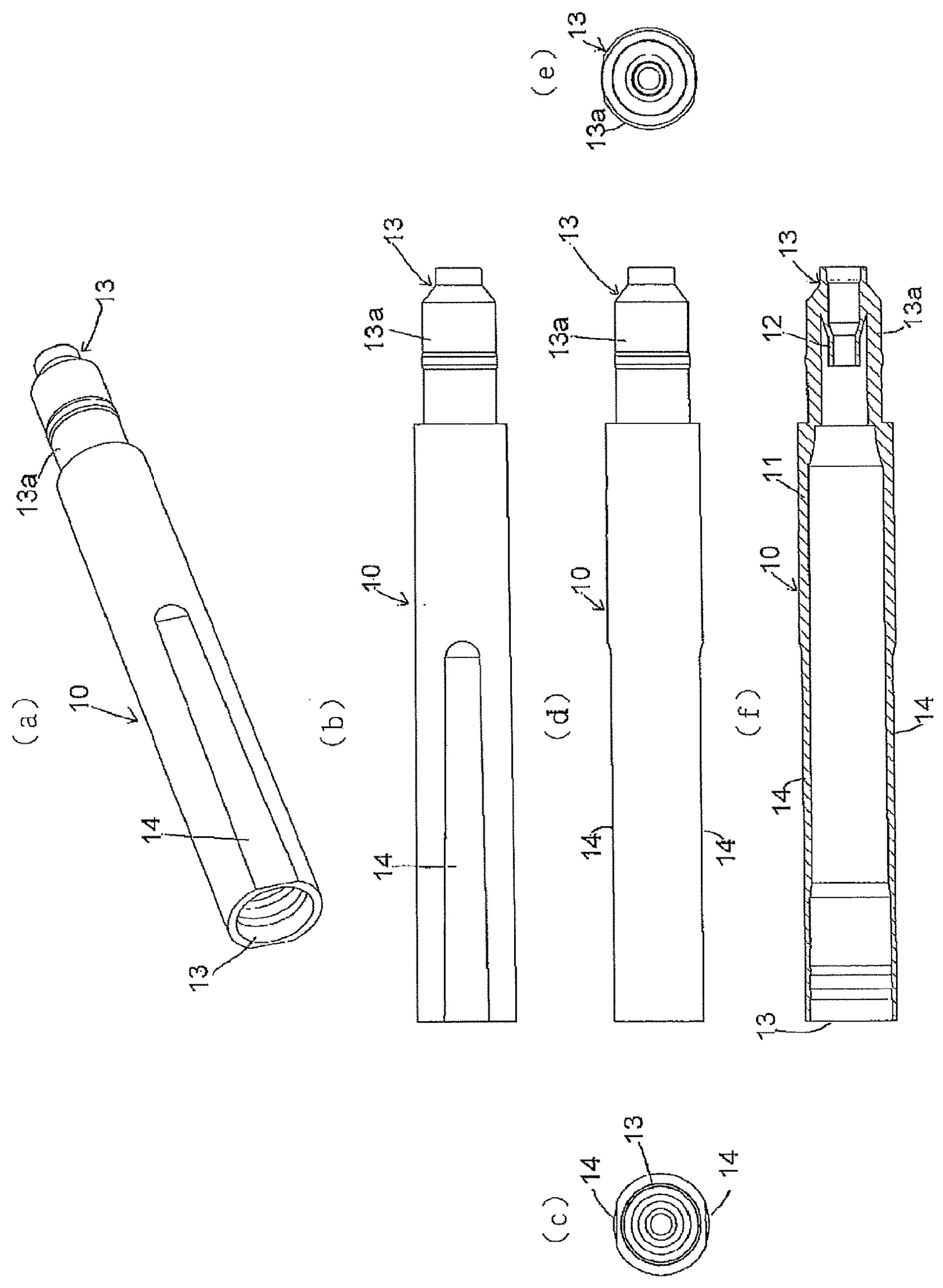
Figure 8:
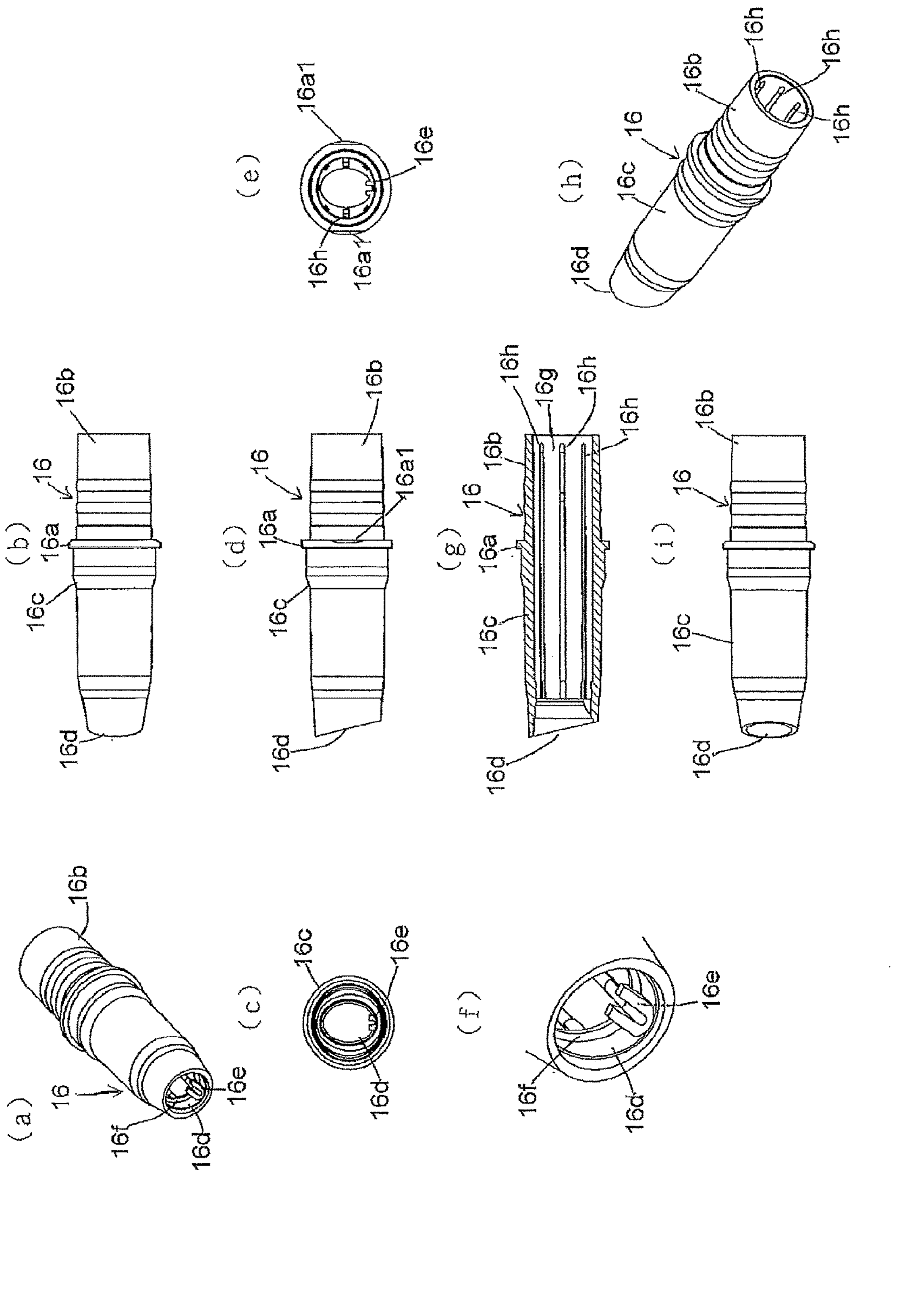
Figure 9:
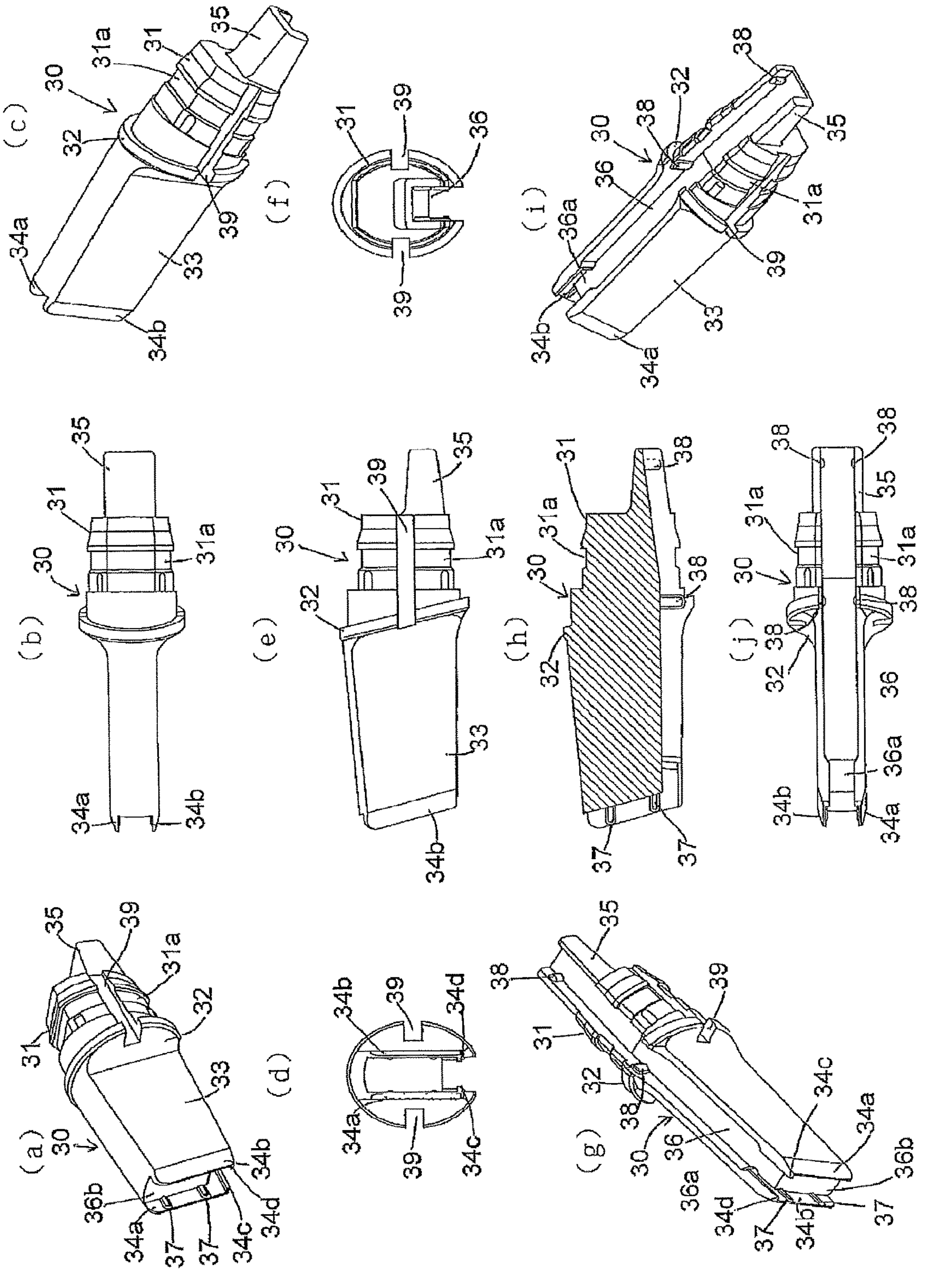

Fixed by fitting or the like to an opening 13 at the other end, or left side of the rear barrel 11 is the front barrel 16 that fixedly holds the pen tip 20 having a viewer portion allowing visual recognition in the writing direction, as shown in FIGS. 7(*a*) to 7(*f*). Further, flat portions 14, 14 are formed on the upper and lower sides of the outer circumference on the front side in the axial direction of the rear barrel 11, so that the user can draw (mark) at once without changing the way of holding when gripping the flat portions 14, 14, as will be described later. That is, these flat portions serve as a grip indication facets for the user to see the orientation of the flat-shaped pen tip 20 easily.

(Front Barrel 16)

As shown in FIGS. 1 to 5 and 8(*a*) to 8(*i*), the front barrel 16 is a substantially circular cylinder, and includes at least a flange 16*a* located in almost the center, but closer to the rear, a rear portion 16*b* having fitting steps on the rear side of the flange 16*a*, a front portion 16*c* having fitting steps on the front side, and an inclined opening 16*d* on the front-end side of the front portion 16*c*. Formed in the interior of the inclined opening 16*d* are a projection 16*e* for reliably directing the ink feeder portion 26 toward the center of the ink absorbent material 17 and an annular abutment 16*f* for receiving the rear end of the retainer 30. The interior of the cylinder is extended to the rear from the inclined opening 16*d*, forming an elliptically sectioned cylindrical outer surface 16*g*, on which retaining ribs 16*h*, 16*h* for retaining the elliptically sectioned ink absorbent material 17 are formed at intervals of a predetermined distance. Reference numeral 16*a*1 in the figure denotes a slightly inclined facet formed on the rear endface of the flange 16*a* so as to correspond to the flat portion 14 of the rear barrel 11 for alignment with the rear barrel 11.

The writing implement body 10 composed of the front barrel 16 and the rear barrel 11 is made of a thermoplastic resin, a thermosetting resin, or the like, and is molded into the above configuration using a resin such as polypropylene or the like to function as the writing implement body (barrel body). The writing implement body 10 is molded opaque or transparent (and translucent), but either may be adopted from the viewpoint of appearance and practical use.

(Ink Absorbent Material 17)

The ink absorbent material 17 is impregnated with ink for writing implements such as water-based ink, oil-based ink, and thermochromic ink, and is made of a fiber bundle consisting of one or a combination of two or more substances, selected from natural fibers, animal hair fibers, polyacetal-based resin, acryl-based resin, polyester-based resin, polyamide-based resin, polyurethane-based resin, polyolefin-based resin, polyvinyl-based resin, polycarbonate-based resin, polyether-based resin, polyphenylene-based resin, etc.; a processed material of fiber bundles of felt and the like; and porous materials such as sponges, resin particles, and sintered bodies. The ink absorbent material 17 is housed and held inside the writing implement body 10. An outer film 17*a* is attached on the peripheral side of the ink absorbent material 17.

(Ink for Writing Implements)

The composition of the ink for writing implements to be used is not particularly limited, and suitable formulations such as water-based inks, oil-based inks, and thermochromic inks can be used depending on the application of the writing implement. For example, for underliner pens and the like, fluorescent dyes such as Basic Violet 11, Basic Yellow 40, thermochromic microcapsule pigments and the like can be formulated as content.

The ink should be adjusted as to ink formulation and blending quantities so that the resultant ink will have an ink viscosity (at 25° C.: Cone-plate type viscometer) of 1 to 5 mPa·s and a surface tension of 30 to 60 mN/m, and present an ink flow X of 5 to 20 mg/m for the pen tip 20 and an ink flow Y of 0.1 to 5 mg/m for the pen tip 40. Setting the ink flow so as to satisfy X>Y is preferable as it allows the use of different marking lines of writing for different purposes. Measurement of the ink flow was performed by setting the pen body in an automatic writing device and drawing on a high-quality paper at a writing angle of 65°, a writing force of 1 N, and a speed of 7 cm/s, following JIS S6037. Further, setting the bending stress of the pen tip 40 higher than the bending stress of the pen tip 20 makes it possible to provide a writing implement suitable for writing fine characters with the pen tip 40.

When a thermochromic ink is used as the ink for writing implements, the ink should at least contain (a) an electron-donating color-forming organic compound; (b) an electron-accepting compound; (c) reversible thermochromic microcapsule pigment encapsulating a reversible thermochromic composition consisting of a reaction medium that determines the temperature at which the color reaction between the aforementioned two compounds occurs; water; and water soluble polymer flocculant, and preferably uses a reversible thermochromic water-based ink composition presenting a pH of 3 to 7. The microcapsule pigment may be in the form of either a circular cross section or a non-circular cross-section. The average particle size of the microcapsule pigment employs the D50 value, calculated with a particle size analyzer [Microtrac HRA9320-X100 (manufactured by Nikkiso Co., Ltd.)] with a refractive index of 1.81 and a volume standard, and is preferably 0.5 to 5.0 μm, more preferably 1 to 3 μm.

If the average particle size exceeds 5.0 lam, the ink outflow performance tends to decrease and ink adherence to the writing surface tends to lower. On the other hand, if the average particle size is less than 0.5 μm, it becomes difficult to exhibit high density color development. When the ratio of the reversible thermochromic composition to the wall film increases, the thickness of the wall film becomes too thin, causing a decrease in resistance to pressure and heat. Conversely, when the ratio of the wall film to the reversible thermochromic composition is increased, the color density and vividness at the time of color development are inevitably lowered. Consequently, it is preferably that the ratio of the reversible thermochromic composition to the wall film is equal to 6:1 to 1:1 (mass ratio).

The reversible thermochromic microcapsule pigment can be contained in an amount of 2 to 50% by mass, preferably 5 to 40% by mass, more preferably 10 to 30% by mass, relative to the total amount of the ink composition.

When the content is less than 2% by mass, the color density is insufficient, and when it exceeds 50% by mass, the ink outflow performance is lowered, and the writing performance is hindered.

In addition, when, as the reaction medium that determines the temperature at which the color reaction occurs, a color memory-retaining microcapsule pigment containing an ester compound, which enantiotropically memorizes and retains a coloring state or a decoloring state in a specific temperature range is used, even if the ink is left in an environment below 0° C. where the ink freezes, or if the ink is put to practical use by storing the ink that changes color in the temperature range where the ink freezes, the ink outflow performance during writing is impaired. Therefore, it is possible to obtain a reversible thermochromic water-based ink that exhibits pertinent writing performance without ink starvation or color fading of marking lines. The ester compound is an ester compound composed of an alcohol compound having two aromatic rings in the molecule and a saturated or unsaturated fatty acid having 4 or more carbon atoms.

As the solvent used for the ink, water is used with water-soluble organic solvents, as necessary.

Examples of the water-soluble organic solvent include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, ethylene glycol monomethyl ether acetate, sulfolane, 2-pyrrolidone, N-methyl-2-pyrrolidone, and others.

By adding a polymer flocculant to the ink, the flocculant causes a loose bridging action between the microcapsule pigment particles, creating a loose flocculation state. In the ink exhibiting such a loosely flocculant state, the microcapsule pigment will not separate in the capillary gaps of the ink absorbent material (sliver) composed of fiber bundles and the marking pen body composed of a resin bundled body of fibers.

As a result, it is possible to obtain a marking pen that can suppress separation of the microcapsule pigment and occurrence of darkening or lightening of marking lines after having left the pen upright or inverted and that has storage performance equivalent to that of a marking pen filled with dye ink.

A nonionic water-soluble polymer compound is used as the water-soluble polymer flocculant, and examples include polyvinylpyrrolidone, polyethylene oxide, and water-soluble polysaccharides.

Examples of the water-soluble polysaccharides include gum tragacanth, guar gum, pullulan, cyclodextrin, nonionic water-soluble cellulose derivatives, and specific examples of nonionic water-soluble cellulose derivatives include methylcellulose, hydroxyethyl cellulose, hydroxypropyl cellulose, hydroxyethylmethyl cellulose, hydroxypropylmethyl cellulose and the like can be mentioned.

In the reversible thermochromic water-based ink composition, any water-soluble polymer that exhibits a loose bridging action between microcapsule pigment particles can be applied, but among them, nonionic water-soluble cellulose derivatives are the most effective.

In addition, if necessary, rust inhibitors such as benzotriazole, tolyltriazole, dicyclohexyl ammonium nitrite, diisopropyl ammonium nitrite, saponin and the like; preservatives or fungicides such as carbolic acid, sodium salt of 1,2-benzthiazolin-3-one, sodium benzoate, sodium dehydroacetate, potassium sorbate, propyl parahydroxy-benzoate, 2,3,5,6-tetrachloro-4-(methylsulfonyl)pyridine, and the like; wetting agents such as urea, nonionic surfactants, reduced or non-reduced starch hydrolysate, oligosaccharides such as trehalose, sucrose, cyclodextrin, glucose, dextrin, sorbit, mannite, sodium pyrophosphate, and the like; antifoaming agents; dispersing agents; and fluorine surfactants and nonionic surfactants to improve ink permeability, may be used.

The ink composition obtained as above is adjusted so as to have a pH of 3 to 7.

By adjusting the ink composition to the acidic range, it is possible to suppress aggregation and sedimentation of the reversible thermochromic microcapsule pigment content in the low temperature range.

When the pH exceeds 7, the ink flowability is likely to be impaired when the ink is left in a low temperature range, that is, in a temperature range where the ink freezes. When the pH is less than 3, the color development property of the encapsulated reversible thermochromic composition becomes stronger, giving rise to a problem that color remaining after decoloring tends to occur.

Adding to the above, as shown in FIGS. 1(*c*) and 1(*d*) a friction body 52 made of a columnar thermoplastic elastomer having a pencil-drawn line erasability (erasing ratio) of less than 70% as defined in JIS S 6050-2002, can be fixed into a depressed portion 51 of the cap 50. When the friction body 52 is made to easily generate frictional heat due to a rubbing action and is formed to be a low-wear friction body, eraser shavings generated during rubbing can be reduced, thereby preventing contamination of the surroundings. In order to make the friction body 52 capable of finely discoloring a thermochromic image by rubbing (that is, providing good discoloration) and resistant to breakage of the friction body due to strong force and/or repeated rubbing operations, as well as to reduce contamination of the paper surface, it is preferable that the friction body has the following configuration.

The friction body has a compression set at 120° C. (also referred to as "120° C. compression set" in the present disclosure) of 80% or lower. A low 120° C. compression set is an indicator of good deformation recovery of the friction body under rubbing conditions (i.e., high temperature conditions). This good deformation recovery contributes to maintaining good wear resistance of the friction body under rubbing conditions (That is, high temperature conditions).

The 120° C. compression set is 80% or lower, may be 70% or lower, or 60% or lower from the viewpoint of good wear resistance of the friction body under high temperature conditions. The 120° C. compression set is preferably as small as possible from the viewpoint of wear resistance under high temperature conditions. In the present disclosure, the compression set is a value measured according to JIS K6262-2013.

In general, the compression set of a molding made of elastomer tends to increase as the temperature rises. The friction body of the present disclosure has a low 120° C. compression set as in the aforementioned specified range. From the viewpoint of obtaining such a 120° C. compression set, it is advantageous to reduce the temperature dependence of the compression set of the friction body. In the friction body, the ratio (A)/(B) of the compression set (A) at 120° C. to the compression set (B) at 70° C. may be 1.0 or higher and 1.7 or lower, 1.0 or higher and 1.5 or lower, 1.0 or higher and 1.4 or lower, or 1.0 or higher and 1.3 or lower.

The friction body has a Shore A hardness of 60-98. The Shore A hardness may be 60 or higher, 70 or higher, or 80 or higher from the viewpoint of good discoloration of thermochromic images and good abrasion resistance of the friction body. The Shore A hardness is 98 or lower, or may be 95 or lower, or 90 or lower, from the viewpoint that the contact area with the paper surface can be increased by pressing the friction body against the paper surface, and therefore good discoloration can be easily obtained. In the present disclosure, Shore A hardness is a value measured according to JIS K 6253-3-2012.

The composition of the material components that make up the friction body of the present disclosure is designed to present the desired 120° C. compression set and Shore A hardness as described above. The friction body typically includes an elastomeric component and an additive component. The following is an example of material components suitable for forming a friction body for which both the 120° C. compression set and Shore A hardness are controlled within the desired ranges of the present disclosure, but the material components are not limited to the following example.

[Elastomer Component (Component (A))]

Examples of the elastomer component include styrene-based elastomers, polyester-based elastomers, and olefin-based elastomers. In terms of ease of achieving the desired 120° C. compression set and Shore A hardness, the elastomer component should contain styrene-based elastomers, and preferably consist of styrene-based elastomers.

In the present disclosure, "styrene-based elastomer" means an elastomer containing a styrene structural unit in its main chain, typically a thermoplastic elastomer. From the viewpoint of easily achieving the desired 120° C. compression set and Shore A hardness, the styrene-based elastomer is preferably a block copolymer (hereinafter referred to as a styrene-based block copolymer) having a polymer block mainly composed of structural units derived from a styrene skeleton-containing compound and a polymer block mainly composed of structural units derived from a conjugated diene compound, or a hydrogenated product of the block copolymer, or a mixture thereof. The above-mentioned "polymer block mainly composed of structural units derived from a styrene skeleton-containing compound (or conjugated diene compound)" means a polymer block in which the structural unit present in the highest mass ratio among the polymer blocks is a structural unit derived from a styrene skeleton-containing compound (or a conjugated diene compound).

The styrene-based block copolymer is a block copolymer that usually contains one or more polymer blocks X, preferably two or more in view of mechanical properties, mainly composed of structural units derived from a styrene skeleton-containing compound, and one or more polymer blocks Y mainly composed of structural units derived from conjugated diene compounds. Examples include block copolymers having structures such as X—Y, X—Y—X, Y—X—Y—X, X—Y—X—Y—X and others.

The hydrogenated product of the styrene-based block copolymer is obtained by adding hydrogen to the carbon-carbon double bond in the styrene-based block copolymer to form carbon-carbon single bonds. The hydrogenation can be carried out by a known method, for example, by hydrotreating with a hydrogenation catalyst in an inert solvent.

The hydrogenation ratio of the hydrogenated products of the styrene-based block copolymer (that is, the ratio of the number of the carbon-carbon single bonds generated by hydrogenation to the number of the carbon-carbon double bonds in the styrene-based block copolymer before hydrogenation) may be 50% or higher, 70% or higher, or 90% or higher from the viewpoint of improving erasability, resistance to staining the paper surface, and abrasion resistance. The above hydrogenation ratio means the value measured by 1H-NMR unless otherwise specified.

A styrene skeleton-containing compound is a polymerizable monomer having a polymerizable carbon-carbon double bond and an aromatic ring. Examples of the styrene skeleton-containing compound include styrene; t-butylstyrene; α-methyl styrene; divinylbenzene; 1,1-diphenyl styrene, N,N-diethyl-p-aminoethylstyrene, p-tert-butyl styrene, and alkylstyrene in which at least one alkyl group having 1 to 8 carbon atoms is bonded to a benzene ring. Among these, styrene and alkylstyrene in which at least one alkyl group having 1 to 8 carbon atoms is bonded to a benzene ring are preferred. As the styrene skeleton-containing compound, one or more of these can be used.

Examples of the alkylstyrene in which at least one of the alkyl groups having 1 to 8 carbon atoms is bonded to a benzene ring include alkylstyrene such as o-alkylstyrene; m-alkyl styrenes; p-alkylstyrene, 2,4-dialkylstyrene, 3, 5-dialkylstyrenes and alkylstyrene kind such as 2,4,6-trialkylstyrene; and alkylstyrene kind such as halogenated alkylstyrene kind in which one or more hydrogen atoms of the alkyl groups in these alkylstyrene kind are substituted with halogen atoms. More specifically, for example, o-methylstyrene, m-methylstyrene, p-methyl styrene, 2,4-dimethyl styrene, 3,5-dimethyl styrene, 2,4,6-trimethylstyrene, o-ethyl styrene, m-ethylstyrene, p-ethyl styrene, 2,4-diethylstyrene, 3,5-diethyl styrene, 2,4,6-triethyl styrene, o-propyl styrene, m-propylstyrene, p-propylstyrene, 2,4-dipropylstyrene, 3,5-dipropylstyrene, 2,4,6-tripropylstyrene, 2-methyl-4-ethyl styrene, 3-methyl-5-ethyl styrene, o-chloromethylstyrene, m-chloromethyl styrene, p-chloromethyl styrene, 2,4-bis(chloromethyl)styrene, 3,5-bis(chloromethyl)styrene, 2,4,6-tri(chloromethyl)styrene, o-dichloromethylstyrene, m-dichloromethylstyrene, p-dichloromethylstyrene, and the like can be listed. Among these, p-methylstyrene is particularly preferred in view of crosslinkability.

An alkylstyrene in which at least one of the alkyl groups having 1 to 8 carbon atoms is bonded to a benzene ring is suitably used as a material for crosslinked styrene-based elastomers.

The ratio of the alkylstyrene in which at least one of the alkyl groups having 1 to 8 carbon atoms is bonded to a benzene ring in the polymer block X, is preferably 1% by mass or higher, more preferably 50% by mass or higher, or may be 100% by mass, in view of crosslinkability.

The above conjugated diene compound is a polymerizable monomer having a structure in which two carbon-carbon double bonds are linked by one carbon-carbon single bond. Examples of the conjugated diene compounds include 1,3-butadiene; isoprene(2-methyl-1,3-butadiene); 2,3-dim ethyl-1,3-butadiene; and chloroprene(2-chloro-1,3-butadiene). Among these, 1,3-butadiene and isoprene are preferred. One or more of these can be used as the conjugated diene compound.

The content of the structural units derived from the styrene-based skeleton-containing compound in the styrene block copolymer or hydrogenated product thereof is not particularly limited, but may be 5 to 50% by mass, or 20 to 40% by mass, in view of mechanical strength, cold resistance, heat resistance and flexibility.

The polymer block X is preferably a polymer block derived solely from the styrene skeleton-containing compound or a copolymer block of the styrene skeleton-containing compound and the conjugated diene compound. When the polymer block X is the copolymer block, the content of the structural units derived from the styrene skeleton-containing compound in the polymer block X of the copolymer block is not particularly limited, but may be usually 50% by mass or higher, and 70% by mass or higher, or 90% by mass or higher, in view of heat resistance. The distribution of the structural units derived from the conjugated diene compound in the polymer block X is not particularly limited. When there are two or more polymer blocks X in the styrene-based elastomer molecule, the two may have the same structure or different structures.

The polymer block Y is preferably a polymer block composed only of the conjugated diene compound or a copolymer block of the styrene skeleton-containing compound and the conjugated diene compound. When the polymer block Y is the copolymer block, the content of the structural units derived from the conjugated diene compound in the polymer block Y in the copolymer block is not particularly limited, but may be usually 50% by mass or higher, 70% by mass or higher, or 90% by mass or higher in view of heat resistance. The distribution of the structural units derived from the styrene skeleton-containing compound in the polymer block Y is not particularly limited. The mode in which the conjugated diene compound and the styrene skeleton-containing compound are bound is not particularly limited. When there are two or more polymer blocks Y in the styrene-based elastomer molecule, the two may have the same structure or different structures.

Examples of the styrene-based block copolymer include styrene-butadiene-styrene block copolymer (SBS) and styrene-isoprene-styrene block copolymer (SIS) and the like.

Examples of the hydrogenated product of the styrene-based block copolymer include styrene-ethylene-butene copolymer (SEB), styrene-ethylene-propylene copolymer (SEP), styrene-ethylene-butene-styrene copolymer (SEBS), styrene-ethylene-propylene-styrene copolymer (SEPS), and styrene-ethylene-ethylene-propylene-styrene copolymer (SEEPS).

Among these, styrene-ethylene-propylene-styrene (SEPS), styrene-ethylene-ethylene-propylene-styrene (SEEPS) and styrene-ethylene-butadiene-styrene (SEBS) are preferred. Particularly, styrene-ethylene-propylene-styrene copolymer (SEPS) and styrene-ethylene-ethylene-propylene-styrene copolymer (SEEPS) are preferred in view of wear resistance.

The styrene-based block copolymers and/or hydrogenated products thereof listed above can be used singly or in mixtures of two or more.

The styrene-based elastomer may be crosslinked. A higher degree of cross-linking contributes to lowering of 120° C. compression set and rising of Shore A hardness. In this case, SEBS, SEPS, and SEEPS in which styrene is replaced with p-methylstyrene are preferable in view of heat resistance and wear resistance. Whether or not the styrene-based elastomer has been crosslinked can be distinguished by visually observing whether or not a gel content remains, or by measuring the remaining weight, after immersing it in hot xylene at 120° C. for 24 hours. For cross-linking, for example a cross-linking agent (component (E)) described later can be used. In the exemplary embodiment, the friction body can be free of 120° C. hot xylene insoluble polymers other than crosslinked styrene-based elastomers. In this case, whether or not the styrene-based elastomer is crosslinked can also be evaluated by subjecting the friction body to the hot xylene treatment.

The mass average molecular weight (Mw) of the styrene-based elastomer is preferably 150,000 to 500,000. The weight average molecular weight may be 150,000 or more, 180,000 or more, or 200,000 or more from the viewpoint of obtaining a friction body with good wear resistance. On the other hand, the mass average molecular weight may be 500,000 or less, 450,000 or less, or 400,000 or less from the viewpoint of good workability at the time of manufacturing the friction body. In the present disclosure, the molecular weight means a polystyrene-equivalent value measured by a gel permeation chromatography (GPC) method unless otherwise specified.

[Other Components]

Other components may include, for example, one or more kinds of a propylene-based resin (hereinafter referred to as component (B)), a rubber softener (hereinafter referred to as component (C)), a lubricant (hereinafter referred to as component (D)), a cross-linking agent (hereinafter referred to as component (E)), a cross-linking aid (hereinafter referred to as component (F)), a colorant (hereinafter referred to as component (G)), a polymer component other than the above propylene-based resin, a stabilizer, a filler, etc.

[Propylene-Based Resin (Component (B))]

Use of a propylene-based resin (component (B)) is advantageous in improving the wear resistance of the friction body and the resistance to staining the paper surface. Examples of the component (B) include propylene-based homopolymers, propylene-based random copolymers, and propylene-based block copolymers, and these can be used singly or in combination of two or more. In view of heat resistance, propylene homopolymers and propylene-based block copolymers are more preferred. More preferably, propylene homopolymers are even more preferred.

The propylene homopolymer is a polymer composed only of propylene units. Since it has high crystallinity and a high melting point, it is most preferable as component (B).

The propylene-based random copolymer may include propylene-ethylene random copolymers obtained by copolymerizing propylene and ethylene, propylene-α-olefin random copolymers obtained by copolymerizing propylene and at least one kind of α-olefin having 4 to 20 carbon atoms, and a propylene-ethylene-α-olefin random copolymers obtained by copolymerizing propylene, ethylene and at least one kind of α-olefin having 4 to 20 carbon atoms.

Examples of α-olefins having 4 to 20 carbon atoms include 1-butene; 2-methyl-1-prop ene-b as ed; 1-pentene; 2-methyl-1-butene; 3-methyl-1-butene; 1-hexene; 2-ethyl-1-butene, 2,3-dimethyl-1-butene, 2-methyl-1-pentene-based 3-methyl-1-pentene; 4-methyl-1-pentene; 3,3-dimethyl-1-butene; 1-heptene; methyl-1-hexene; dimethyl-1-pentene; ethyl-1-pentene; trimethyl-1-butene; methylethyl-1-butene; 1-octene; methyl-1-pentene; ethyl-1-hexene; dimethyl-1-hexene; propyl-1-heptene; methylethyl-1-heptene; trimethyl-1-pentene; propyl-1-pentene; diethyl-1-butene; 1-nonene; 1-decene; 1-undecene; and 1-dodecene. The α-olefins having 4 to 20 carbon atoms are preferably 1-butene, 1-pentene, 1-hexene and 1-octene, more preferably 1-butene and 1-hexene.

Specific examples of propylene-based random copolymers include propylene-ethylene random copolymers, propylene-1-butene random copolymers, propylene-1-hexene random copolymers, propylene-1-octene random copolymers, propylene-ethylene-1-butene random copolymers, propylene-ethylene-1-hexene random copolymers, and propylene-ethylene-1-octene random copolymers. More preferably, propylene-ethylene random copolymers, propylene-1-butene random copolymer, propylene-1-hexene random copolymers, propylene-ethylene-1-butene random copolymers, and propylene-ethylene-1-hexene random copolymers, etc., can be listed.

As the propylene-based block copolymer, block copolymers composed of crystalline-based propylene polymer segments and amorphous propylene-α-olefin copolymer segments can be mentioned.

As the crystalline propylene-based polymer, propylene homopolymers or random copolymers of propylene and a small amount of other α-olefins can be mentioned.

On the other hand, as the amorphous propylene/α-olefin copolymer, amorphous random copolymers of propylene and other α-olefins can be mentioned. As the other α-olefin, those having 2 or 4 to 12 carbon atoms are preferable, and specific examples include ethylene; 1-butene; 3-methyl-1-butene; 3-methyl-1-pentene; 4-methyl-1-pentene; 4,4-dimethyl-1-pentene; vinylcyclopentane, vinylcyclohexane, and the like can be mentioned. These α-olefins can be used singly or in combination of two or more.

As the propylene-based block copolymer, in addition to the above-mentioned other α-olefins, ternary, quaternary or more-combined copolymers of non-conjugated dienes such a 1,4-hexadiene; 5-methyl-1,5-hexadiene, 1,4-octadiene; cyclohexadiene; cyclooctadiene; dicyclopentadiene; 5-methylene-2-norbornene; 5-ethylidene-2-norbornene; 5-butylidene-2-norbornene; and 5-isopropenyl-2-norbornene and the like, may be used.

In view of moldability, the melt mass flow rate of the component (B) may be 0.01 to 100 g/10 min., 0.1 to 50 g/10 min, or 0.3 to 10 g/10 min, when measured at 230° C. under 21.18 N in conformity with JIS K 7210-1999.

In addition, the melting point of the component (B) may be 150° C. or higher, or 160° C. or higher, from the viewpoint of heat resistance. Although the upper limit of the melting point is not particularly limited, the upper limit is, for example, about 167° C. because it is a polypropylene-based resin. The above melting point is measured using a DSC type differential scanning calorimeter (for example, Diamond of PerkinElmer Japan Co., Ltd.), and is determined as a temperature corresponding to the top of the peak appearing on the highest side in the temperature range in the second melting point curve (i.e., the melting curve measured in the last heating process), obtained by a measuring program in which the system is held at 230° C. for 5 minutes→cooled to −10° C. at 10° C./min→held at −10° C. for 5 minutes→heated up to 230° C. at 10° C./min.

The blending amount of the component (B) may be 30 to 300 parts by mass, 35 to 250 parts by mass, or 40 to 180 parts by mass, to 100 parts by mass of the component (A). Specifying within this range can present a good balance between flexibility, wear resistance, and resistance to staining the paper surface.

[Rubber Softener (Component (C))]

As the rubber softener (component (C)), various compounds that are understood by those skilled in the art to function as softeners in the field can be used. Use of component (C) is advantageous in improving the flexibility of the friction body. The component (C) is typically a non-aromatic rubber softener. Examples of non-aromatic rubber softeners include non-aromatic mineral oils (i.e., hydrocarbon compounds derived from petroleum, etc. that are not classified as aromatic in the classification described later (i.e., the number of aromatic carbon atoms is less than 30%) or non-aromatic-based synthetic oils (i.e., synthetic hydrocarbon compounds with no aromatic monomers used). Non-aromatic-based rubber softeners are usually liquid, gel-like, or gum-like at room temperature.

The mineral oil used as the component (C) is a mixture of compounds having one or more of paraffin chains, naphthene rings, and aromatic rings. Based on the number of carbon atoms, those having naphthene rings in an amount of 30 to 45% are called naphthenic mineral oil while those having aromatic rings in an amount of 30% or higher are called aromatic mineral oil. Those not belonging to either naphthenic mineral oil or aromatic mineral oil and having paraffin chains in an amount of 50% or higher based on the number of carbon atoms is classified as paraffinic mineral oil.

Examples of the component (C) may include paraffinic mineral oils such as linear saturated hydrocarbons, branched saturated hydrocarbons, derivatives of these; naphthenic mineral oils; and synthetic oils such as hydrogenated polyisobutylene, polyisobutylene, and polybutene. Among these, from the viewpoint of compatibility with the elastomer component, paraffinic mineral oils are preferred. Paraffinic mineral oils with a small number of aromatic carbon atoms are more preferred. Moreover, from the viewpoint of handling, those that are liquid at room temperature is preferable.

In view of heat resistance and easy handling, the dynamic viscosity of the component (C) at 37.8° C. measured according to JIS K2283-2000 may be 20 to 1000 cSt, or 50 to 500 cSt. In view of handling, the pour point of the component (C) measured according to JIS K2269-1987 may be −10 to −25° C. Furthermore, from a safety viewpoint, the flash point (COC) of the component (C) measured according to JIS K2265-2007 may be 170 to 300° C.

The bending amount of the component (C) may be 1 to 400 parts by mass, 10 to 250 parts by mass, or 40 to 180 parts by mass to 100 parts by mass of the component (A), from the viewpoint of the balance between flexibility and mechanical properties.

[Lubricant (Component (D))]

As the lubricant (component (D)), various compounds that are understood by those skilled in the art to function as lubricants in the relevant field can be used. Use of the component (D) is advantageous in releasability from the mold and suppression of friction with the paper surface.

Examples of the component (D) include silicone-based compounds, fluorine-based compounds, surfactants. Silicone-based compounds are preferable from the viewpoint of suppressing friction with the paper surface.

As the above silicone-based compound, silicone oil, silicone gum and the like can be used. Among these, those having a high molecular weight are preferred from the viewpoint of heat resistance, bleed resistance, and suppression of friction with the paper surface. However, in general, high-molecular weight silicone-based compounds are highly viscous liquids or gum form, hence tend to have poor handling performance. Therefore, their blends with a resin or copolymers with resin are suitable for use. The resin used here is selected in consideration of the compatibility with other components constituting the friction body, particularly the component (A), but generally olefine-based resins such as polyethylene and polypropylene are suitable.

As the fluorine-based compound, polyvinylidene fluoride, polyvinyl fluoride and the like can be used. Among these, polyvinylidene fluoride is preferable from the viewpoint of suppressing friction with the paper surface.

As the surfactant, any of anionic, cationic and nonionic surfactants can be used.

The blending amount of the component (D) is 0.1 to 30 parts by mass, 0.5 to 20 parts by mass, or 1 to 10 parts by mass to 100 parts by mass of the component (A), in view of the suppressing friction with the paper surface.

The content of the component (D) in the friction body (the content of silicone oil in a preferred embodiment, or the content of fluorine-based compound in another preferred embodiment) is preferably 0.1 to 3.0% by mass. The above content may be 0.1% by mass or higher, 0.3% by mass or higher, or 0.5% by mass or higher in view of suppressing the friction with the paper surface. From the viewpoint of obtaining good erasability and resistance to staining the paper surface, it may be 3.0% by mass or lower, 2.5% by mass or lower, or 2.0% by mass or lower.

[Crosslinking Agent (Component (E))]

As the cross-linking agent (component (E)), various compounds that are understood by those skilled in the art to function as a cross-linking agent in the relevant field can be used. In the friction body, the component (E) is blended mainly for the purpose of cross-linking the component (A). Use of the component (E) is advantageous in reducing the 120° C. compression set and increasing the Shore A hardness.

Examples of the component (E) include organic peroxides, phenol-based compounds, and the like, and organic peroxides are preferable in view of wear resistance.

The above organic peroxides are compounds in which one or two hydrogen atoms of hydrogen peroxide are replaced with free organic groups. Since the organic peroxide has a peroxidative combination in its molecule, it generates radicals during the production of the friction body (for example, when melting and kneading the material composition), and the radicals undergo a chain reaction to promote cross-linking of the above component (A).

Examples of the organic peroxide include dicumyl peroxide; di-tert-butyl peroxide; 2,5-dimethyl-2,5-di-(tert-butylperoxy)hexane; 2,5-dimethyl-2,5-di-(tert-butylperoxy)hexyne-3; 1,3-bis(tert-butylperoxyisopropyl)benzene; 1,1-bis(tert-butylperoxy)-3,3,5-trimethylcyclohexane; n-butyl-4,4-bis(tert-butylperoxy)valerate; benzoyl peroxide; p-chlorobenzoyl peroxide; 2,4-dichlorobenzoyl peroxide; tert-butyl peroxybenzoate; tert-butyl peroxyisopropyl carbonate; diacetyl peroxide; lauroyl peroxide; and tert-butyl cumyl peroxide. Among these, 2,5-dimethyl-2,5-di-(tert-butylperoxy)hexane and 2,5-dimethyl-2,5-di-(tert-butylperoxy)hexyne-3 are preferred from the viewpoint of low odor, low coloration, and scorch safety.

When using an organic peroxide as the component (E), it is preferable to also use a cross-linking aid (component (F)) described below. By using the component (F) as well, a uniform and efficient cross-linking reaction can be carried out.

As the phenol-based compound, a resol resin is preferable because it is usually liquid. Resole resins are prepared by condensation of alkyl-substituted phenol or unsubstituted phenol with aldehydes (preferably formaldehyde) in an alkaline medium, or by condensation of difunctional phenol dialcohols. The alkyl substituent portion of the alkyl-substituted phenol typically has 1 to 10 carbon atoms. Preferred are dimethylolphenols or phenolic resins, substituted at the p-position by alkyl groups having 1 to 10 carbon atoms.

Among the above phenol-based compounds, alkylphenol-formaldehyde resins, methylolated alkylphenol resins, brominated alkylphenol resins, and the like are preferred. From an environmental point of view, non-brominated ones are desirable, but terminal hydroxyl groups may also be brominated. Alkylphenol formaldehyde resins are particularly preferred.

The blending amount of the component (E) may be 0.01 to 20 parts by mass, 0.1 to 10 parts by mass, or 0.5 to 5 parts by mass, to 100 parts by mass of the component (A). The above lower limit value or more is preferable in that the cross-linking reaction proceeds well, while the above upper limit value or lower is preferable in that the cross-linking does not progress too much and the moldability is maintained well.

[Crosslinking Aid (Component (F))]

As the cross-linking aid (component (F)), various compounds that are understood by those skilled in the art to function as a cross-linking aid or a cross-linking accelerator in the relevant field can be used.

Examples of the component (F) include: polyfunctional methacrylate compounds such as triallyl cyanurate, ethylene glycol dimethacrylate, diethylene glycol dimethacrylate, triethylene glycol dimethacrylate, tetraethylene glycol dimethacrylate, polyethylene glycol dimethacrylate having 9 to 14 repeating units of ethylene glycol, trimethylolpropane trimethacrylate, allyl methacrylate, 2-methyl-1,8-octanediol dimethacrylate, and 1,9-nonanediol dimethacrylate; polyfunctional acrylate compounds such as polyethylene glycol diacrylate, 1,6-hexanediol diacrylate, neopentyl glycol diacrylate, and propylene glycol diacrylate; and polyfunctional vinyl compounds such as vinyl butyrate or vinyl stearate. One or more of these can be used as the component (F).

Among the above components (F), polyfunctional acrylate compounds and polyfunctional methacrylate compounds are preferred, and triallyl cyanurate, triethylene glycol dimethacrylate, and tetraethylene glycol dimethacrylate are particularly preferred. These compounds are easy to handle, present solubilization of organic peroxides, and act as dispersing aids for organic peroxides, so that their use in combination with organic peroxides makes it possible to promote more uniform and effective cross-linking.

The blending amount of the component (F) may be 0.01 to 50 parts by mass, 0.5 to 30 parts by mass, or 1 to 20 parts by mass, to 100 parts by mass of the component (A). The above lower limit value or more is preferable in that the cross-linking reaction progresses well, while the above upper limit value or lower is preferable in that the cross-linking does not progress too much, so that dispersion of the cross-linked product in the friction body is well maintained.

[Colorant (Component (G))]

As the colorant (component (G)), various compounds that are understood by those skilled in the art to function as a colorant in the field can be used. Inorganic pigments, organic pigments and the like are preferable as the component (G).

(Pen Tip 20)

As shown in FIGS. 1 to 6 and 9(*a*) to 9(*f*), the pen tip 20 includes: at least a writing part 25; the ink feeder portion 26 for feeding the ink of the writing implement body 10 to the writing part 25; and the retainer 30 having a viewer portion. The writing part 25 and the ink feeder portion 26 are attached to the retainer 30 by adhesion, welding, fitting, or the like.

The writing part 25 has an inclined shape (knife cut shape), that is, the upper side of the rectangular parallelepiped base part is inclined so as to allow ease of writing. The inclination and the like of the writing part 25 are appropriately configured according to the purpose and usability of writing. As shown in FIG. 3(*a*), the writing part 25 is to produce a thick line width W, preferably 1 mm or greater, more preferably 2 mm or greater. In this embodiment, the drawn line width W is 4 mm.

The material of the writing part 25 is formed of, for example, a porous material having pores. Specific examples include a sponge body, a sintered body, a fiber bundle body, a foam body, a spongy body, and a felt body, a porous body, and the like. Examples of the material for forming these porous bodies include natural fiber, animal hair fiber, polyacetal-based resin, polyethylene-based resin, acryl-based resin, polyester-based resin, polyamide-based resin, polyurethane-based resin, polyolefin-based resin, polyvinyl-based resin, polycarbonate-based resin, polyether-based resin, polyphenylene-based resin, and the like. The writing part 25 of the present embodiment is composed of a sintered core obtained by sintering plastic powder (for example, PE) in order to further improve writing sensation.

The ink feeder portion 26 is formed of a thin plate having an inclined portion 26*a* (inclined angle: θ) on the rear side. The cross section of the ink feeder portion is preferably rectangular or elliptical in view of maximizing (widening) the area of the viewer portion. In the embodiment, the cross section is rectangular. The inclined angle θ is an inclination for the purpose of efficiently introducing ink from ink absorbent material 17 to the ink feeder portion 26.

The material of the ink feeder portion 26 is not particularly limited as long as it efficiently feeds (supplies) ink from the ink absorbent material 17 stored in the writing implement body 10 to the writing part 25 through the ink feeder portion 26. For example, non-woven fabric such as woven fabrics or knitted fabrics, fiber bundle cores, or materials having liquid permeability such as liquid-permeable foams and sintered bodies can be used. The writing part 25 and the ink feeder portion 26 can be integrally formed from a single material. However, from the perspective of enhancing the effect of the present disclosure, efficiently supplying ink, and further improving the writing feel of the writing part, it is desirable to configure them by connecting or joining separate parts, or connecting or joining them via a retainer, which will be described later.

In the present embodiment, the term "non-woven fabric" refers to a fabric-like structure that is made of one or more layers of fibric masses that are not woven. As the material of fibers, synthetic fibers, natural fibers, animal hair fibers, inorganic fibers and the like are used. Examples of synthetic fiber materials used include polyacetal-based resin, polyethylene-based resin, acryl-based resin, polyester-based resin, polyamide-based resin, polyurethane-based resin, polyolefin-based resin, polyvinyl-based resin, polycarbonate-based resin, and polyether-based resin, polyphenylene-based resin, etc., or a combination of two or more thereof.

The fibers that make up the fabric can be obtained by publickly known methods, such as melt spinning, dry spinning, wet spinning, direct spinning (melt blowing, spunbonding, electrostatic spinning, etc.), a process of extracting small-diametric fibers by suctioning one or more kinds of resin components from composite fibers, a process of obtaining split fibers by beating fibers, and others.

In addition, the fibers that make up the fabric may be composed of one or more kinds of resin components, and may use composite fibers, generally called composite fibers, such as core and sheath type, island in the sea type, side-by-side type, orange type and others.

Although the fineness of the fibers forming the fabric is not particularly limited, the fineness is preferably 0.1 to 500 dtex (decitex), more preferably 2 to 5 dtex (decitex). Also, the fiber length is not particularly limited, but short fibers, long fibers and continuous fibers can be used.

When the fabric is woven or knitted, it can be prepared by weaving or knitting the fibers prepared as described above.

When the fabric is a nonwoven fabric, for example, a dry method, a wet method or the like can be used as a method for preparing a fiber web that can produce a nonwoven fabric. Then, as a method of entangling and/or integrating the fibers making up the fiber web to form a nonwoven fabric, for example, a method of entangling with needles or water flow, a method of integrating fibers with a binder, or a method in which when the faber web contains a thermoplastic resin, fibers can be integrated by heat-treating the fiber web to fuse the thermoplastic resin. As the method of heat-treating the fiber web, for example, a method of heating and pressurizing with a calendar roll, a method of heating with a hot air dryer, a method of fusing the thermoplastic resin fibers by radiating infrared rays under no pressure, and others can be used. It is also possible to prepare nonwoven fabrics by collecting spun fibers using direct spinning methods.

As the fiber bundle core, parallel fiber bundles made of the above fiber materials (one or a combination of two or more, selected from synthetic fiber, natural fiber, . . . polyphenylene resin, etc.) that are processed, or fiber bundles of these that are processed with a resin, can be used.

In the case of a liquid-permeable foam body, it can be prepared by a publicly known method such as molding by pouring a molten resin into a mold and foaming. In the case of a sintered body, a plastic powder or the like of polyacetal-based resin, polyethylene-based resin, acryl-based resin, polyester-based resin, polyamide-based resin, polyurethane-based resin, polyolefin-based resin, polyvinyl-based resin, polycarbonate-based resin, polyether-based resin, or polyphenylene-based resin, may be used and sintered so as to form a porous body (sintered core).

The shape, thickness, etc., of the ink feeder portion 26 are specified in terms of the manner of attachment to the retainer 30, the shape of the writing part 25, the maximization of the see-through area of the viewer portion, and the efficient flow (supply) of ink to the writing part 25. Preferably, the dimension in the width direction and the dimension in the longitudinal direction roughly correspond respectively to the dimension in the width direction and the dimension in the longitudinal direction of the attachment surface of the retainer 30 described later, to which the thin plate-like ink feeder portion 26 is fixed. These dimensions are specified appropriately so as to efficiently deliver ink to the writing part 25. The thickness t of the thin plate-like ink feeder portion 26 (the width when viewed from the direction perpendicular to the surface of the viewer portion) is preferably smaller than 1.5 mm, more preferably 1.2 mm or smaller, and particularly preferably 0.8 mm or smaller in terms of maximizing the see-through area of the viewer portion, as shown in FIGS. 3(*b*) and 6. In view of suitable amount of supplied ink, productivity and the like, the lower limit is preferably 0.5 mm or greater.

In this embodiment, the ink feeder portion 26 is composed of a fiber bundle core made of PET having a rectangular cross section in view of the capability of efficiently flowing the ink via a small cross-sectional area. The dimension in the longitudinal direction is 20 mm, the dimension in the width direction is 2 mm, and the thickness t is 0.8 mm.

A rear end portion **26*a*1 of the ink feeder portion 26 is inserted into the interior of the ink absorbent material 17 on the front-end side, whereas a front-end portion 26A is abutted against the writing part 25 via the retainer 30. Thanks to this structure, that is, the abutment, designated at 27, between a tip 26*b* of the ink feeder portion 26 and a rear endface 25A of the writing part 25, the ink in the ink absorbent material 17 flows through the ink feeder portion 26 and the abutment portion 27 so that a suitable amount of ink can be efficiently supplied to the writing part 25** by capillary force.

(Retainer 30)

As shown in FIGS. 1 to 6 and 9(*a*) to 9(*j*), the retainer 30 is adapted to fix the writing part 25 and the ink feeder portion 26 with its rear end fixed into the inclined opening **16*d* of the front barrel 16 of the writing implement body 10, and comprises: a rounded main part 31; a flange 32 disposed on the front side of the main part 31 so as to abut the endface of the writing implement body 10; and a viewer portion 33 that allows visual recognition in the writing direction, and further includes: front retaining parts 34*a* and 34*b* that hold the tip side (endface) of the writing part 25 on the front side of the viewer portion 33; and anti-falling portions 34*c* and 34*d* that are formed at one end of respective retaining parts to catch the endface of the writing part 25**.

Further, a rear retaining part 35 connected from the main part 31 is provided on the bottom surface side at the rear of the main part 31. In order to maximize the visible area of the viewer portion 33, the retainer 30 made up of the above parts has a mount (arrangement) structure longitudinally on the entire bottom surface of the retainer 30, or more specifically, a depressed retaining groove 36 for fitting and holding the thin-plate-like ink feeder portion 26 (having a rectangular cross-section) formed on the entire longitudinal bottom surface of the retainer 30. Further, a depressed fitting portion **31*a* is formed on the widthwise outer circumferential surface of the main part 31**.

Furthermore, ribs 37, 37 . . . , 38, 38 . . . are formed at predetermined intervals along the direction perpendicular to the axial line on both the side surfaces of the depressed retaining groove 36 in which the writing part 25 is fixed and the depressed retaining groove 36 in which the ink feeder portion 26 is fixed, or on the surfaces with which the writing part 25 and the ink feeder portion 26 come into contact. With this configuration, the writing part 25 and the ink feeder portion 26, which have fragile legs and the like and are susceptible to dimensional variations due to mold processing, can be stably assembled to the retainer 30. In this embodiment, since the dimension in the width direction of a mounting surface **36*a* of the retaining groove 36 is designed slightly smaller than the dimension in the width direction of the front-end portion26A of the ink feeder portion 26, the front-end portion26A of the ink feeder portion 26 is compressed, fitted and held into the retaining groove 36*a*, thereby making it possible to increase the fixing force and securely keep the joint with the writing part 25**.

The thin plate-shaped ink feeder portion 26 is fixed to the mounting surfaces **36*a* and 36*b* of the retaining groove 36 of the retainer 30 by adhesion with an adhesive, welding or the like, and is fixed to the writing part 25**.

In this writing implement A, the fixing (mounting) of the writing part 25 to the retainer 30 may be done additionally using adhesion with an adhesive, welding, and the like in order to ensure the fitting and retaining of the writing part 25 between retaining parts **34*a* and 34*b* and the fixing (anti-falling) of the writing part 25**.

Moreover, air circulation grooves 39, 39 are formed in the longitudinal direction of the main part 31 on the outer circumferential surface thereof and are configured to be able to adjust air pressure if the air pressure etc., inside the writing implement increases, whereby it is possible to dissolve the problem of ink leakage etc., by means of air circulation grooves 39, 39.

The ink feeder portion 26 has a rectangular cross-section or an elliptical cross-section, and in this embodiment, is composed of a fiber bundle core having the rectangular cross-section, whereas the writing part 25 is formed of resin sintered body. The writing part 25 and ink feeder portion 26 are fixed to the retaining groove 36 and the mounting surfaces **36*a* and 36*b* of the retainer 30, and the ink feeder portion 26 and the writing part 25 are pressed against each other and fixed. As a result, the ink from the ink absorbent material 17 is well supplied to the writing part 25 via the ink feeder portion 26 and the abutment portion 27**.

The entire retainer 30 thus configured is made of hard materials, for example, hard materials having see-through properties such as glass and resin having no rubber elasticity. The retainer is formed by molding with a material having a visible light transmittance of 50% or more, such as PP, PE, PET, PEN, nylon (including general nylon such as 6 nylon and 12 nylon, and amorphous nylon) and acryl, polymethylpentene, polystyrene, and ABS, as the resin allowing visual recognition and having no rubber elasticity, whereby the characters written in the writing direction can be effectively seen through the viewer portion 33. Note that only the viewer portion 33 may be made of a material allowing visual recognition. The visible light transmittance can be determined by measuring the reflectance with a multi-light source spectrocolorimeter (manufactured by Suga Test Instruments Co., Ltd., (MSC-5N)).

The retainer 30 may be made of one of the above materials or may be made of two or more kinds of materials from the viewpoint of further improving durability and visibility and can be molded by various molding methods such as injection molding, blow molding and the like.

In this embodiment, as shown in FIG. 3(*b*), the viewer portion 33 of the retainer 30 has a minimum width X of 3.7 mm or greater in the width direction, and the viewer portion 33 has a length Y of 7.4 mm or greater. In this embodiment, the width X of the viewer portion 33 of the retainer 30 is configured to increase as it goes from the front side to the rear side, and the minimum width X is the dimension in the width direction on the front-end side of the viewer portion 33 of the retainer 30, and the width (parallel to the pen tip) is 3.7 mm or greater. In this embodiment, the maximum width in the width direction of the viewer portion 33 is 4.5 mm.

Setting the minimum width X to 3.7 mm or greater makes it possible to clearly see the 10.5 point character (No. 5 type) printed on the document through the viewer portion 33. Normally, in Japan, the No. 5 type is often used as the standard for general official documents.

Figure 10:
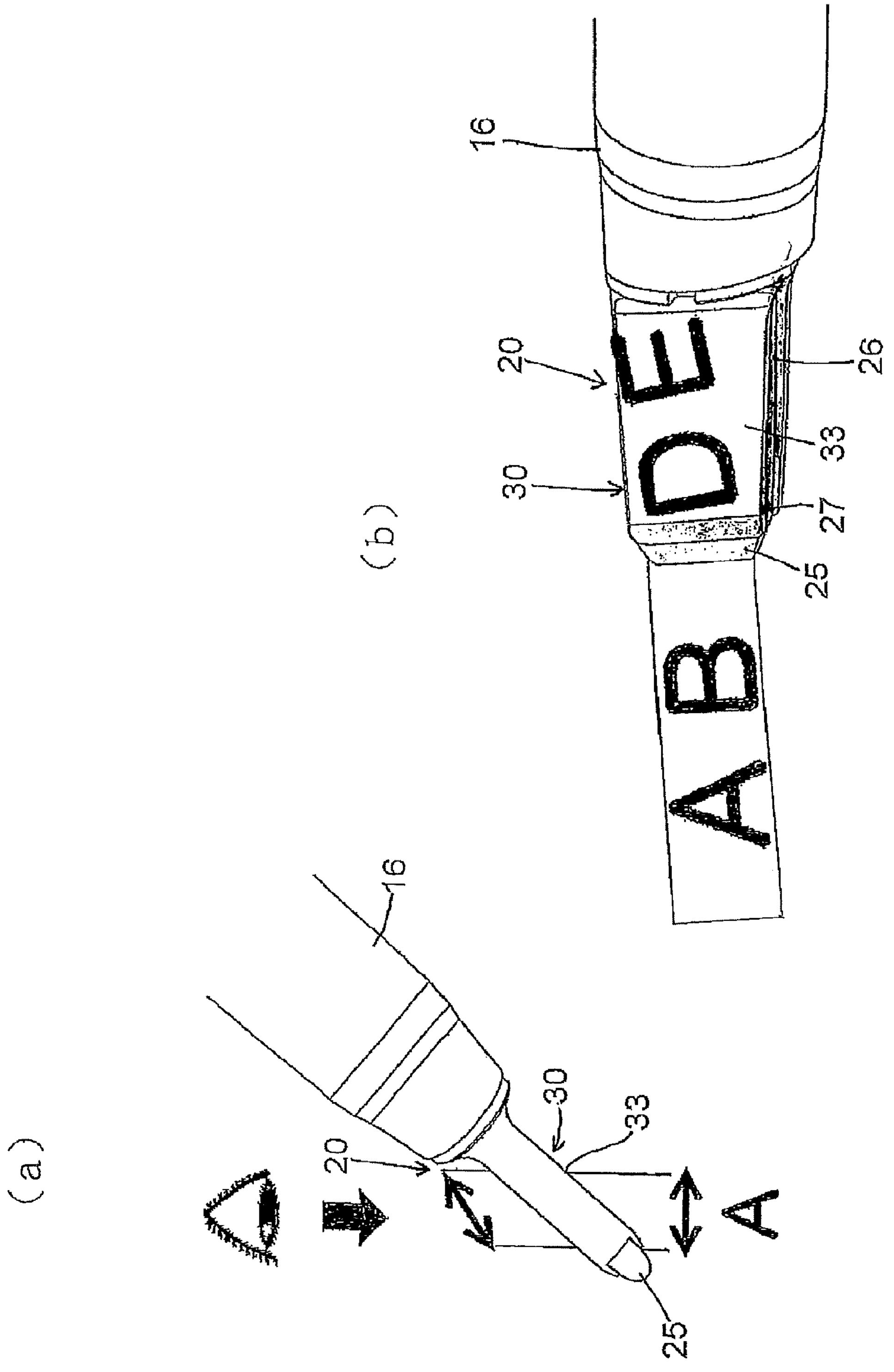

Also, the length Y of the viewer portion 33 is twice the minimum width X, that is, 7.4 mm or greater. As shown in FIG. 10(*a*), at a writing angle of 60°, for example, the character with a width of 3.7 mm fits within the viewer portion 33 when viewed from above (3.7 mm/cos 60°=7.4 mm).

To set the minimum width X of the viewer portion 33 to 3.7 mm or greater and the length Y to 7.4 mm or greater, can be done only when the structure, shape and the like of each component of the pen tip 20 (writing part 25, ink feeder portion 26, retainer 30) are configured (specified) and suitably combined as described above.

Furthermore, in the present embodiment, from the viewpoint of securing an ample amount of supply of ink to the writing part 25 and also from the viewpoint of enlarging the area of viewer portion 33 for visual recognition, the width t of the ink feeder portion 26 (the dimension viewed from the direction perpendicular to the viewer portion 33 surface) is preferably specified to be less than 1.5 mm, more preferably 1.2 mm or smaller, particularly preferably 0.8 mm or smaller.

Further, the ink feeder portion 26 is fixed by being fitted and held in the depressed retaining groove 36 and the mounting surfaces 36*a* and 36*b*. Further, in view of efficient assembly performance and productivity, the sides of the ink feeder portion 26 are configured to be exposed to the open air without covering the entire area of the ink feeder portion 26, so that the total width including the width t of the ink feeder portion 26 can be reduced to the minimum and the width X of the viewer portion 33 can be maximized.

Also, as shown in FIG. 3(*b*), provision of the ink feeder portion 26 on one side of the viewer portion 33, only, or specifically, the location of the ink feeder portion 26 on the near side at the time of writing (on such a side that the pen tip 20 is located on the obtuse angle side of the ink feeder portion 26), makes the ink feeder portion 26 produce a fine view through the viewer portion 33 without interfering with the characters lying in the writing direction when the pen is used with a natural angle. When the ink feeder portion 26 is arranged on the far side (upper side) instead of the near side during writing, the feature of effect of the viewer portion 33 is different in that the ink feeder portion crosses the characters lying in the writing direction and partially hides them during writing (marking).

Next, as shown in FIGS. 1 (*a*) and 1(*b*), the pen tip 40 for writing fine characters is a rod-shaped pen tip of a fine type and has a circular cross section. The rear end (ink absorbent material side) of the pen tip 40 is inserted into the ink absorbent material 17 so that ink is supplied from the ink absorbent material 17 to the pen tip 40 by capillarity.

The pen tip 40 is made of a porous material, and its examples include a parallel fiber bundle formed of one or a combination of natural fiber, animal hair fiber, polyacetal-based resin, polyethylene-based resin, acryl-based resin, polyester-based resin, polyamide-based resin, polyurethane-based resin, polyolefin-based resin, polyvinyl-based resin, polycarbonate-based resin, polyether-based resin, polyphenylene-based resin, etc.; a fiber core obtained by processing a fiber bundle such as felt or processing these fiber bundles with resin; a porous body (sintered core) obtained by sintering a plastic powder of thermoplastic resin as polyolefin-based resin, acryl-based resin, polyester-based resin, polyamide-based resin, polyurethane-based resin and the like.

The pen tip 40 is preferably a fiber bundle core, a fiber core, a sintered core, a felt core, a sponge core, or an inorganic porous material core, and more preferably the fiber core from the viewpoint of deformation moldability and productivity. Also, the porosity, size, hardness, etc. of the pen tip 40 to be used varies depending on the ink type, the type of writing implement and others. The porosity is preferably set to 30 to 60%, for example. In the present disclosure, the "porosity" is calculated as follows. First, the writing core having a known mass and apparent volume is dipped in water, and saturated with water, and then the mass is measured in a state of being taken out from the water. From the measured mass, the volume of water soaked up in the writing core is derived. Assuming the volume of water as the pore volume of the writing core, the porosity can be calculated from the following formula:

Porosity (unit:%)=(water volume)/(apparent volume of the pen tip 20 or pen tip 40)×100.

In the writing implement A thus configured, the ink absorbent material 17 soaking up the ink for writing implements is inserted into and held in the writing implement body 10. The pen tip 20 (writing part 25, ink feeder portion 26, retainer 30) having the above configuration is fixed on the front side by sequentially fitting via the front barrel 16 while the retainer 45 having the pen tip 40 fixed therein is fixed on the other side by fitting, facilitating fabrication of the twin-type writing implement A. Ink absorbed in the ink absorbent material 17 is efficiently supplied via the thin plate-like ink feeder portion 26 to the writing part 25 in the tip 20 as well as to pen tip 40 by capillary force and is used for writing.

With this writing implement A, since the pen tip 40 is the same as a conventional generic pen tip, the function of the pen tip 20 will be described below.

As shown in FIGS. 1 to 6, the pen tip 20 of this writing implement A has the viewer portion (window) 33 that allows visual recognition in the writing direction. Thanks to the capillary force of the ink feeder portion 26, ink from the ink absorbent material 17 reaches the writing part 25 and is used for writing. At the time of writing, if the user looks at the see-through side through the viewer portion (window) 33, the user can easily place the pen tip at the starting position of the drawing and stop the pen tip at a point desired to stop at the end of drawing to prevent excessive drawing or overshoot.

The pen tip in the above embodiment includes at least a writing part 25, a retainer 30 having a viewer portion 33 and an ink feeder portion 26 for feeding the ink in the writing implement body 10 to the writing part. The viewer portion 33 has a minimum width (X) of 3.7 mm or wider and a length (Y) of 7.4 mm or longer (hereinafter, this configuration is referred to as "Configuration 1"). Alternatively, the ink feeder portion 26 is configured to be located on the near side at the time of writing, that is, the ink feeder portion 26 is fixed to the retainer 30 so as to be positioned on the near side during writing (on such a side that the pen tip 20 is located on the obtuse angle side of the ink feeder portion 26)(hereinafter, this configuration is referred to as "Configuration 2"). These configurations make it possible to highly achieve maximization of the effective area of the viewer portion 33 allowing visual recognition in the writing direction, and ease of viewing through the viewer portion as well as ease of writing, concurrently. As explaining more specifically the maximization of the effective area of the viewer portion 33 by the above Configuration 1, the viewer portion 33 becomes remarkably wider compared to the conventional configuration as shown in FIG. 10(*a*), when, for example, a letter of 10.5 pt (No. 5 type) is viewed from above with the pen tilted at a writing angle of 60°, so that the letter A can be clearly seen within the viewer portion 33.

In Configuration 2 above, even when the pen is used with a natural writing angle, the ink feeder portion 26 will not interfere with the characters lying in the writing direction and a further fine view can be obtained through the viewer portion 33. When the ink feeder portion 26 is arranged on the far side (upper side) instead of the near side during writing, or when two parts of the ink feeder portions 26 are arranged in a square bracket-shape or U-shape from the sides of the writing part, the ink feeder portion crosses the characters lying in the writing direction and partially hides them during writing (marking), so that the feature of effect of the viewer portion 33 becomes different. This form as well can achieve maximization of the effective area of the viewer portion 33 and ease of viewing and ease of writing at a high level, concurrently. Thus, the widened viewer portion 33 can make the view in the writing direction clearer and further improve the ease of writing, as shown in FIG. 10(*b*).

Specifying the width t of the ink feeder portion 26 to 1.2 mm or smaller when viewed from the direction perpendicular to the viewer portion 33 (hereinafter, this configuration is referred to as "Configuration 3") can further maximize the area of the viewer portion, so that the effect of the present disclosure can be achieved at a higher level.

The ink feeder portion 26 is made of a fiber bundle core having a rectangular cross section or an elliptical cross section while the writing part 25 is made of a resin sintered body, and the ink feeder portion 26 and the writing part 25 are fixed to the retainer 30 with the ends (26A and 25A) of the ink feeder portion 26 and writing part 25 abutted against each other (at abutment portion 27) (hereinafter, this configuration is referred to as "Configuration 4"), whereby the ink feeder portion 26 can efficiently flow (supply) ink to the writing part 25 through a smaller cross section while producing a good writing sensation, thus making it possible to achieve the effects of the present disclosure at a higher level.

Furthermore, since the writing implement A has good ink outflow properties, even if writing is performed with the pen tip 20 moving at a high speed, the supply of ink will follow well, thus making it possible to provide a writing implement without ink starvation during writing.

Next, other examples of the embodiments of the present disclosure, i.e., the writing implements B to F of the second to sixth embodiments will be described in further detail with reference to FIGS. 11 to 30.

FIGS. 11 to 30 are drawings of writing implements and their pen tips of other examples according to the second to sixth embodiments of the present disclosure, showing states with their cap removed.

Each of the writing implements B to F of the second to sixth embodiments shown in FIGS. 11 to 30 has a different configuration of the pen tip portion of the writing implement A of the first embodiment shown in FIGS. 1 to 10 above, in which, specifically, the shape of the opening on the front-end side of the front barrel 16, the shape of the flange 32 of the retainer 30 attached to the opening of the front barrel 16, the shapes and structures of the writing part 25 and ink feeder portion 26 and the shape and structure of the viewer portion 33*a* of the retainer 30, and the like are slightly modified, or in which the modified forms are further combined.

Hereinbelow, the modified points of each of the writing implements B to F of the embodiments will be described in detail.

Figure 14:
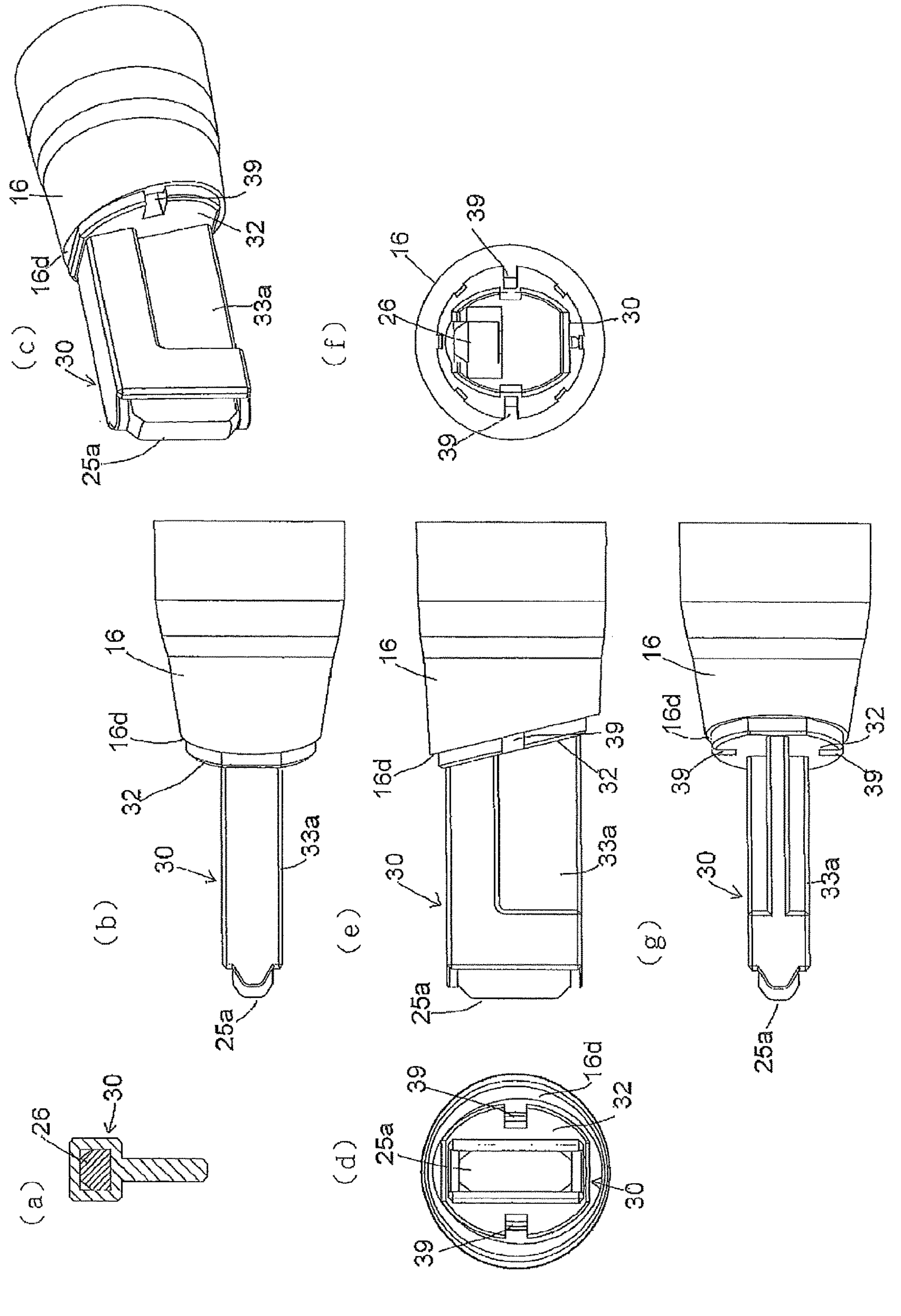

FIGS. 11 to 14 are drawings of a writing implement B having a pen tip portion according to the second embodiment of the present disclosure. FIGS. 11(*a*) to 11(*g*) are drawings of the writing implement with its cap removed in conformity with FIG. 2. FIGS. 12(*a*) and 12(*b*) are perspective views of the pen tip of the writing implement B viewed from the front side and the rear side. FIGS. 13(*a*) and 13(*b*) are perspective views of the pen tip of FIG. 12 that is rotated 180°, viewed from the front and rear sides, respectively. FIGS. 14(*a*) to 14(*g*) are drawings of the pen tip of the writing implement B.

The writing implement B of the second embodiment of the present disclosure is different from the writing implement A of the above first embodiment in that the writing part has a perpendicular shape (perpendicular writing part 25*a*) instead of an inclined shape (knife cut shape), in that the writing part 25*a* and the ink feeder portion 26 that form an L-shaped configuration are not formed of two parts but are integrated into a single part, in that the viewer portion 33*a* of the retainer 30 is cut in a thin-plate form (depressed surface form) with smooth viewer surfaces, and in that the ink feeder portion 26 is disposed not on the near side but on the far (upper) side (the long side of the L-shape is located on the upper side) during writing.

The pen tip of the writing implement B of this embodiment includes at least the writing part 25*a*, the retainer 30 having the viewer portion 33*a* formed of the thin plate with smooth viewer surfaces, and the ink feeder portion 26 for feeding ink from the writing implement body 10 to the writing part 25*a*, where the writing part 25*a* and the ink feeder portion 26 are formed integrally. Similarly to the above writing implement A, also in this embodiment, the minimum width of the viewer portion 33*a* is set to 3.7 mm or greater and the length of the viewer portion 33 is 7.4 mm or greater (Configuration 1), and the viewer portion 33*a* of the retainer 30 is configured in a thin-plate form (depressed surface form) with smooth viewer surfaces, so that it is possible to achieve maximization of the effective area of the viewer portion 33*a* that allows visual recognition in the writing direction, ease of viewing therethrough and also ease of writing at a high level, concurrently.

In addition, similarly to the above writing implement A, the width of the ink feeder portion 26 is set to 1.2 mm or smaller when viewed from the direction perpendicular to the viewer portion 33*a* (Configuration 3), so that it is possible to further maximize the area of the viewer portion 33*a* and achieve the effect of the disclosure at a higher level, concurrently.

FIGS. 15 to 18 are drawings of a writing implement C and the pen tip portion according to the third embodiment of the present disclosure. FIGS. 15(*a*) to 15(*f*) are drawings of the writing implement with its cap removed in conformity with FIGS. 2 and 11. FIGS. 16(*a*) and 16(*b*) are perspective views of the pen tip of the writing implement C viewed from the front side and the rear side. FIGS. 17(*a*) and 17(*b*) are perspective views of the pen tip of FIG. 16 that is rotated 180°, viewed from the front and rear sides, respectively. FIGS. 18(*a*) to 18(*g*) are drawings of the pen tip portion of the writing implement C.

The writing implement C of the third embodiment of the present disclosure is different from the writing implement A of the above first embodiment in that the opening face at the front-end side of the front barrel 16 has a perpendicular shape (perpendicular opening 16*i*) instead of an inclined shape, in that the abutment surface of the flange portion 32 of the retainer 30 attached to the perpendicular opening 16*i* of the aforementioned front barrel 16 is also formed with a perpendicular abutment surface, in that the writing part 25 and the ink feeder portion 26 that form an L-shaped configuration are not formed of two parts but are integrated into a single part, in that the viewer portion 33*a* of the retainer 30 is cut in a thin-plate form (depressed surface form) with smooth viewer surfaces, and in that the ink feeder portion 26 is disposed not on the near side but on the far (upper) side (the long side of the L-shape is located on the upper side) during writing.

The pen tip of the writing implement C of this embodiment includes at least the writing part 25, the retainer 30 having the viewer portion 33*a* formed of the thin plate with smooth viewer surfaces, and the ink feeder portion 26 for feeding ink from the writing implement body 10 to the writing part, where the writing part 25 and the ink feeder portion 26 are formed integrally. Further, the opening 16*i* on the front-end side of the front barrel 16 is formed to be perpendicular. Similarly to the above writing implement A, also in this embodiment, the minimum width of the viewer portion 33*a* is set to 3.7 mm or greater and the length of the viewer portion 33 is 7.4 mm or greater (Configuration 1), and the viewer portion 33*a* of the retainer 30 is configured in a thin-plate form (depressed surface form) with smooth viewer surfaces, so that it is possible to achieve maximization of the effective area of the viewer portion 33 that allows visual recognition in the writing direction, ease of viewing therethrough and also easiness of writing at a high level, concurrently.

In addition, similarly to the above writing implement A, the width of the ink feeder portion 26 is set to 1.2 mm or smaller when viewed from the direction perpendicular to the viewer portion 33*a* (Configuration 3), so that it is possible to maximize the area of the viewer portion 33*a* and achieve the effect of the disclosure at a higher level, concurrently.

Figure 22:
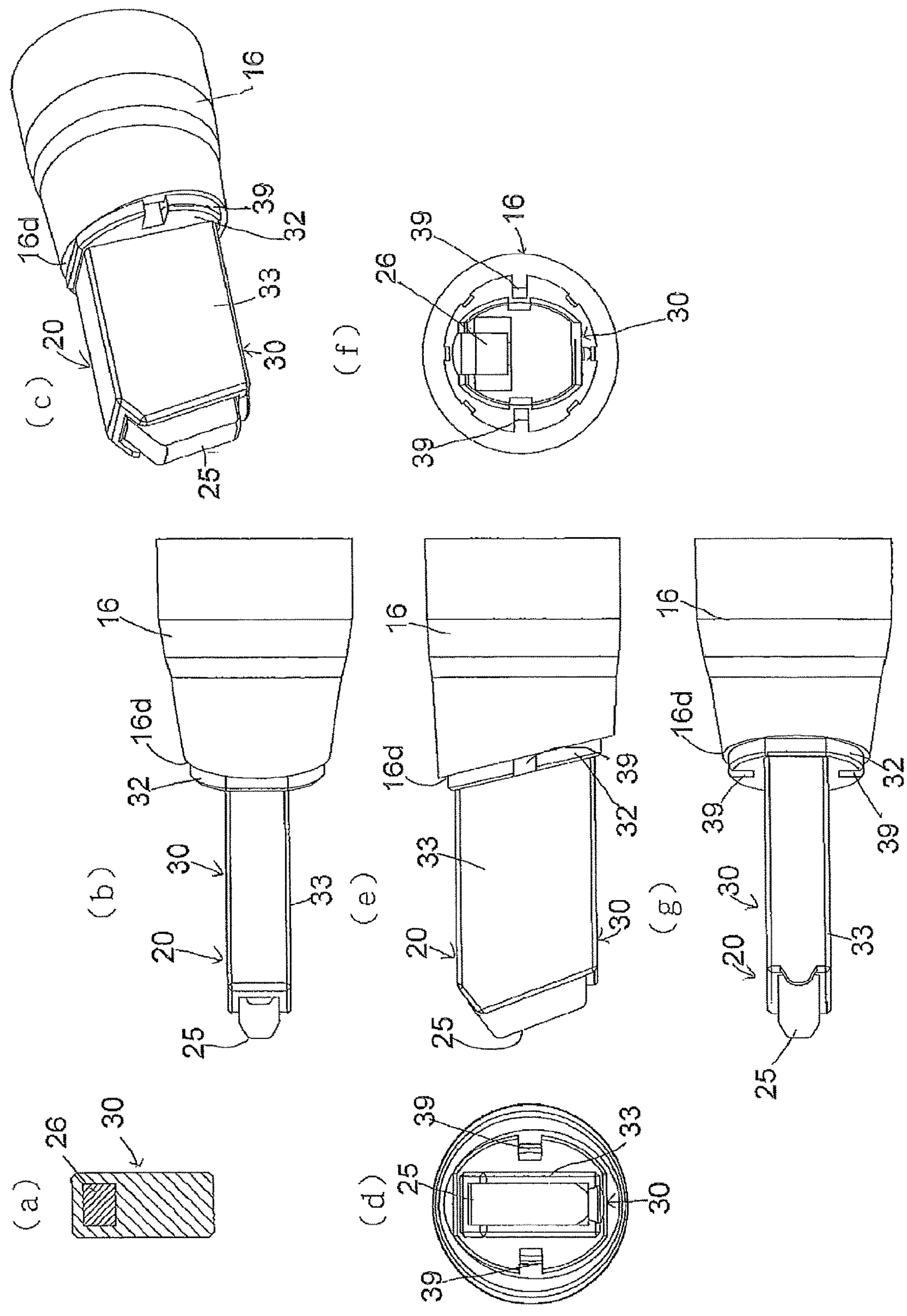

FIGS. 19 to 22 are drawings of a writing implement D and a pen tip portion thereof according to the fourth embodiment of the present disclosure. FIGS. 19(*a*) to 19(*g*) are drawings of the writing implement with its cap removed in conformity with FIGS. 2, 11 and 15. FIGS. 20(*a*) and 20(*b*) are perspective views of the pen tip of the writing implement D viewed from the front side and the rear side. FIGS. 21(*a*) and 21(*b*) are perspective views of the pen tip of FIG. 20 that is rotated 180°, viewed from the front and rear sides, respectively. FIGS. 22(*a*) to 22(*g*) are drawings of the pen tip portion of the writing implement D.

The writing implement D of the fourth embodiment of the present disclosure is different from the writing implement A of the above first embodiment in that a writing part 25 and a ink feeder portion 26 that form an L-shaped configuration are not formed of two parts but are integrated into a single part, and in that the ink feeder portion 26 is disposed not on the near side but on the far (upper) side (the long side of the L-shape is located on the upper side) during writing.

The pen tip of the writing implement D of this embodiment includes at least the writing part 25, the retainer 30 having the viewer portion 33 formed of the thin plate with smooth viewer surfaces, and the ink feeder portion 26 for feeding ink from the writing implement body 10 to the writing part, where the writing part 25 and the ink feeder portion 26 are formed integrally. Similarly to the above writing implement A, also in this embodiment, the minimum width of the viewer portion 33 is set to 3.7 mm or greater and the length of the viewer portion 33 is 7.4 mm or greater (Configuration 1), so that it is possible to achieve maximization of the effective area of the viewer portion 33 that allows visual recognition in the writing direction, ease of viewing therethrough and also ease of writing at a high level, concurrently.

In addition, similarly to the above writing implement A, the width of the ink feeder portion 26 is set to 1.2 mm or smaller when viewed from the direction perpendicular to the viewer portion 33 (Configuration 3), so that it is possible to further maximize the area of the viewer portion 33 and achieve the effect of the disclosure at a higher level, concurrently.

Figure 26:
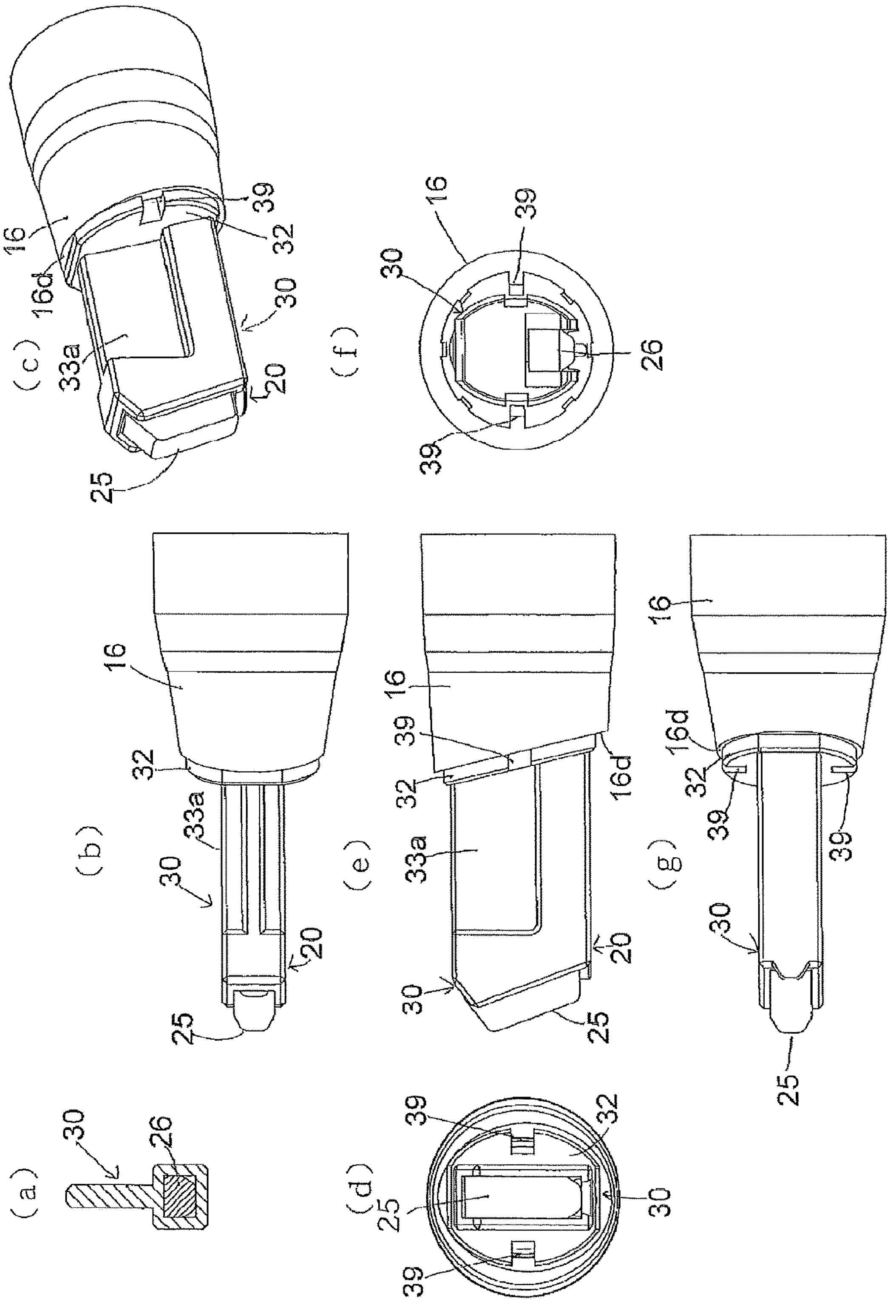

FIGS. 23 to 26 are drawings of a writing implement E and a pen tip portion thereof according to the fifth embodiment of the present disclosure. FIGS. 23(*a*) to 23(*g*) are drawings of the writing implement with its cap removed in conformity with FIGS. 2, 11, 15 and 19. FIGS. 24(*a*) and 24(*b*) are perspective views of the pen tip of the writing implement E viewed from the front side and the rear side. FIGS. 25(*a*) and 25(*b*) are perspective views of the pen tip of FIG. 24 that is rotated 180°, viewed from the front and rear sides, respectively. FIGS. 26(*a*) to 26(*g*) are drawings of the pen tip portion of the writing implement E.

The writing implement E of the fifth embodiment of the present disclosure is different from the writing implement A of the above first embodiment in that the writing part 25 and the ink feeder portion 26 that form an L-shaped configuration are not formed of two parts but are integrated into a single part, and in that the viewer portion 33*a* of the retainer 30 is cut in a thin-plate form (depressed surface form) with smooth viewer surfaces.

The pen tip of the writing implement E of this embodiment includes at least the writing part 25, the retainer 30 having the viewer portion 33*a* formed of the thin plate with smooth viewer surfaces, and the ink feeder portion 26 for feeding ink from the writing implement body 10 to the writing part, where the writing part 25 and the ink feeder portion 26 are formed integrally. Similarly to the above writing implement A, also in this embodiment, the minimum width of the viewer portion 33*a* is set to 3.7 mm or greater and the length of the viewer portion 33 is 7.4 mm or greater (Configuration 1), and the viewer portion 33*a* of the retainer 30 is configured in a thin-plate form (depressed surface form) with smooth viewer surfaces, so that it is possible to achieve maximization of the effective area of the viewer portion 33 that allows visual recognition in the writing direction, ease of viewing therethrough and also ease of writing at a high level, concurrently.

Further, similarly to the above writing implement A, the ink feeder portion 26 is configured to be located on the near side at the time of writing, that is, the ink feeder portion 26 is fixed to the retainer 30 so as to be positioned on the near side during writing (on such a side that the pen tip 20 is located on the obtuse angle side of the ink feeder portion 26)(Configuration 2), so that when the pen is used with a natural writing angle, a further fine view can be obtained through the viewer portion 33 without any ink feeder portion 26's interference with the characters lying in the writing direction. Thus, it is possible to maximize the effective area of the viewer portion 33 that allows visual recognition in the writing direction, ease of viewing therethrough and also ease of writing at a high level, concurrently.

Moreover, similarly to the above writing implement A, the width of the ink feeder portion 26 is set to 1.2 mm or smaller when viewed from the direction perpendicular to the viewer portion 33 (Configuration 3), so that it is possible to further maximize the area of the viewer portion 33 and achieve the effect of the disclosure at a higher level, concurrently.

Figure 30:
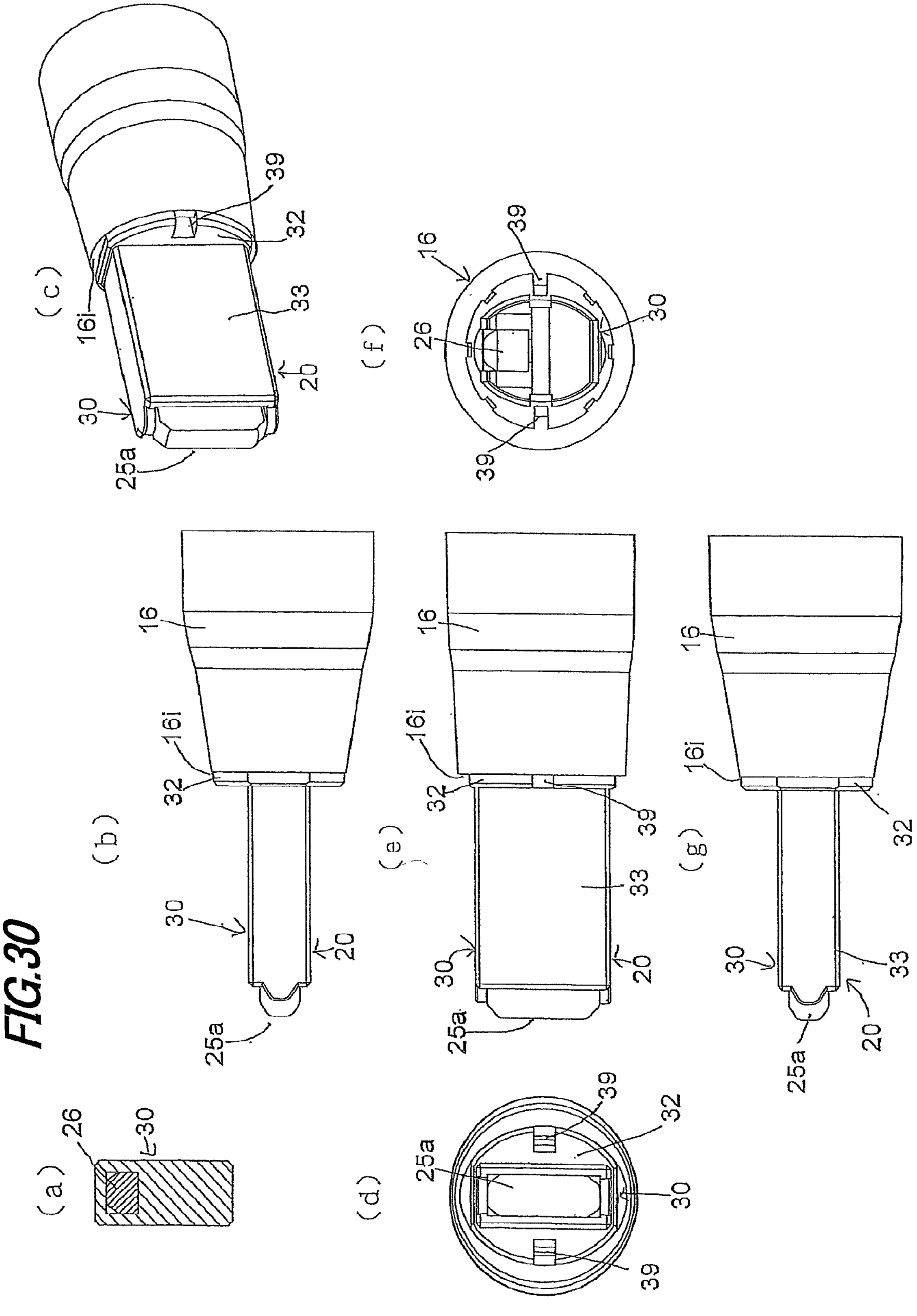

FIGS. 27 to 30 are drawings of a writing implement F and a pen tip portion thereof according to the sixth embodiment of the present disclosure. FIGS. 27(*a*) to 27(*f*) are drawings of the writing implement with its cap removed in conformity with FIGS. 2, 11, 15, 19 and 23. FIGS. 28(*a*) and 28(*b*) are perspective views of the pen tip of the writing implement F viewed from the front side and the rear side. FIGS. 29(*a*) and 29(*b*) are perspective views of the pen tip of FIG. 28 that is rotated 180°, viewed from the front and rear sides, respectively. FIGS. 30(*a*) to 30(*g*) are drawings of the pen tip portion of the writing implement F.

The writing implement F of the sixth embodiment of the present disclosure is different from the writing implement A of the above first embodiment in that the opening at the front-end side of the front barrel 16 has a perpendicular shape (perpendicular opening 16*i*) instead of an inclined shape, in that the writing part 25 has a perpendicular shape instead of an inclined shape (knife-cut shape), and in that the writing part 25 and the ink feeder portion 26 that form an L-shaped configuration are not formed of two parts but are integrated into a single part.

The pen tip of the writing implement F of this embodiment includes at least the writing part 25, the retainer 30 having the viewer portion 33, and the ink feeder portion 26 for feeding ink from the writing implement body 10 to the writing part, where the writing part 25 and the ink feeder portion 26 are formed integrally. Similarly to the above writing implement A, also in this embodiment, the minimum width of the viewer portion 33 is set to 3.7 mm or greater and the length of the viewer portion 33 is 7.4 mm or greater (Configuration 1), so that it is possible to achieve maximization of the effective area of the viewer portion 33 that allows visual recognition in the writing direction, ease of viewing therethrough and also ease of writing at a high level, concurrently.

Further, similarly to the above writing implement A, the ink feeder portion 26 is configured to be located on the near side at the time of writing, that is, the ink feeder portion 26 integrated with the writing portion 25 is fixed to the retainer 30 so as to be positioned on the near side during writing (on such a side that the pen tip 20 is located on the obtuse angle side of the ink feeder portion 26)(Configuration 2), so that when the pen is used with a natural writing angle, a further fine view can be obtained through the viewer portion 33 without any ink feeder portion 26's interference with the characters lying in the writing direction. Thus, it is possible to maximize the effective area of the viewer portion 33 that allows visual recognition in the writing direction, ease of viewing therethrough and also ease of writing at a high level, concurrently. Additionally, since the opening 16*i* on the front-end side of the front barrel 16 is formed perpendicularly and the writing part 25*a* is also formed perpendicularly, when the orientation of the pen tip in which the ink feeder portion 26 integrated with the writing part 25*a* is adapted to be positioned on the near side (on such a side that the pen tip 20 is located on the obtuse angle side of the ink feeder portion 26) at the time of writing, is turned opposite (rotated 180°), the ink feeder portion 26 is positioned on the near side during writing (the long side of the L-shape is located on the lower side) and the pen can also be used in this mode.

Furthermore, similarly to the above writing implement A, the width of the ink feeder portion 26 is set to 1.2 mm or smaller when viewed from the direction perpendicular to the viewer portion 33 (Configuration 3), so that the area of the viewer portion 33 can be further maximized. Therefore, the effects of the present disclosure can be achieved at a higher level, concurrently.

The writing implement of the present disclosure is not limited to the above-described embodiments and others and can be further modified in various ways without changing the technical idea of the present disclosure.

For example, in the above embodiments, each writing implement is configured with the above Configuration 1 or Configuration 2, but a combination of Configuration 1 and Configuration 2, and a combination of Configuration 1 or Configuration 2 and Configuration 3 and/or Configuration 4 may also constitute a writing implement.

In the above-described embodiments, the writing implement of Configuration 1 is preferably configured to have the ink feeder portion 26 on one side of the viewer portion 33. However, the structure of Configuration 1 may have a pair of ink feeder portions 26, 26 arranged on the top and bottom sides of the viewer portion 33 (a pair of integrated or separate ink feeder portions 26, 26 on the two sides of the writing part 25 in the square bracket-shape or U-shape. Though, in this configuration, the ink feeder portion crosses the characters lying in the writing direction during writing (marking), the effect of the present disclosure can be exhibited because the viewer portion 33 has novel specifications covering a wide range, that is, the minimum width (X) of the viewer portion 33 is set to 3.7 mm or greater, and the length (Y) to 7.4 mm.

In addition, the retainer 30, the writing part 25 and the ink feeder portion 26 may be joined by fixing with a hot-melt adhesive, by fixing by solvent permeation, by ultrasonic welding, with a reactive adhesive (moisture curing, UV curing, oxygen curing, two-part curing), with a solvent adhesive (soluble synthetic resin, emulsion, rubber), by adhesion by tape or double-sided tape.

The porosity of the writing part 25 is preferably within the following range.

The porosity is preferably 30 to 80%, more preferably 40 to 70%.

Though the writing implements A to F of the above embodiments are of a twin-type writing implement, the pen tip 40 may be omitted (by forming the barrel body as a cylinder with a bottom) so as to provide a single-type writing implement having the pen tip 20. Also, the writing implement may be configured with the pen tip 20 of a click-type that is projected and retracted.

In each of the writing implements A to F of the above-described embodiments, the cross section of the barrel body of the writing implement body is formed in a circular shape but may be formed in a variant shape such as a triangular shape, a polygonal shape having four or more sides, or an elliptical shape. Also, the described examples use the pen tip 20 whose entire body is formed of transparent material, but the pen tip 20 may be given as a two—color molding configured such that at least the viewer portion 33 is formed of transparent material while the portion on the main body 31 side attached to the main body of the writing implement may be formed of a resin other than transparent material.

Further, in each of the writing implements A to F of the above-described embodiments, ink for writing implements (water-based ink, oil-based ink, thermochromic ink) is used, but liquid materials such as liquid cosmetics, liquid medicines, coating liquids, and correction liquids may be used.

EXAMPLES

Next, the present disclosure will be described in more detail with reference to examples, but the present disclosure should not be limited to the following examples.

Example 1

A writing implement having a pen tip conforming to the following structure and FIGS. 1 to 10 was used with an ink for writing implements having the following composition. The dimensions of the pen tip used were those shown below.

[Configurations of Pen Tip 20 (Writing Part 25, Ink Feeder Portion 26, Retainer 30)]

- Writing part 25: polyethylene sintered core, porosity: 50%, 4×3×6 mm, T=3 mm, W=5.5 mm
- Ink feeder portion 26: PET fiber core, widthwise dimension: 2 mm, lengthwise dimension: 20 mm, thickness t: 0.8 mm
- Retainer 30: made of acrylic resin, having a visible light transmittance of 85% [the visible light transmittance was obtained by measuring the reflectance with a multi-light source spectrocolorimeter (MSC-5N) manufactured by Suga Test Instruments Co., Ltd.]
- Viewer portion (window) 33 (rectangle) size: X=3.8 mm (maximum 4.5 mm)×Y=8 mm×width (thickness) 2.5 mm
- Ink absorbent material 17: PET fiber bundle, porosity 85%, φ6×80 mm
- Outer skin: PET film
- Writing implement body 10, caps 50, 60: made of polypropylene (PP)
- Pen tip 40: polyester fiber bundle core, porosity 60%, φ2×40 mm
- Friction body 52: Styrenic elastomer selected from the group consisting of styrene-ethylene-propylene-styrene (SEPS), styrene-ethylene-ethylene-propylene-styrene (SEEPS) and styrene-ethylene-butadiene-styrene (SEBS)

(Ink Composition for Writing Implements: Ink Color: Fluorescent Yellow)

As the ink for writing implements, an ink with the following composition (100% by mass in total) was used.

| | |
|---|---|
| Microcapsule pigment | 25.0% by mass |
| Hydroxyethyl cellulose | 0.4% by mass |
| Glycerin | 5.0% by mass |
| Modified silicone-based antifoaming agent | 0.1% by mass |
| Preservative | 1.0% by mass |
| pH adjuster (10% diluted phosphoric acid solution) | 0.15% by mass |
| Ion-exchanged water | remainder |

Preparation of Microcapsule Pigment, Ink pH, Viscosity, Surface Tension, Etc.

A thermochromic color-memory composition comprising: 4.0 parts of 4-[2,6-bis(2-ethoxyphenyl)-4-pyrinidyl]-N, N-dimethylbenzenamine as an electron-donating color-forming organic compound components; 10.0 parts of 2,2-bis(4'-hydroxyphenyl)hexafluoro propane as an electron acceptive compound component; and 50.0 parts of 4-benzyloxyphenylethyl caprate as a reaction medium component that determines the temperature at which the color reaction occurs, was uniformly heated and dissolved. A solution prepared by mixing 30.0 parts of aromatic polyvalent isocyanate prepolymer as a wall film material and 50.0 parts of a co-solvent was emulsified and dispersed in an aqueous solution of 8% polyvinyl alcohol to form fine droplets. After continuous stirring at 70° C. for about 1 hour, 2.5 parts of water-soluble modified aliphatic amine was added, and the mixture was continuously stirred further for 6 hours to obtain a reversible thermochromic microcapsule pigment suspension.

The suspension was centrifuged to isolate the reversible thermochromic microcapsule pigment.

The average particle size of the microcapsule pigment is 2.0 μm, and it is colorless at 50° C. or higher and turns yellow at −10° C. or lower.

pH: 5.4

Viscosity (25° C.): 3.0 mPa·s (cone/plate type viscometer, manufactured by TOKIMEC Co. Ltd., TV-20)

Surface tension (25° C.): 33 mN/m (automatic surface tension meter, Kyowa Interface Science Co., Ltd., DY-300)

In the writing implement using the pen tip 20 of Example 1 conforming to FIGS. 1 to 10, ink is fed from the ink absorbent material 17 to the writing part 25 through the thin plate-like open ink feeder portion 26 having outflowing properties, and this writing part 25 is formed of a sintered resin core while the ink feeder portion 26 is formed of a fiber bundle core, so that it is possible to produce strong capillary force compared to the porosity, and it is possible to form extremely thin and present better ink flowability. As result, the ink feeder portion does not need to be formed thick, and the viewer part 33 can be specified to have a minimum width X of 3.7 mm or greater and a length Y of 7.4 mm or greater, so that it is possible to achieve maximization of the effective area of the viewer portion 33 that allows visual recognition in the writing direction, ease of viewing therethrough and also ease of writing at a high level, concurrently.

Further, since the ink feeder portion 26 is positioned on the near side during writing, when the pen is used with a natural writing angle, a further fine view can be obtained through the viewer portion 33 without any ink feeder portion 26's interference with the characters lying in the writing direction. As a result, the user can draw a line with the writing part 25 while visually checking the writing direction through the viewer portion 33 when a line was drawn from left to right by a right-handed user. It could be confirmed to provide a writing implement that can produce remarkable easiness of viewing and excellent ink outflow performance without damaging the ink outflow performance. It was also confirmed that even after dropping the writing implement from a height of 1 m above the cedar board, writing could be performed without ink starvation.

Moreover, this writing implement was set in an automatic writing machine and tested in a method following JIS 56037. After writing a line on a quality paper surface at a writing angle of 65° applying a writing load of 1 N at a speed of 7 cm/s, the state of the drawn line was visually checked. As a result, with use of the above-described preferable ink composition, it was found that the pen tip 20 could produce fine ink flow (10 mg/m), and that the ink could present excellency in dryability of the drawn line and low-temperature stability while suppressing drying of the pen tip without causing blurring or strikethrough in the drawn line.

INDUSTRIAL APPLICABILITY

The writing implement of the embodiment can be suitably applied as the types of writing implements called an underline pens, paint markers, oil-based markers, and water-based markers.

DESCRIPTION OF SYMBOLS

10 writing implement body
11 rear axle
16 front axis
17 ink absorbent material
20 pen tip
25 writing part
26 ink feeder portion
30 retainer
33 viewer portion

The invention claimed is:

1. A writing implement comprising: a pen tip that feeds ink from a writing implement body and has a viewer portion allowing visual recognition in a writing direction, the pen tip comprising: at least, a writing part;

a retainer having the viewer portion; and an ink feeder portion for feeding the ink from the writing implement body to the writing part, wherein the minimum width of the viewer portion is 3.7 mm or greater and a length of the viewer portion is 7.4 mm or greater, wherein the ink feeder portion is formed into a thin-plate-like shape, wherein a depressed retaining groove is formed on a bottom surface of the retainer, and wherein the ink feeder portion is fitted and held into the depressed retaining groove formed on the bottom surface of the retainer.

2. The writing implement according to claim 1, wherein the ink feeder portion is arranged on one side of the viewer portion.

3. The writing implement according to claim 2, wherein the ink feeder portion is adapted to be positioned on a near side during writing.

4. The writing implement according to claim 2, wherein a width of the ink feeder portion when viewed from a direction perpendicular to the viewer portion is 1.2 mm or smaller.

5. The writing implement according to claim 4, wherein the ink feeder portion is comprised of a fiber bundle core having a rectangular cross section or an elliptical cross section, the writing part is comprised of a resin sintered body, and the ink feeder portion and the writing part are fixed to the retainer while the ink feeder portion and the writing part are fixed in abutment with each other.

6. The writing implement according to claim 3, wherein a width of the ink feeder portion when viewed from a direction perpendicular to the viewer portion is 1.2 mm or smaller.

7. The writing implement according to claim 6, wherein the ink feeder portion is comprised of a fiber bundle core having a rectangular cross section or an elliptical cross section, the writing part is comprised of a resin sintered body, and the ink feeder portion and the writing part are fixed to the retainer while the ink feeder portion and the writing part are fixed in abutment with each other.

8. The writing implement according to claim 1, wherein the length of the viewer portion is twice the minimum width of the viewer portion.

* * * * *